(12) United States Patent
Peterson et al.

(10) Patent No.: US 7,445,442 B2
(45) Date of Patent: Nov. 4, 2008

(54) ARTIFICIAL FIRELOG AND FIRESTARTER CHIP PRODUCING APPARATUS AND METHOD AND PRODUCTS PRODUCED THEREFROM

(76) Inventors: Gregory J. Peterson, 9225 Logan Rd., Redding, CA (US) 96003; Gary M. Flint, 1616 Imperial Dr., Redding, CA (US) 96003

( * ) Notice: Subject to any disclaimer, the term of this patent is extended or adjusted under 35 U.S.C. 154(b) by 340 days.

(21) Appl. No.: 10/802,693

(22) Filed: Mar. 16, 2004

(65) Prior Publication Data
US 2004/0247720 A1 Dec. 9, 2004

Related U.S. Application Data

(60) Continuation of application No. 09/754,240, filed on Jan. 3, 2001, now Pat. No. 6,716,259, which is a division of application No. 09/409,647, filed on Oct. 1, 1999, now Pat. No. 6,655,943, which is a continuation-in-part of application No. 09/165,270, filed on Oct. 1, 1998, now Pat. No. 6,251,147, and a continuation of application No. PCT/US99/23007, filed on Sep. 30, 1999.

(51) Int. Cl.
*B29C 47/00* (2006.01)
(52) U.S. Cl. ......................... 425/208; 44/535
(58) Field of Classification Search ......... 425/200–209, 425/376.1–382.4, 461–467; 44/535; 366/1
See application file for complete search history.

(56) References Cited

U.S. PATENT DOCUMENTS

| | | | |
|---|---|---|---|
| 390,610 A | 10/1888 | Macbrair | |
| 930,526 A | 8/1909 | Bloss | |
| 1,191,458 A | 7/1916 | Phillips | |
| 2,791,802 A * | 5/1957 | Weber | 425/208 |
| 2,916,365 A | 12/1959 | Smith | |
| 3,010,809 A | 11/1961 | Peck | |
| 3,367,757 A | 2/1968 | Church | |
| 3,726,651 A * | 4/1973 | Ronden | 44/533 |
| 3,910,316 A | 10/1975 | Reifenhauser | |
| 3,986,845 A | 10/1976 | Hotchkiss | |
| 4,043,765 A | 8/1977 | Tanner | |

(Continued)

FOREIGN PATENT DOCUMENTS

AT 401 525 B 9/1996

(Continued)

*Primary Examiner*—Robert B. Davis
*Assistant Examiner*—Marissa W Chaet
(74) *Attorney, Agent, or Firm*—John P. O'Banion

(57) ABSTRACT

An artificial firelog and firestarter chip producing apparatus comprising a cutting assembly, a compression conveyor auger assembly and a die. The apparatus converts standard waxed corrugated cardboard boxes into artificial firelogs by first slicing cardboard sheets into cardboard strips, then chopping the cardboard strips into cardboard segments in the cutting assembly. The cardboard segments are horizontally disposed between the rifling and compressed in the compression conveyor auger assembly and extruded in the die to form generally horizontally disposed, circular, longitudinally-shaped sections of a firelog. Firestarter chips are fabricated by the cutting assembly, which slices waxed cardboard sheets in conjunction with paper sheets into waxed cardboard and paper strips, then chopping the waxed cardboard strips into waxed cardboard segments and the paper strips into paper segments and waxed cardboard segments mix.

11 Claims, 47 Drawing Sheets

U.S. PATENT DOCUMENTS

| | | |
|---|---|---|
| 4,120,666 A | 10/1978 | Lange |
| 4,134,714 A | 1/1979 | Driskill |
| 4,243,394 A | 1/1981 | Kincaid |
| 4,539,011 A | 9/1985 | Kretzschmann |
| 4,623,324 A | 11/1986 | Zulkowitz |
| 4,687,144 A | 8/1987 | Irwin et al. |
| 4,762,525 A | 8/1988 | Wood |
| 4,769,044 A | 9/1988 | Cornwell |
| 4,931,346 A | 6/1990 | Nogueras Dardina |
| 5,001,956 A | 3/1991 | Nitsch |
| 5,004,352 A * | 4/1991 | Tamura et al. .............. 366/343 |
| 5,197,659 A | 3/1993 | Vassiliou |
| 5,496,384 A | 3/1996 | Jeskey et al. |
| 5,580,360 A | 12/1996 | Pool |
| 5,830,245 A | 11/1998 | Raddon |
| 5,868,804 A | 2/1999 | Williams et al. |
| 6,251,147 B1 | 6/2001 | Peterson et al. |
| 6,655,943 B1 * | 12/2003 | Peterson et al. .............. 425/114 |
| 6,716,259 B2 | 4/2004 | Peterson et al. |
| 6,716,260 B2 | 4/2004 | Peterson et al. |

FOREIGN PATENT DOCUMENTS

| | | |
|---|---|---|
| CA | 2114670 | 8/1995 |
| DE | 35 10 969 A1 | 1/1996 |
| WO | WO 94/07688 * | 4/1994 |

* cited by examiner

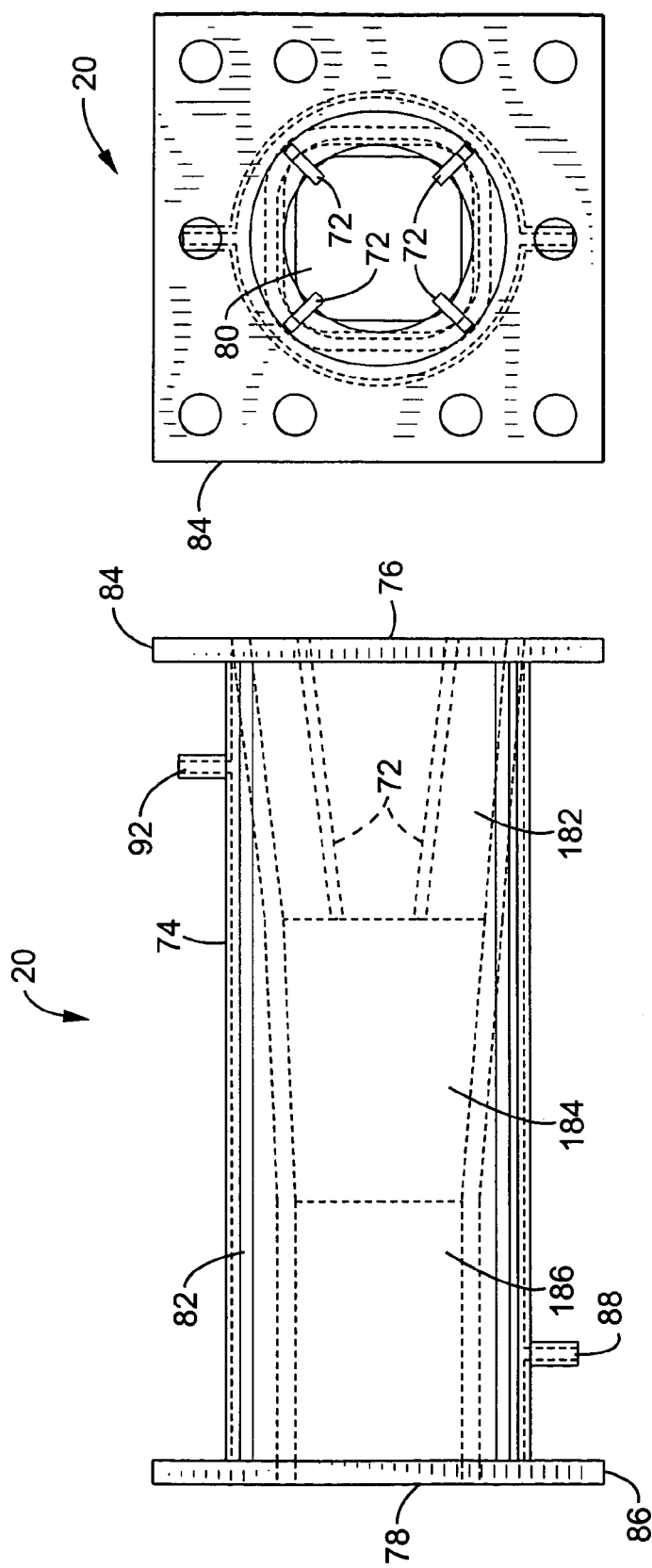

ARTIFICIAL FIRELOG AND FIRESTARTER CHIP PRODUCING APPARATUS AND METHOD AND PRODUCTS PRODUCED THEREFROM

CROSS-REFERENCE TO RELATED APPLICATIONS

This application is a continuation of U.S. application Ser. No. 09/754,240 filed on Jan. 3, 2001, now U.S. Pat. No. 6,716,259, which is a divisional of U.S. application Ser. No. 09/409,647 filed on Oct. 1, 1999, now U.S. Pat. No. 6,655,943, incorporated herein by reference, which in turn is (i) a continuation-in-part of U.S. application Ser. No. 09/165,270 filed on Oct. 1, 1998, now U.S. Pat. No. 6,251,147 incorporated herein by reference, and (ii) a 35 U.S.C. § 111(a) continuation of international application Ser. No. PCT/US99/23007 filed on Sep. 30, 1999. Priority is claimed to each of the foregoing applications.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention pertains generally to a fuel manufacturing apparatus, and more particularly to an apparatus and method for converting flammable material, such as waxed corrugated cardboard, into compact artificial firelogs or firestarter chips.

2. Description of the Background Art

The popularity of log burning fireplaces as an amenity and as a supplemental source of heat continues to grow. With cutting restrictions on Government land, as well as the closing of many wood processing plants, wood logs can be difficult and expensive to obtain. As a result, artificial firelogs, which generally burn cleaner and light faster, have been gaining in popularity.

On the other hand, boxes and containers made from cardboard are widely used in an almost infinite variety of applications such as packaging produce, shipping and storage of goods and the like. As such, there is an abundant supply of discarded cardboard boxes readily available for recycling. It has been recognized that discarded cardboard boxes form a potential fuel material, and the general concept of converting used or discarded cardboard boxes into burnable firelogs has been applied with some level of success.

Machines have been previously developed to convert such cardboard boxes into compact burnable firelogs. Such machines include a feed system, such as a hammermill for receiving a sheet of cardboard, a cutting mechanism for slicing the cardboard sheet into strips and then cutting the strips into chips, and a compacting/compressing punch press assembly for shaping the chips into compact firelog structures which can be burned in a fireplace. Binders, such as glue, are used to hold the chips together after compression. Additionally, the finished firelogs can be dipped into wax to create an outer wax coating to enhance their burn capability.

These existing machines, however, are designed to cut and shape plain cardboard boxes; that is, cardboard without a wax or wax-like coating thereon. Existing machines are not made to cut and shape waxed corrugated cardboard. Furthermore, the design of these machines does not take into account that, by using glue as a binder to hold regular unwaxed cardboard together into a compressed log, the corrugations are destroyed when the strips or chips are smashed and glued together. Quite significantly, we have found that regular and waxed corrugated cardboard has a memory and, while the corrugated segments stick together they are flattened and compressed, if glue is not used as a binder, upon heating the corrugated segments expand back into an open structure through which airflow is increased which leads to more efficient burning. Current fire log production machines are not able to make use of this memory property of corrugated cardboard.

It will be appreciated that resource conservation continues to be important as our population increases and our level of resources diminish. Therefore corrugated cardboard boxes, as is the case with many other materials, are generally recycled to reduce waste. Wax-coated corrugated cardboard boxes, however, are generally non-recyclable. Wax-coated corrugated cardboard boxes are commonly coated with a paraffin-based wax which is very expensive to separate from the cardboard within a normal re-pulping systems. Consequently, used wax-coated corrugated cardboard boxes (WOCC) are generally discarded in landfills. In view of present interests regarding conservation of resources and environmental consciousness, the ability to reuse such discarded material in a form of fuel would serve to reduce the demand for other types of fuels, such as oil, gas or coal, thus further conserving natural resources and preserving the environment.

Additionally, current log manufacturing machines destroy the corrugation within the corrugated cardboard which reduces the flow and permeation of wax and oxygen throughout the firelog which results in an incomplete and inefficient burning of the firelog.

Moreover, current log manufacturing machines produce firelogs with "cold joints" at the intervals between punches or presses. These cold joints are also formed when the chips are compressed vertically within the structure of the log rather than disposed horizontally around the log in a circular fashion. Cold joints are weak links within the firelog that easily break up into multiple sections when any shear or tensile force is exerted upon them. The punch or press machine creates vertical arrangements of the chips within the firelog. When burned, the vertical chip arrangement causes chips to burn from the edge rather than from the side. Therefore chips of corrugated cardboard, so pressed into a log, are not allowed to open and expand with heat because of the vertical arrangement and the glued corrugations.

Accordingly, there exists a need for an artificial firelog manufacturing apparatus that provides the capability to recycle pre-waxed corrugated cardboard boxes into firelogs that are more structurally rigid and that burn more efficiently, using horizontally disposed segments, over that which is presently known in the art. The present invention satisfies those needs, as well as others, and overcomes the deficiencies found in currently known artificial firelog producing machines.

BRIEF SUMMARY OF THE INVENTION

The present invention is an apparatus which converts standard wax coated corrugated cardboard sheets into artificial firelogs, or firestarter chips. The apparatus can therefore create firelogs from the wax-coated corrugated material that would otherwise be disposed of within landfills. Recycling this wax-coated material by means of this apparatus can create the equivalent of 600 million, 5-pound firelogs annually.

The invention produces artificial firelogs or firestarter chips, by first slicing waxed corrugated cardboard sheets into strips, and then cutting the strips into segments. Each cut segment retains its original corrugated structure and wax content. The wax-coated corrugated cardboard segments are then compressed and shaped longitudinally into firelogs which are generally cylindrical. The longitudinal orientation of the segments, whose corrugated structure has been retained, coupled with the memory effect exhibited by the compressed corrugated cardboard, results in a more efficient burn as the segments open up to increase airflow. Furthermore, by adding wax, or wax-like materials, any form of new, remnant, or recycled unwaxed corrugated cardboard can be processed into artificial firelogs and firestarters.

By way of example and not of limitation, the artificial firelog producing apparatus of the present invention generally comprises a cardboard strip cutting mechanism, a segment cutting mechanism, and a conveyor compression mechanism. The strip cutting mechanism employs a plurality of upper circular blades with teeth juxtaposed axially, and a plurality of lower circular blades with teeth juxtaposed axially such that the cutting edge of the upper circular blades overlap the cutting edge of the lower circular blades whose interaction cuts the waxed corrugated cardboard sheets into waxed corrugated cardboard strips. A segment cutting mechanism in the form of a cutting reel is disposed adjacent to the lower circular blade which then cuts the strips of waxed corrugated cardboard into segments. A conveyor compression mechanism in the form of an auger is positioned beneath the cutting reel and terminates in a log forming die for conveying and compressing the corrugated segments into a log shaped extrusion.

The upper and lower circular blades in the strip cutting mechanism effectively meter and slice multiple waxed corrugated cardboard sheets fed therein into waxed corrugated cardboard strips. The waxed corrugated cardboard strips are then fed through the cutting reel which cuts the waxed corrugated cardboard strips into waxed corrugated cardboard segments. The waxed corrugated cardboard segments are then fed into the conveyor compression auger for transport and compression into a log die. As the conveyor compression auger transports the waxed corrugated cardboard segments, the segments are horizontally disposed around the housing between rifling in a circular interlocking manner and are gradually compressed and forced into the log die. The log die compresses and shapes the waxed corrugated cardboard segments into artificial firelogs. Alternately the exit portion of the housing may be configured to perform the functions of the log die; however this precludes changing log forms without major changes to the apparatus. Firestarter chips are produced by bypassing the auger and log die.

Use of a conveyor compression auger results is a significant improvement over punch press-type machines, because the conveyor compression auger horizontally (based on the longitudinal axis of the firelog) flattens the waxed corrugated cardboard segments, as opposed to vertically flattening or crushing the cardboard segments which, as a result, form cold joints in logs produced from these piston style systems. The conveyor compression auger with its internal rifling also eliminates cold joints in the firelog by spinning the flattened chips horizontally and interlocking them throughout the log, thus eliminating the likelihood of the firelog breaking into segments on the fireplace grate. The horizontal (longitudinal) orientation also allows the segments to expand and burn off the exterior of the log, layer after flattened layer. As each flattened corrugated segment is being consumed by the flames, it expands from the memory effect in the corrugations which thereby allows the air to flow through the segment for a more efficient burn. Once a segment has been consumed, it falls away as the next layered segment starts burning. This burning sequence continues until the entire log has been consumed. Therefore the inventive apparatus retains the corrugation structure and creates a longitudinal segment orientation to provide for the manufacture of firelogs which do not easily break and which burn in a similar manner to genuine wood bark.

An object of the invention is to provide an apparatus capable of processing pre-waxed corrugated cardboard to produce artificial firelogs.

Another object of the invention is to provide an apparatus capable of producing artificial firelogs more efficiently than firelog producing machines presently known or available.

Another object of the invention is to provide an apparatus capable of reliably feeding, slicing and cutting waxed corrugated cardboard sheets and paper sheets into waxed corrugated cardboard segments and paper segments mix.

Another object of the invention is to provide an apparatus capable of reliably slicing and cutting waxed corrugated cardboard sheets and waxed corrugated cardboard segments without the need of removing the wax or with the result of destroying the corrugations within.

Another object of the invention is to provide an apparatus capable of producing artificial firelogs without the necessity of adding glue or wax.

Another object of the invention is to provide an apparatus that produces firelogs without cold joints.

Another object of the invention is to provide an apparatus that produces a firelog with horizontally interlocking arranged segments.

Another object of the invention is to provide an apparatus wherein waxed corrugated cardboard segments are transported and compressed into an artificial firelog in which the segments are spun horizontally and disposed radially in an interlocking manner around the outside of the firelog, so that each sequential flattened layer of segments expands open when burning.

Another object of the invention is to provide an apparatus which is capable of producing firestarter chips.

Another object of the invention is to provide an apparatus which is capable of producing firestarter blends containing a variety of different materials.

Another object of the invention is to provide an apparatus capable of producing a log having a outer covering which can be used as a post.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 48 is a side view of the log die and cooling jacket of the present invention.

FIG. 49 is an end view of the cooling jacket of FIG. 48 shown from the attachment point with the conical housing shown in FIG. 46.

DETAILED DESCRIPTION OF THE INVENTION

Figure 1:
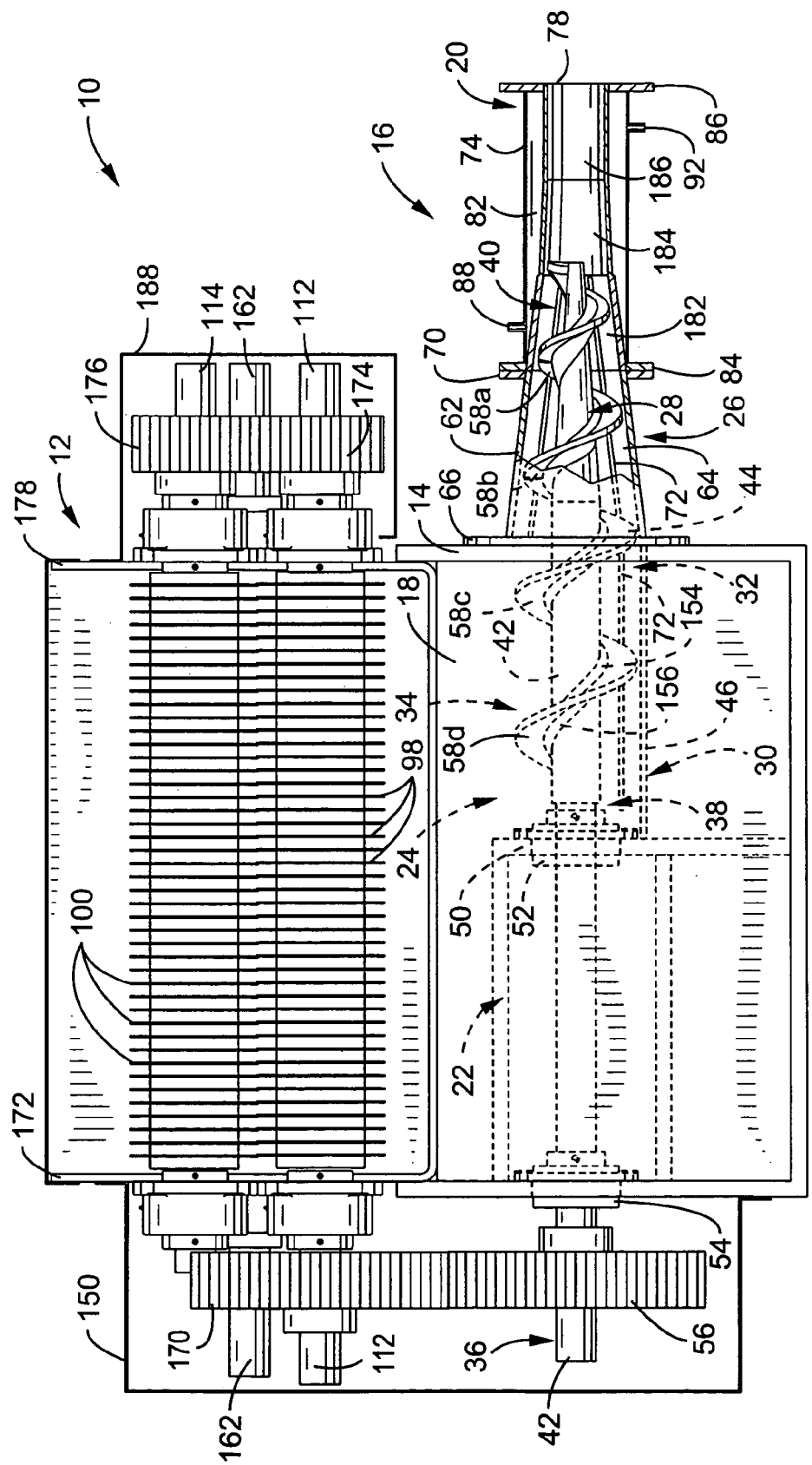
FIG. 1 is a front sectional view of an artificial firelog producing apparatus of the present invention shown with guide plates removed.
Figure 74:
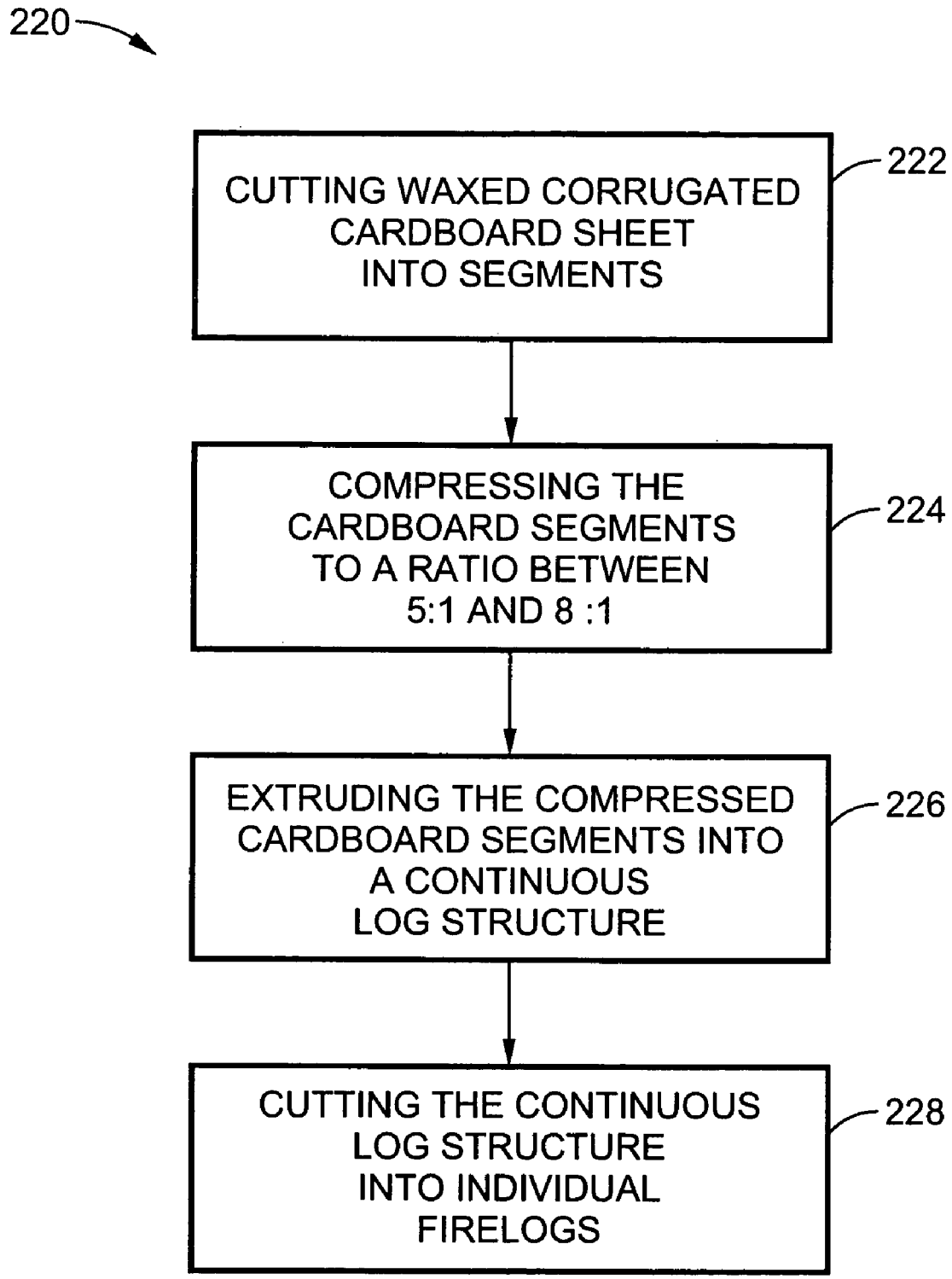
FIG. 74 is a flowchart of the steps to fabricate the firelog shown in FIG. 69.

Referring more specifically to the drawings, for illustrative purposes the present invention is embodied in the apparatus and methods generally shown and described in FIG. 1 through FIG. 74, wherein like reference numerals denote like parts. It will be appreciated that the apparatus may vary as to configuration and as to details of the parts and that the method may vary as to the steps and their sequence without departing from the basic concepts as disclosed herein.

Figure 2:
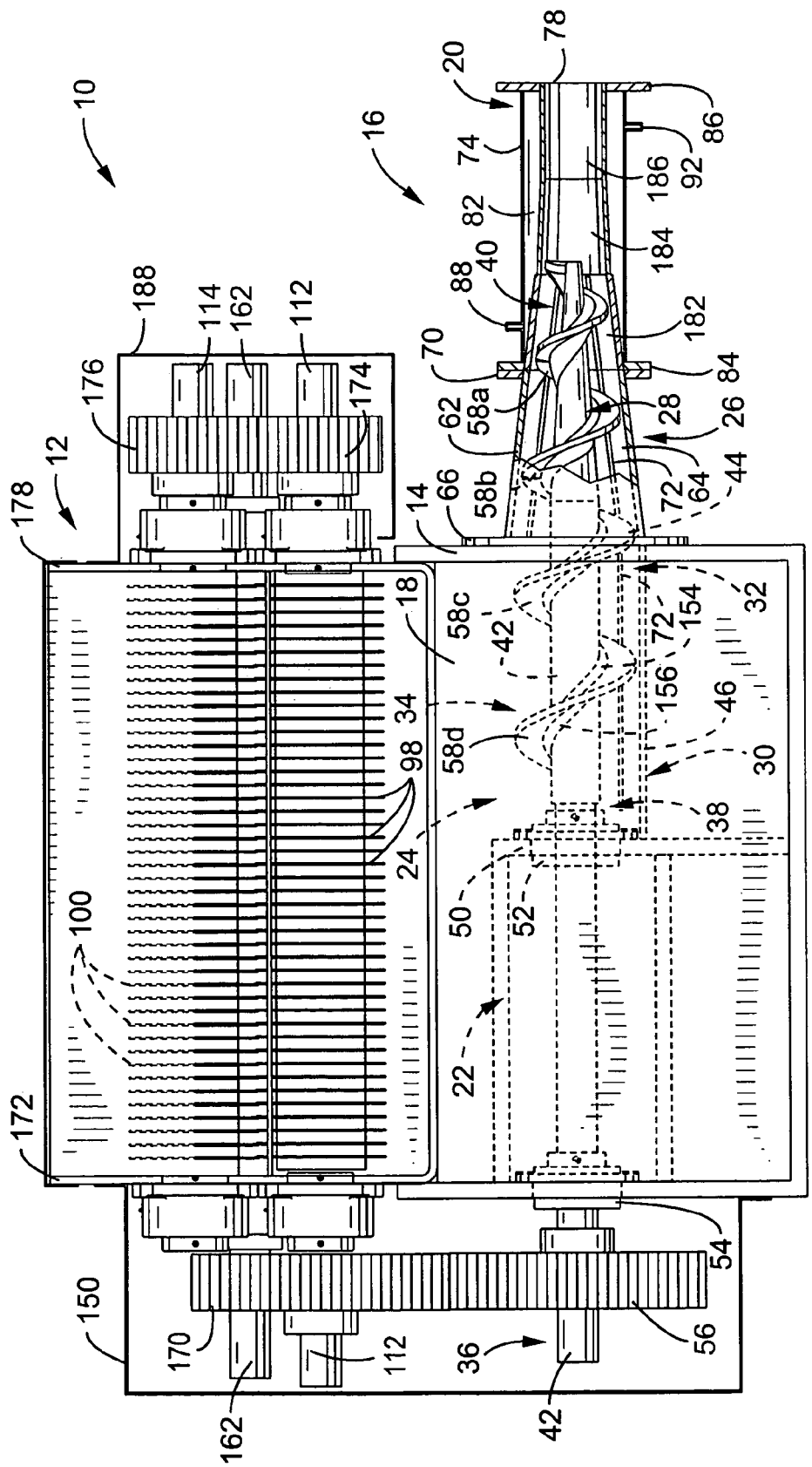
FIG. 2 is a front sectional view of the artificial firelog producing apparatus of FIG. 1 shown with guide plates installed.
Figure 3:
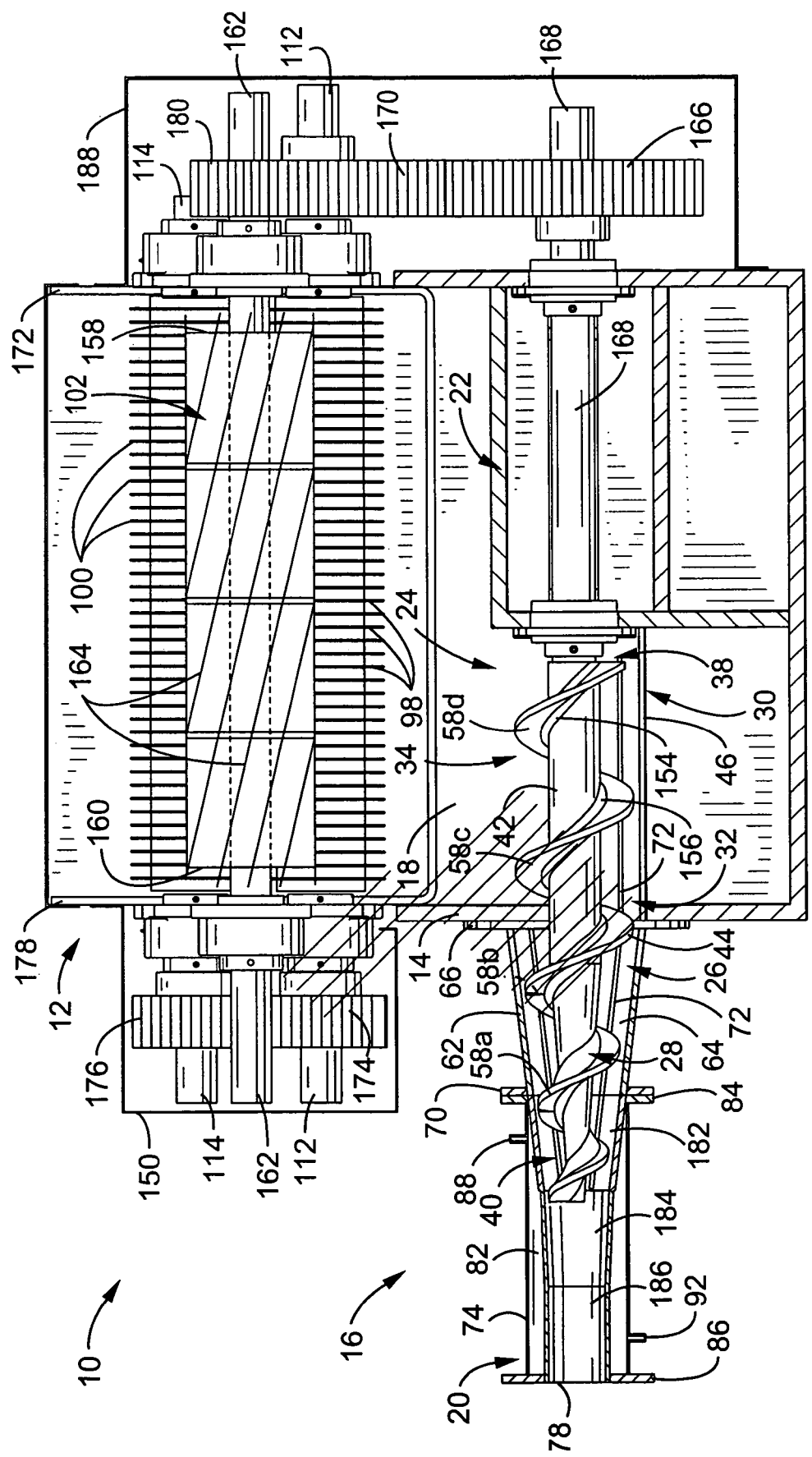
FIG. 3 is a rear view of the artificial firelog producing apparatus shown in FIG. 1.

Referring first to FIG. 1 through FIG. 3, an artificial firelog manufacturing apparatus 10 of the present invention is generally shown. Apparatus 10 generally comprises a waxed corrugated cardboard sheet cutting assembly 12, an enclosure 14, a compression auger conveyor assembly 16, a hopper 18 and a firelog die 20. Waxed corrugated cardboard sheet cutting assembly 12 is positioned on enclosure 14 above hopper 18. Hopper 18 is disposed within enclosure 14 and includes an upper opening 22, a discharge chute 24, and an auger trough 46. Discharge chute 24 is positioned adjacent auger conveyor assembly 16 so that materials exiting from discharge chute 24 will be fed into auger conveyor assembly 16 by means of auger trough 46.

Conveyor compression auger assembly 16 is a compression type which comprises an auger trough 46, an auger housing 26, a log die 20, and a conveyor compression screw 28. Auger trough 46 is a semi-circular section formed on the bottom of hopper 18 which includes an inlet end 30 and an outlet end 32. An opening 34 within the conveyor compression auger assembly 16, is in material communication with hopper 18, in which an adjacent inlet end 30 is disposed within auger trough 46. A bore or circular passageway 64 is disposed longitudinally through auger trough 46, auger housing 26, and log die 20.

Conveyor compression screw 28 has a first end 36 and a second end 40 of a shaft 42, upon which is attached an annularly disposed helical screw 44. First end 36 of shaft 42 is driven by attached spur gear 56. A shoulder 38 of the shaft 42 is adjacent inlet end 30 of auger trough 46. A second end 40 of shaft 42 on the conveyor compression screw 28 terminates adjacent recompression zone 184 of log die 20. Shaft 42 incorporates a helical screw 44, between inlet end 30 of auger trough 46 and recompression zone 184 of log die 20.

Shaft 42 is approximately 69-inches long and extends through enclosure 14, therethrough inlet end 30 of auger trough 46 at the bottom of hopper 18, and terminates within the log die 20. Shaft 42 is rotatably disposed within a first pilot bearing 54 and a second pilot bearing 52, the bearings in combination support the cantilevered section of shaft 42 as the conveyor compression screw 28 transports cardboard segments 48a therethrough. First pilot bearing 54 is located on enclosure 14, and second pilot bearing 52 is located on an opening within the support plate 50 adjacent the auger trough 46. Shaft 42 typically has an approximate diameter of 2½ inches for the first 35 inches of its length, which begins at a first end 36 and continues through first pilot bearing 54 and second pilot bearings 54 to a shoulder 38 of the shaft 42. The shaft 42 at the shoulder 38 steps up to an approximate 3 inch diameter as the cantilevered section of helical screw 44 begins. Shaft 42, containing helical screw 44, remains a constant diameter of 3 inches for 19 inches, and then tapers down in the final 15 inches to approximately a 1-inch diameter, terminating adjacent the start of the recompression zone 184, within the log die 20. There is a 6-inch standard keyway (not shown) beginning at the first end 36 of shaft 42 adjacent first pilot bearing 54. Located around shaft 42 and keyway are a nut (not shown), lockwasher (not shown) and spur gear 56.

Helical screw 44 adjacent second end 40 of conveyor screw 28 and includes 5 flights 58a-58e through to the shoulder 38 of the conveyor compression screw 28. Measuring from crest-to-crest, flights 58a-58e are spaced apart, from second end 40 to shoulder 38 of conveyor screw 28, with proportionally increasing lengths. Flight 58a has a maximum diameter of about 4-inches at second end 40 of conveyor compression screw 28 and increases to about 7½ inches in the first three flights 58a, 58b, 58c, and remains constant through flights 58d to 58f. Flight 58f is a partial flight of 4.5 inches.

Referring also to FIG. 4 through FIG. 7, auger housing 26 comprises a conical section 62 with a circular bolt flange 66 that attaches to the enclosure 14, and a square bolt flange 70, to which the square bolt flange 84 of the log die 20 is attached. At the point of attachment with the enclosure 14, the conical section 62 of auger housing 26 has an inner diameter of approximately 8-inches and an outer diameter of approximately 8½ inches. Within the enclosure 14, starting at the support plate 50, a semi-circular section comprises an auger trough 46 which partially surrounds the helical screw 44 for approximately 15-inches. The upper portion provides for opening 34 to access conveyor compression screw 28. Auger housing 26 has a conical section 62 with a 2-inch wide circular bolt flange 66 which is configured to attach to the enclosure 14. Conical section 62 begins with an approximate inner diameter of 8-inches at the enclosure 14 and tapers down to an approximate inner diameter of just under 5½ inches at the log die 20. The taper of conical section 62 is preferably between approximately 5° and 7.5°. A log die 20 is attached to the narrow end of the auger housing 26. The log die 20 receives the terminal end of the conveyor compression screw 28 within a conical zone 182. Final compression of the waxed corrugated cardboard segments is accomplished within the compression zone 184 of the log die 20, and a final shaping zone 186 determines the size and shape of the resultant artificial firelog being extruded. A circular passageway 64 extends continuously from a partial enclosure by auger trough 46, through fully encircled regions within auger housing 26 and log die 20.

Figure 50:
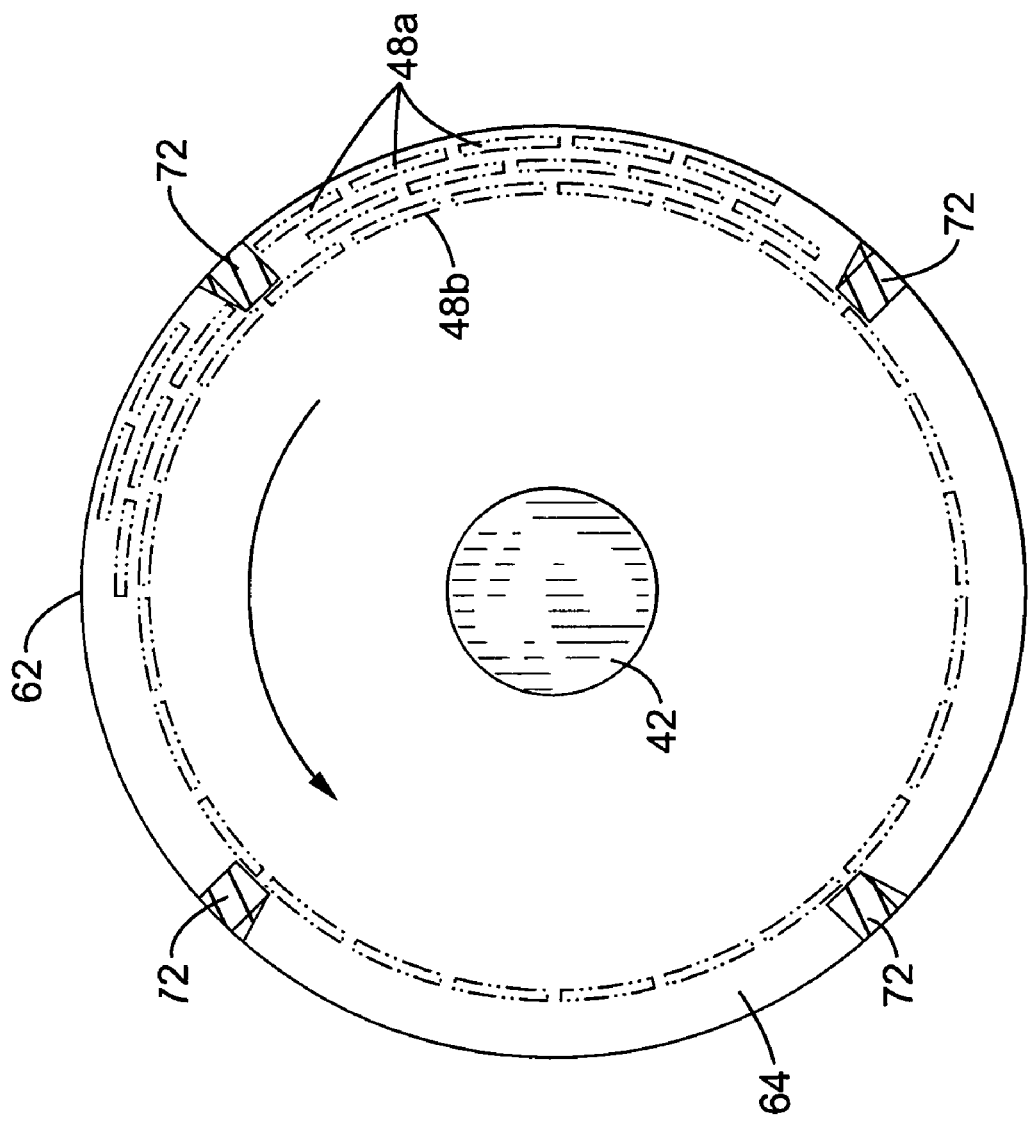
FIG. 50 is a cross-sectional schematic of the auger housing showing the cut cardboard segments during extrusion of a firelog (helical blade not shown).
Figure 71:
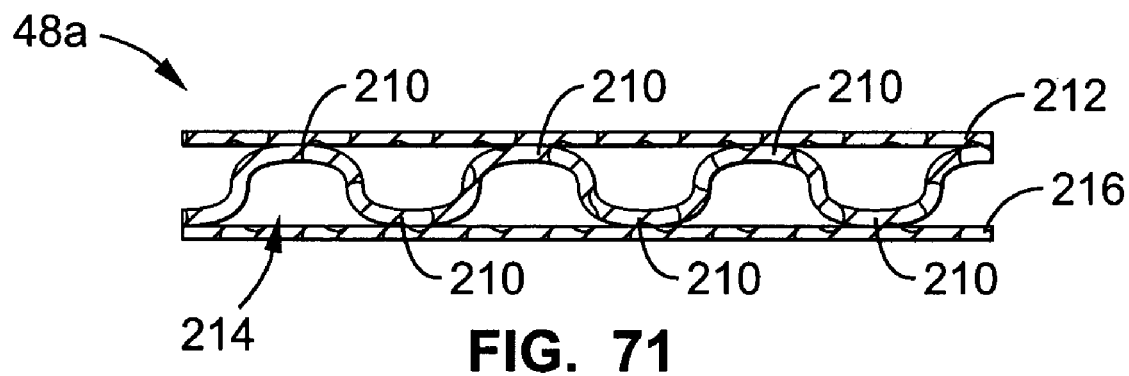
FIG. 71 is a cross sectional view of the waxed corrugated cardboard segment taken along line 71-71 in FIG. 70.
Figure 72:
FIG. 72 is a cross sectional view of the waxed corrugated cardboard segment of FIG. 71 which has been compressed.
Figure 73:
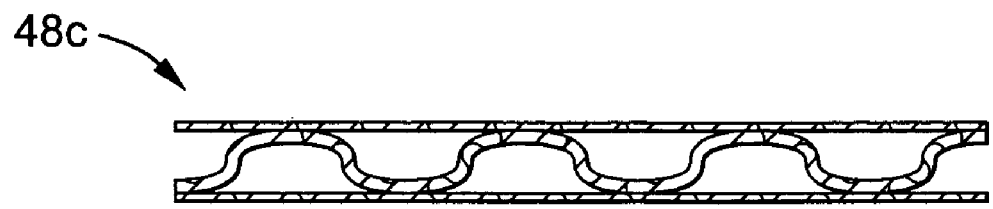
FIG. 73 is a cross sectional view of the waxed compressed corrugated cardboard segment of FIG. 72 after re-expansion when heated.

Circular passageway 64 incorporates longitudinal rifling 72 along the majority of its length, including the inner walls of the auger trough 46, the auger housing 26, and the conical zone 182 of the log die 20. The rifling 72 comprises a rail of four ¼"×¼" keyway material positioned at 60°, 120°, 240° and 300°, respectively, along the interior walls of circular passageway 64. Rifling 72 keeps waxed corrugated cardboard segments 48a moving forward while being disposed horizontally as seen in FIG. 50, thereby controlling the friction and heat generated between the interior of both the auger housing 26 and log die 20, and the waxed corrugated cardboard segments 48a. It should be noted that various waxed corrugated cardboard segment "states" are considered in the disclosure. A brief look at FIG. 71 through FIG. 73 shows that three states are addressed: (1) uncompressed waxed corrugated cardboard segments 48a, (2) compressed waxed corrugated cardboard segments 48b, and (3) partially uncompressed 48c as a result of memory characteristics when the compressed segment is heated.

Bleed holes (not shown) can be incorporated near the input end of the conical section 62 of the auger housing 26 to provide a means for introducing scented oils and colors or additional wax with anti-bacterial properties during operation of conveyor compression screw 28.

Figure 6:
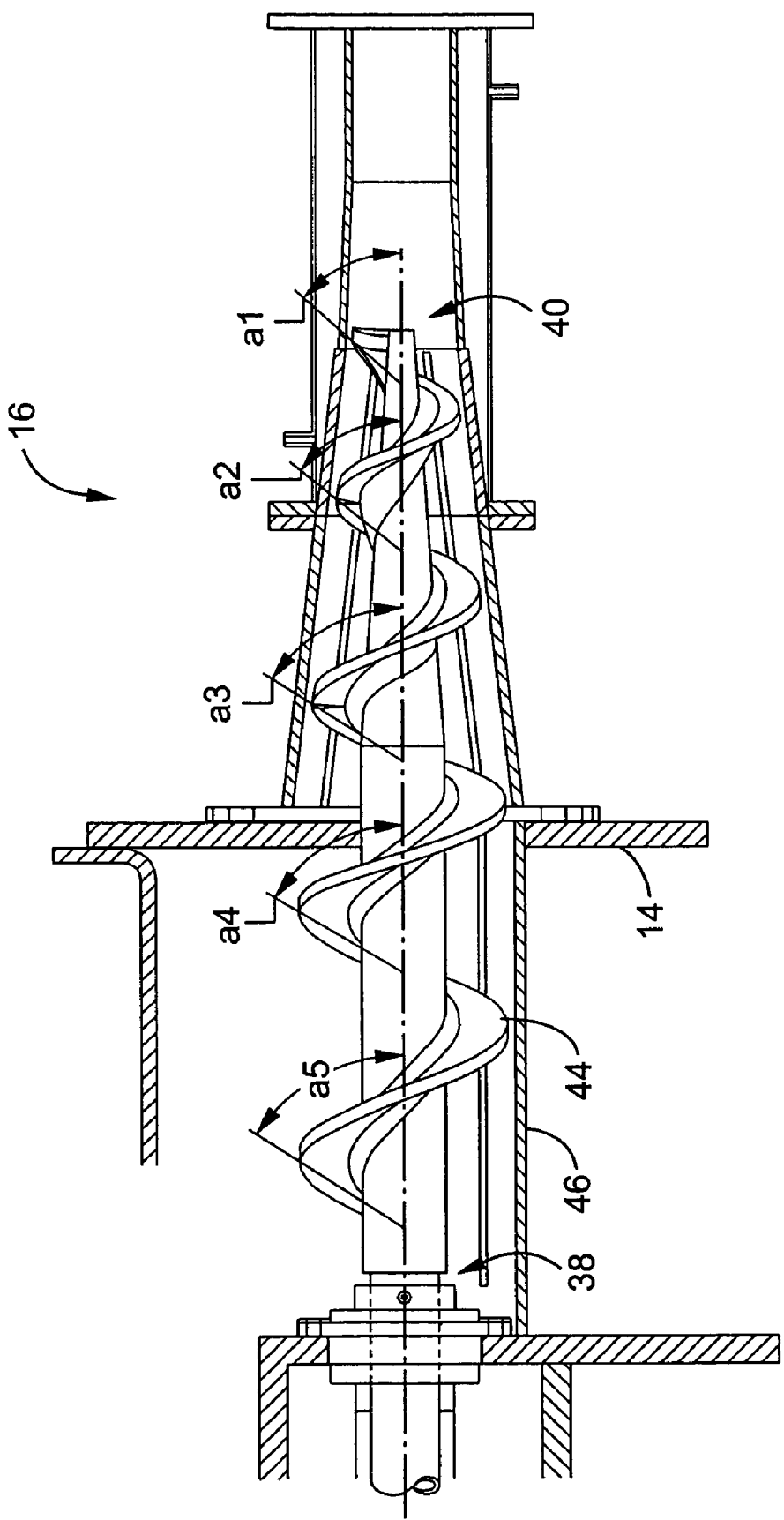
FIG. 6 is a detailed front sectional view of the conveyor compression auger assembly and firelog die of FIG. 5 showing the forward pitch of the helical blade of the conveyor compression auger assembly of the present invention.

As can be seen in FIG. 6, the flights of the helical blade are angled forward towards log die 20 at various angles to more effectively push materials therethrough. The angles a1-a5 are contained in Table 1 where a=forward angle of blade (FIG. 6), f=flight length (FIG. 8), h=blade height (FIG. 8), r=distance from exterior of blade to auger housing (FIG. 8), and s=distance between stations (FIG. 9).

Figure 7:
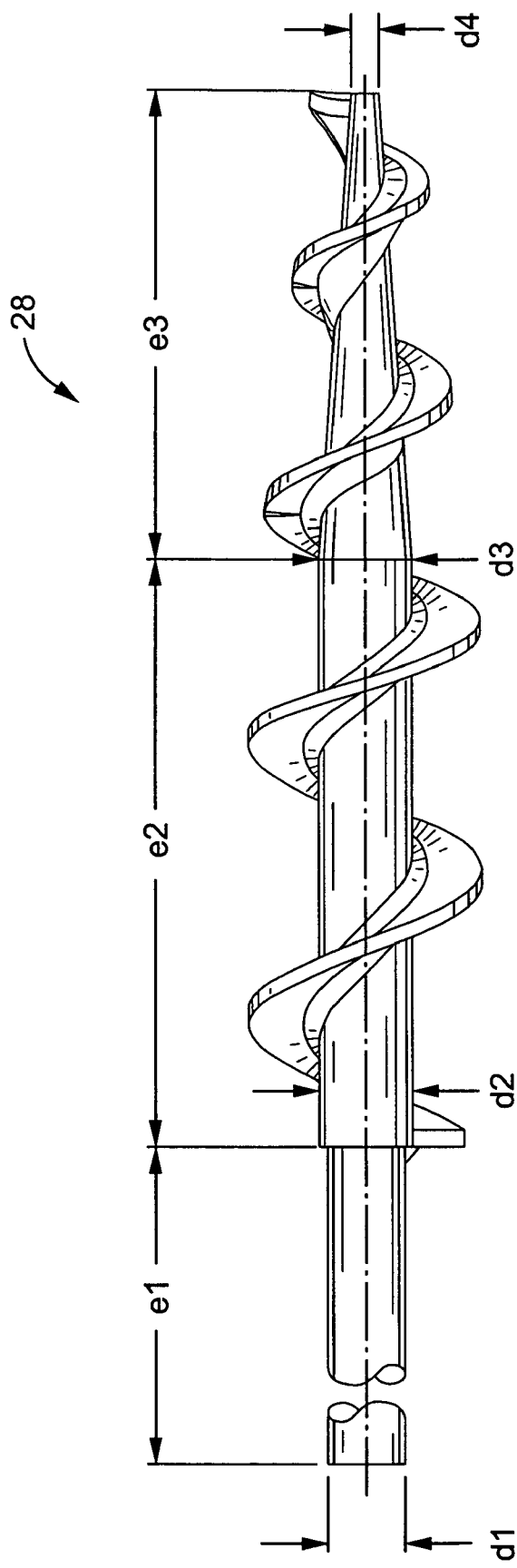
FIG. 7 is a front view of the conveyor compression auger of the present invention shown from left to right.

FIG. 7 shows the conveyor compression screw 28 in isolation. A machined shaft section of length e1 (35.00 inches) and a diameter e1 (2.500 inches) is held at both ends by bearings which stabilize the remaining cantilevered section of the shaft containing the helical auger blade. A non-tapered section of the conveyor compression screw extends within the enclosure for a length e2 (19.00 inches) with a fixed exterior diameter d2 (3.0 inches). A tapered section of length e3 (15.00 inches) with a diameter that tapers to a minimum of d4 (1.000 inches) at the end of the conical zone within the log die 20.

Figure 8:
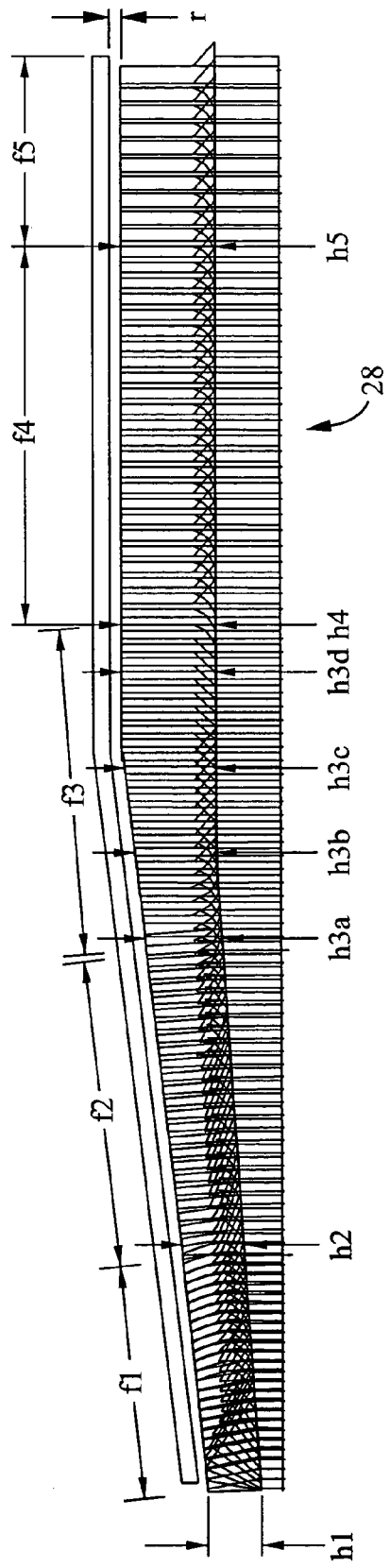
FIG. 8 is a half conical schematic of the conveyor compression auger of FIG. 7 shown from right to left.
Figure 9:
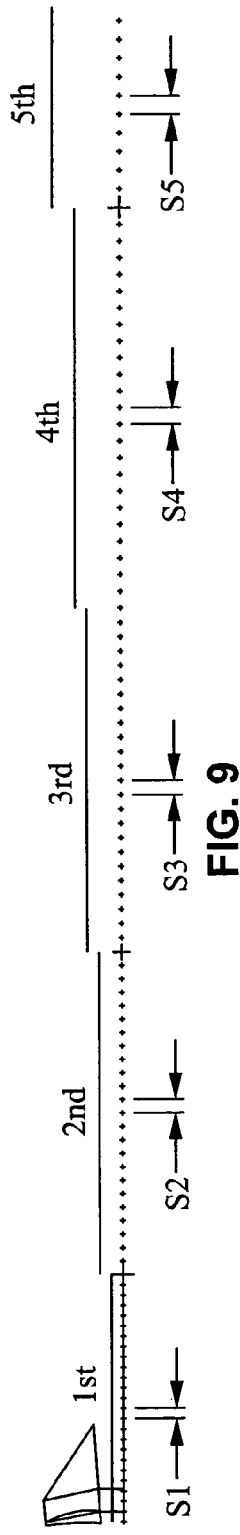
FIG. 9 is a schematic side view of the conveyor compression auger of FIG. 7 showing flights and stations along the helical auger blade as seen from right to left.
Figure 10:
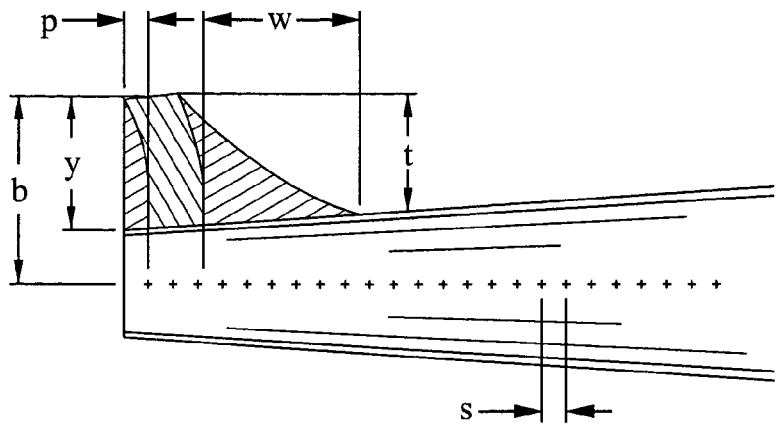
FIG. 10 is a schematic side view of the conveyor compression auger of FIG. 7 as seen from left to right showing the forward pitch and weld fill of the blade cross for the $1^{st}$ 15 degree sweep (0-15 degrees).
Figure 11:
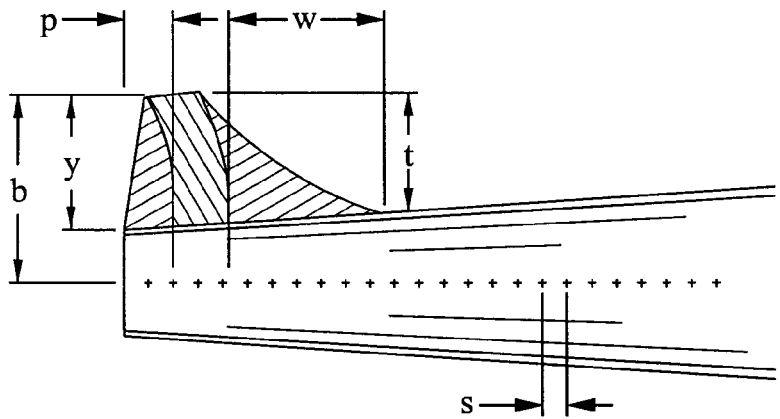
FIG. 11 is a schematic side view of the conveyor compression auger of FIG. 7 as seen from left to right showing the $2^{nd}$ 15 degree sweep (15-30 degrees).
Figure 12:
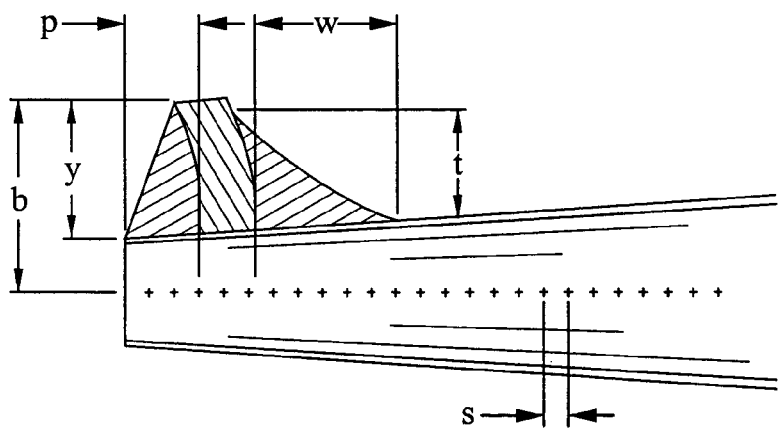
FIG. 12 is a schematic side view of the conveyor compression auger of FIG. 7 as seen from left to right showing the $3^{rd}$ 15 degree sweep (30-45 degrees).
Figure 13:
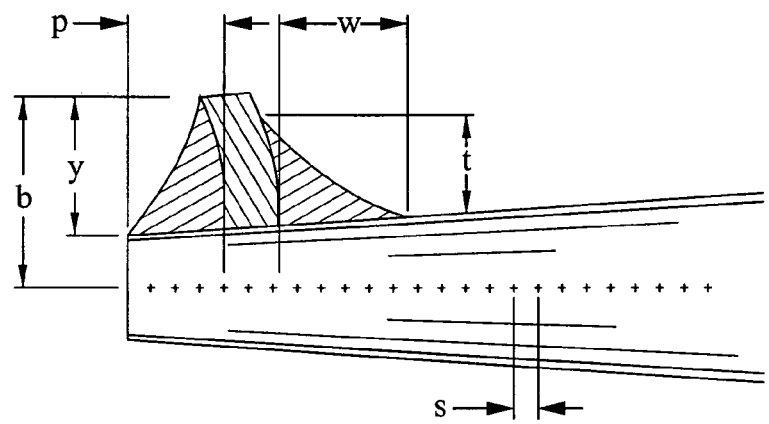
FIG. 13 is a schematic side view of the conveyor compression auger of FIG. 7 as seen from left to right showing the $4^{th}$ 15 degree sweep (45-60 degrees).
Figure 14:
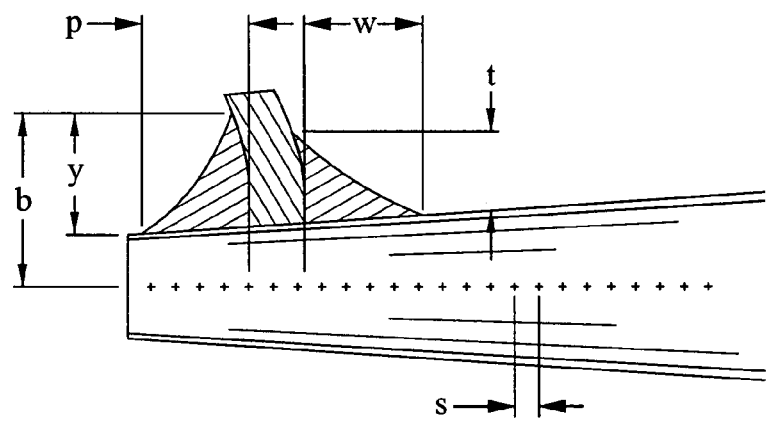
FIG. 14 is a schematic side view of the conveyor compression auger of FIG. 7 as seen from left to right showing the $5^{th}$ 15 degree sweep (60-75 degrees).
Figure 15:
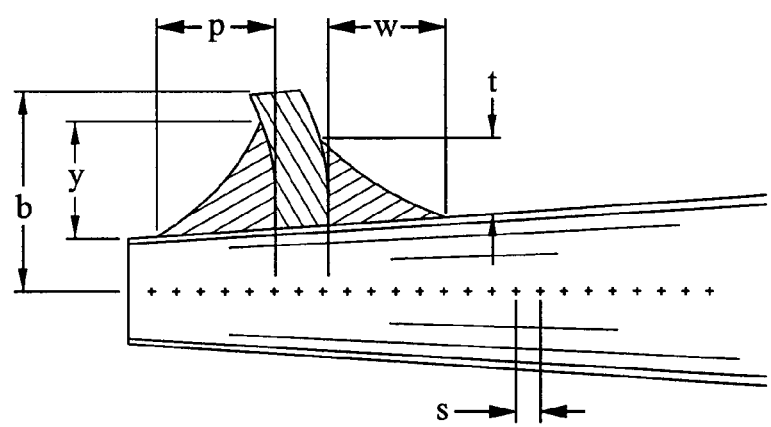
FIG. 15 is a schematic side view of the conveyor compression auger of FIG. 7 as seen from left to right showing the $6^{th}$ 15 degree sweep (75-90 degrees).
Figure 16:
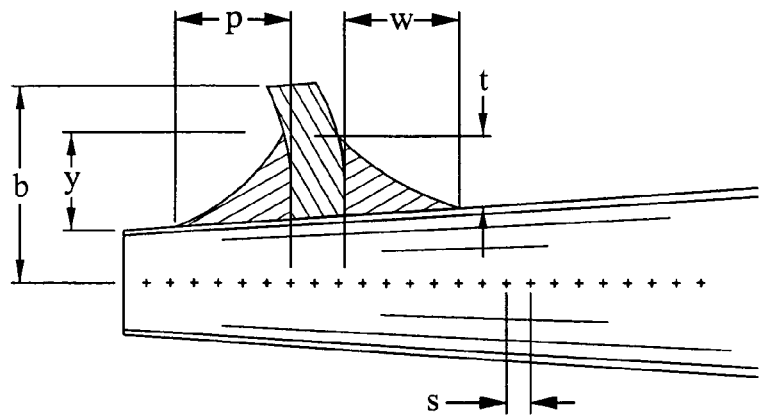
FIG. 16 is a schematic side view of the conveyor compression auger of FIG. 7 as seen from left to right showing the $7^{th}$ 15 degree sweep (90-105 degrees).
Figure 17:
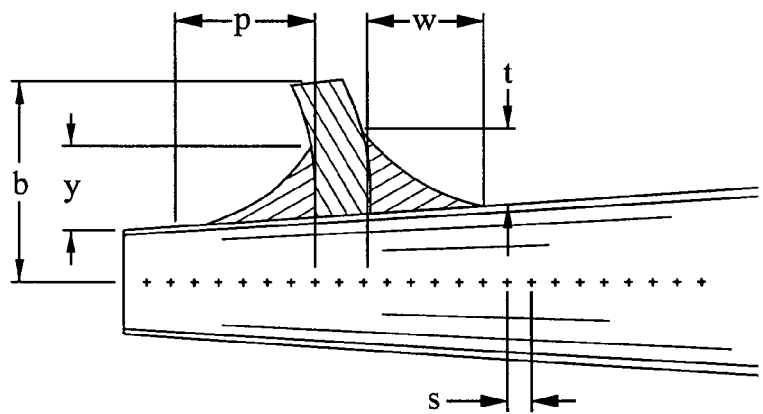
FIG. 17 is a schematic side view of the conveyor compression auger of FIG. 7 as seen from left to right showing the $8^{th}$ 15 degree sweep (105-120 degrees).
Figure 18:
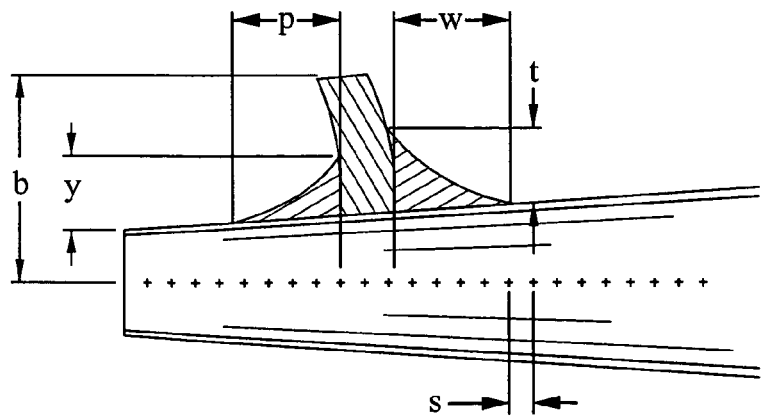
FIG. 18 is a schematic side view of the conveyor compression auger of FIG. 7 as seen from left to right showing the $9^{th}$ 15 degree sweep (120-135 degrees).
Figure 19:
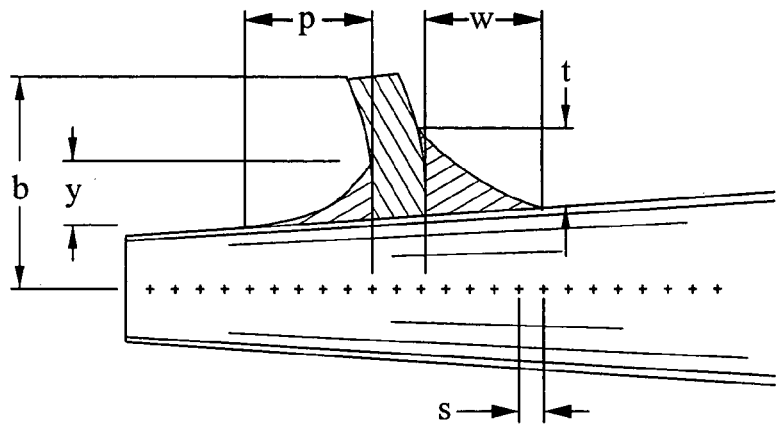
FIG. 19 is a schematic side view of the conveyor compression auger of FIG. 7 as seen from left to right showing the $10^{th}$ 15 degree sweep (135-150 degrees).
Figure 20:
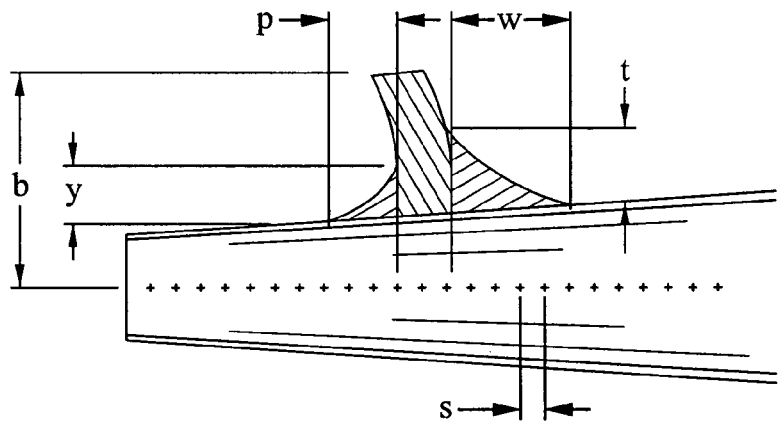
FIG. 20 is a schematic side view of the conveyor compression auger of FIG. 7 as seen from left to right showing the $11^{th}$ 15 degree sweep (150-165 degrees).
Figure 21:
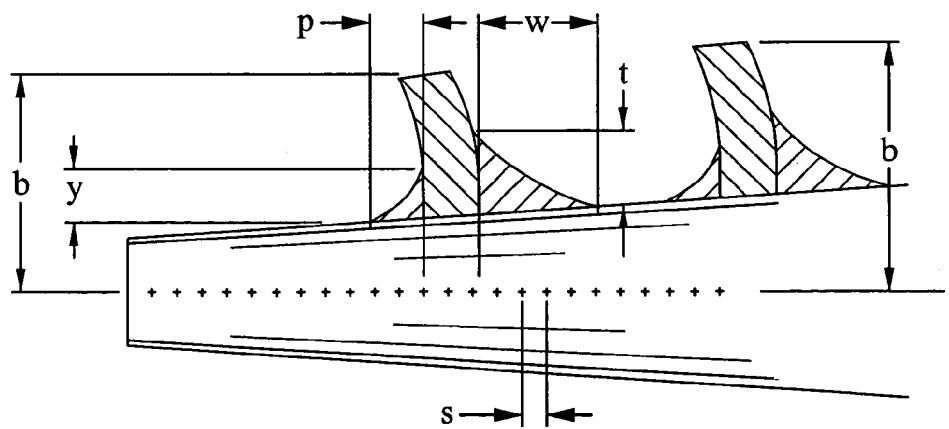
FIG. 21 is a schematic side view of the conveyor compression auger of FIG. 7 as seen from left to right showing the $12^{th}$ through $24^{th}$ 15 degree sweep (180-360 degrees).
Figure 22:
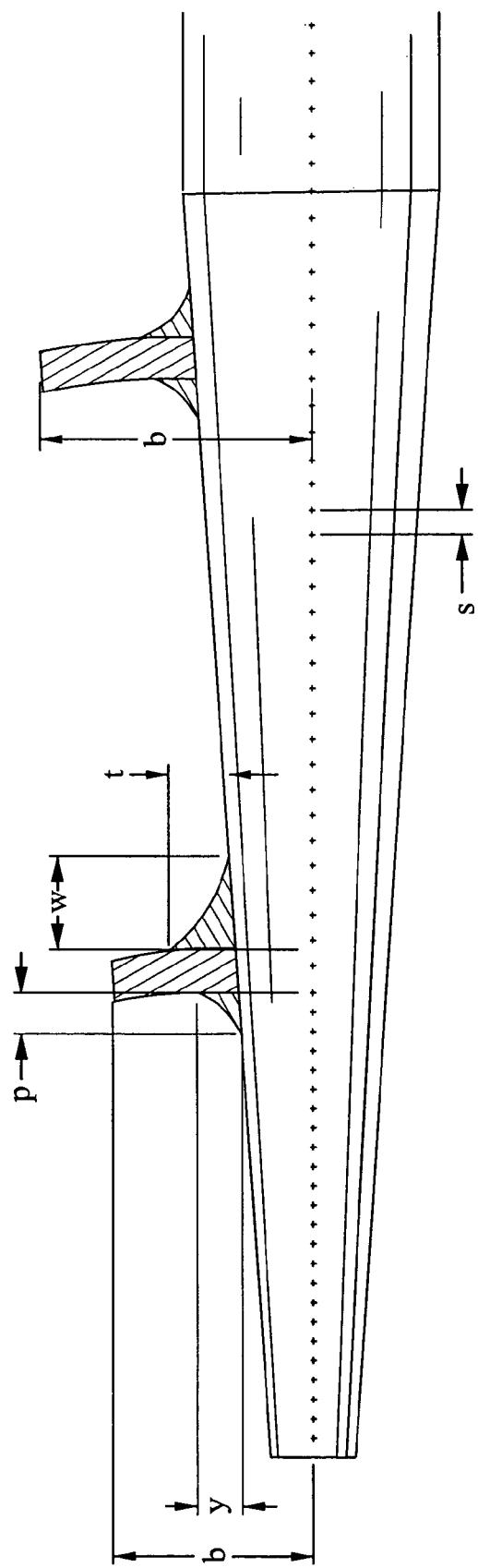
FIG. 22 is a schematic side view of the conveyor compression auger of FIG. 7 as seen from left to right showing the $25^{th}$ through $48^{th}$ 15 degree sweep of the second flight (0-360 degrees).
Figure 23:
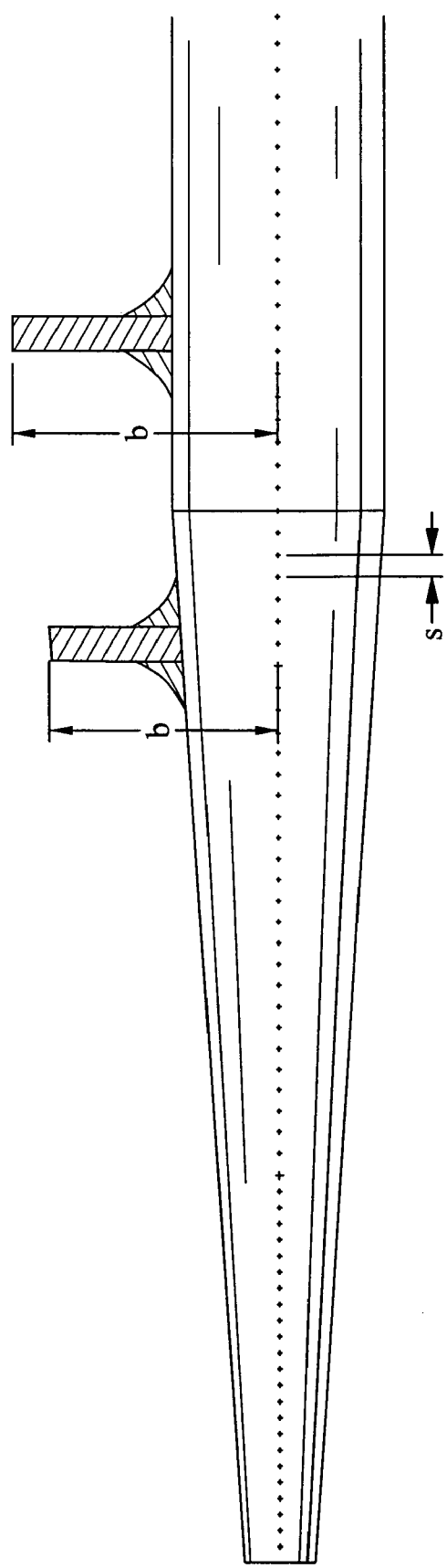
FIG. 23 is a schematic side view of the conveyor compression auger of FIG. 7 as seen from left to right showing the $49^{th}$ through $63^{rd}$ 15 degree sweep of the third flight (0-225 degrees).
Figure 24:
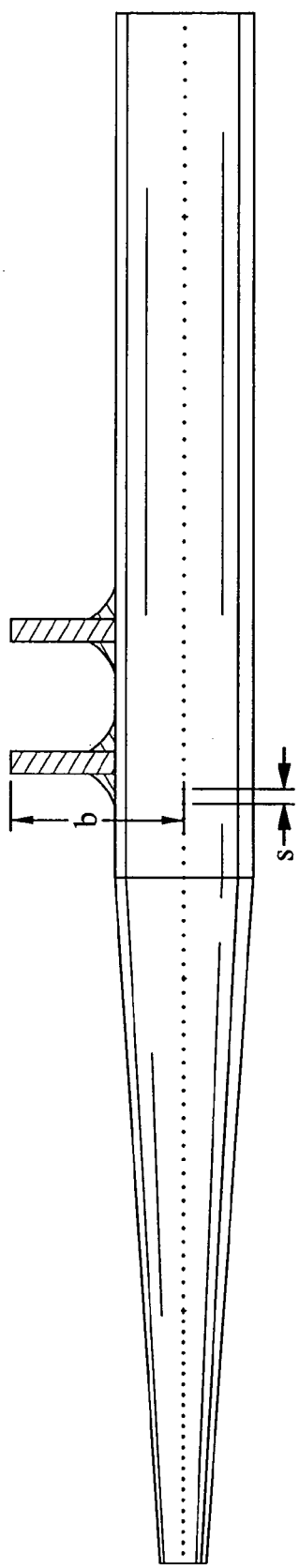
FIG. 24 is a schematic side view of the conveyor compression auger of FIG. 7 as seen from left to right showing the $64^{th}$ through $73^{rd}$ 15 degree sweep of the third flight (225-0 degrees) and the first 15 degree sweep of the fourth flight (0-15 degrees).
Figure 25:
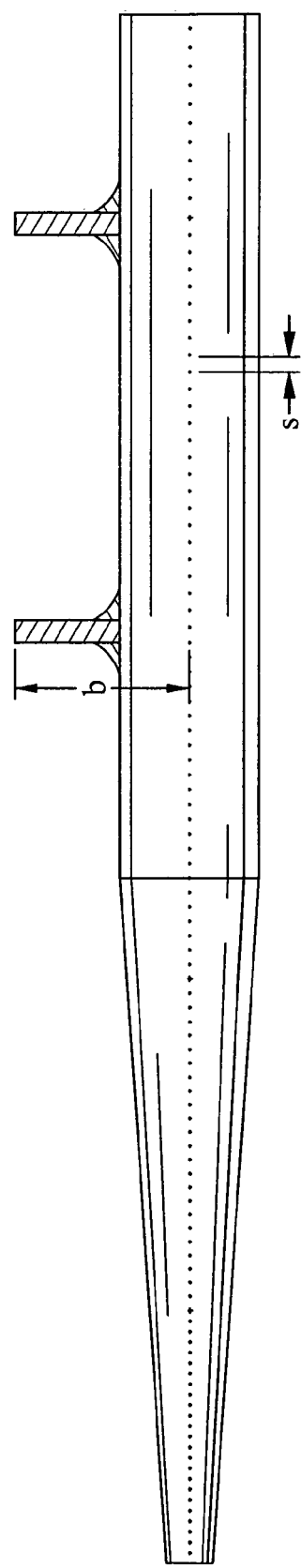
FIG. 25 is a schematic side view of the conveyor compression auger of FIG. 7 as seen from left to right showing the $74^{th}$ through $97^{th}$ 15 degree sweep of the fourth flight (30-360 degrees) and the first (0-15 degrees) of the fifth flight.
Figure 26:
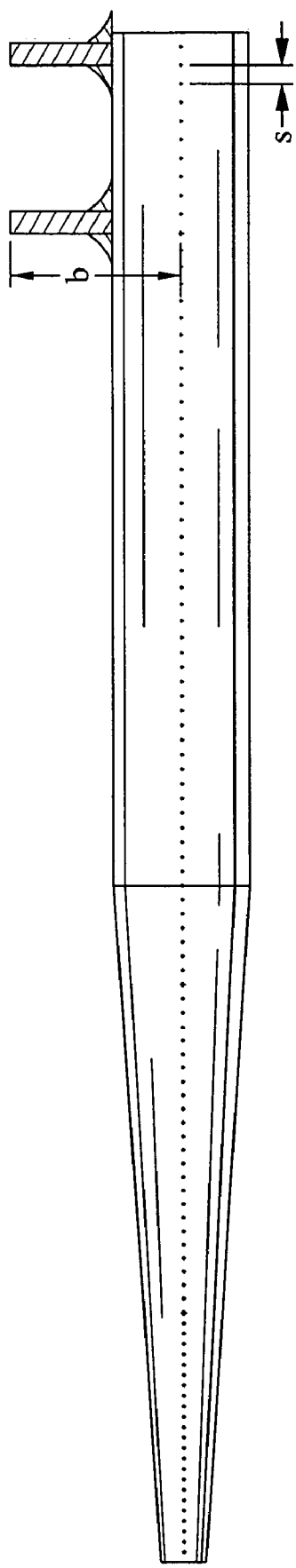
FIG. 26 is a schematic side view of the conveyor compression auger of FIG. 7 as seen from left to right showing the $98^{th}$ through $107^{th}$ 15 degree sweep of the fifth flight (30-150).
Figure 27:
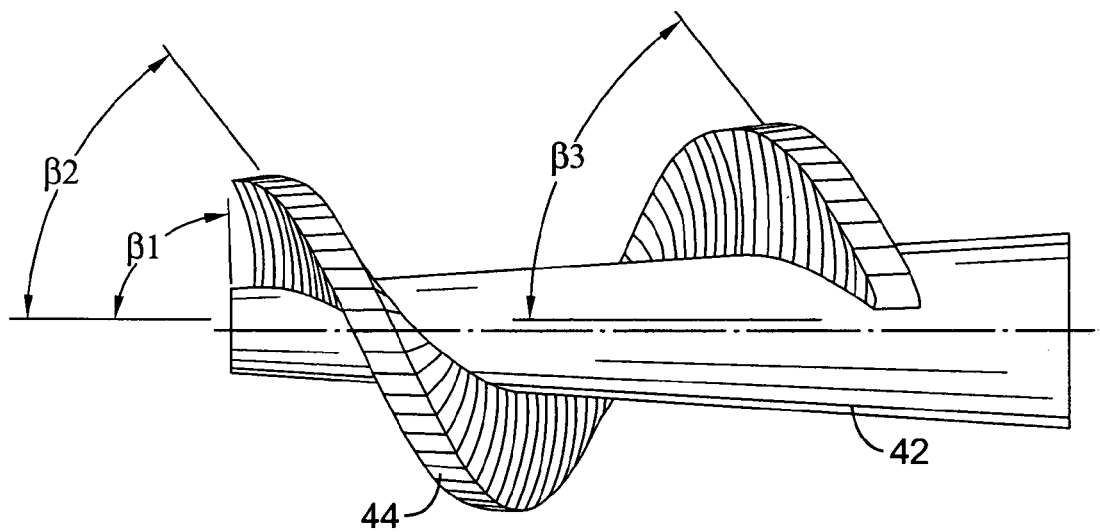
FIG. 27 is a pictorial side view of the 0-15 degree cross section of the unwelded tip of the conveyor compression auger assembly of the present invention.
Figure 28:
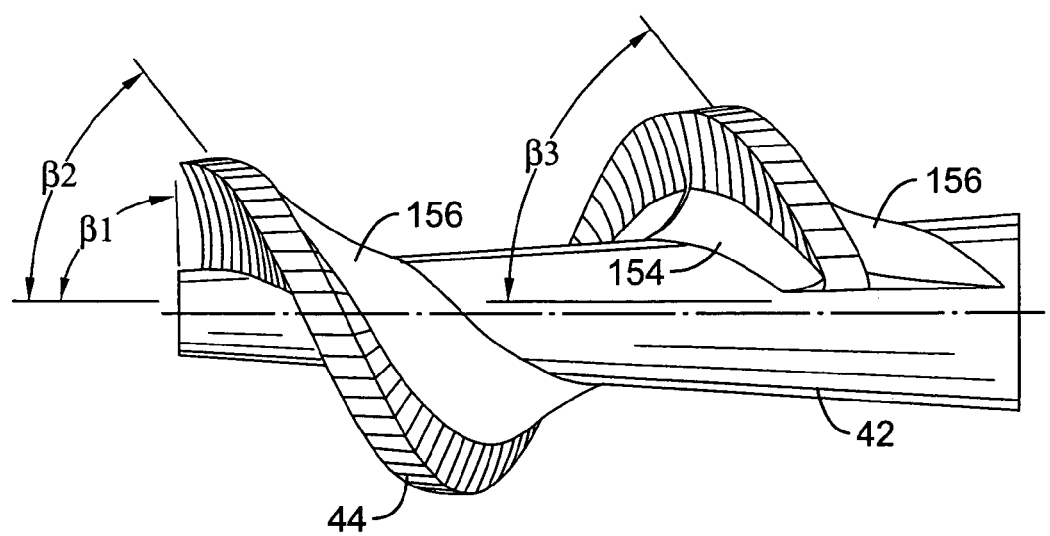
FIG. 28 is a pictorial side view of the 0-15 degree cross section of the no front weld push tip of the conveyor compression auger assembly of the present invention.
Figure 29:
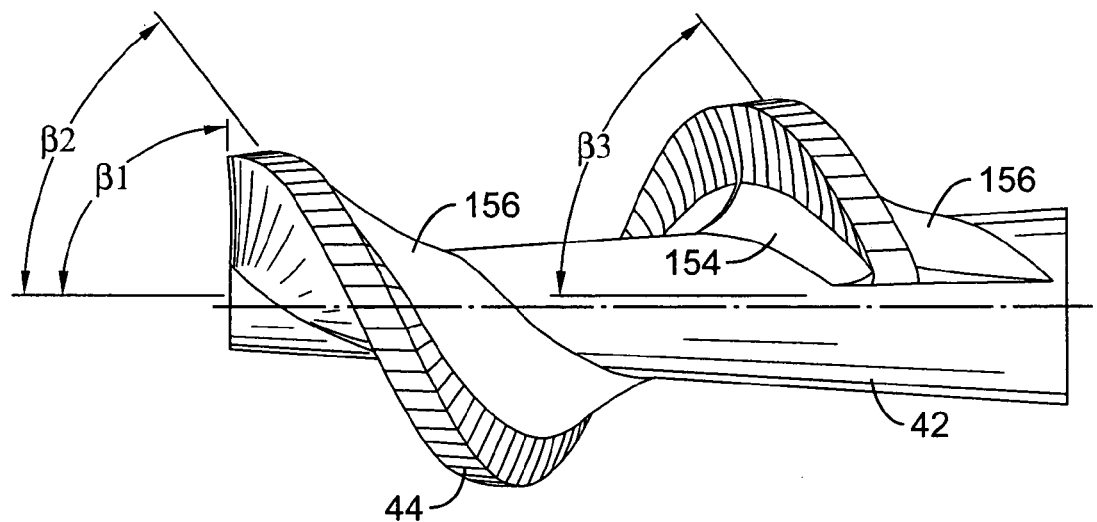
FIG. 29 is a pictorial side view of the 0-15 degree cross section of the fully welded tip and push section of the conveyor compression auger assembly of the present invention.
Figure 30:
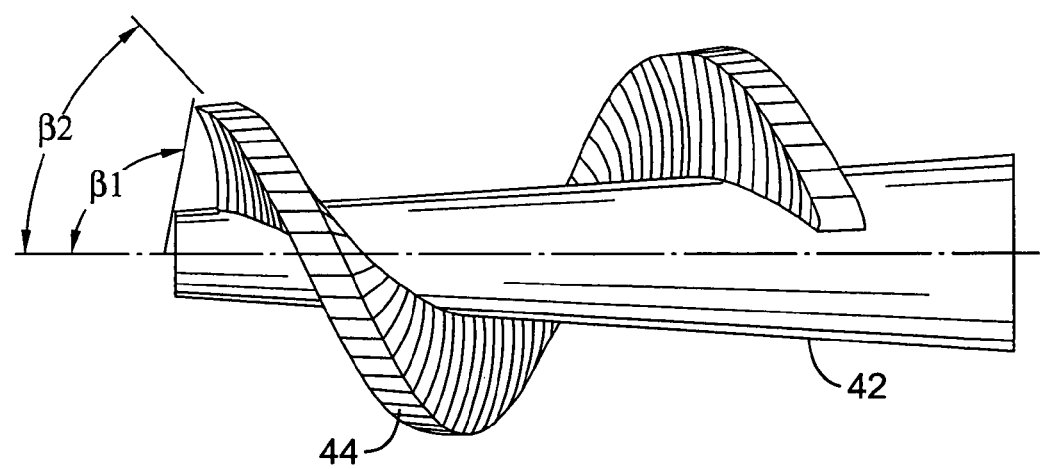
FIG. 30 is a pictorial side view of the 15-30 degree cross section of the unwelded tip of the conveyor compression auger assembly of the present invention.
Figure 31:
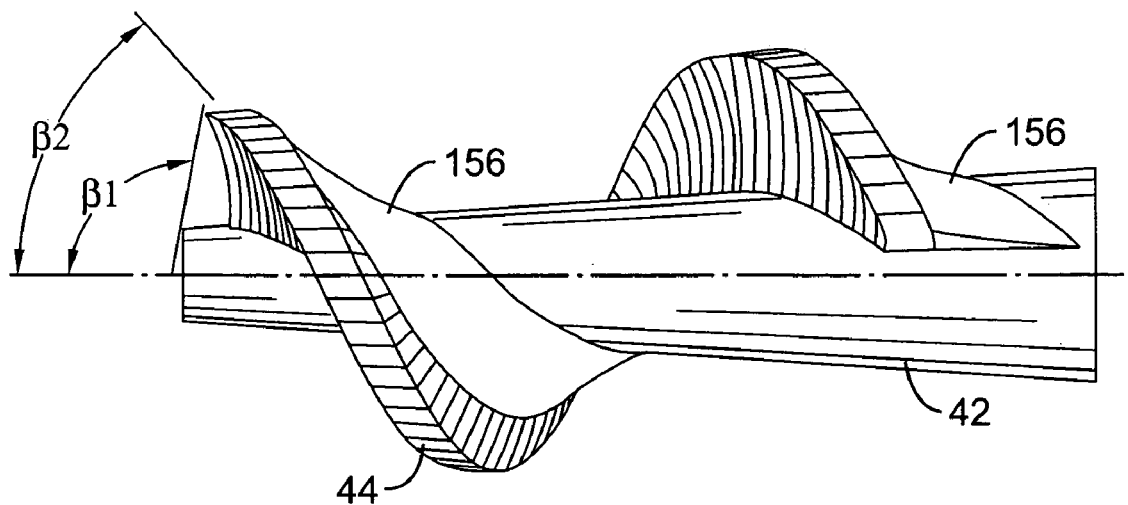
FIG. 31 is a pictorial side view of the 15-30 degree cross section of the no front weld push tip of the conveyor compression auger assembly of the present invention.
Figure 32:
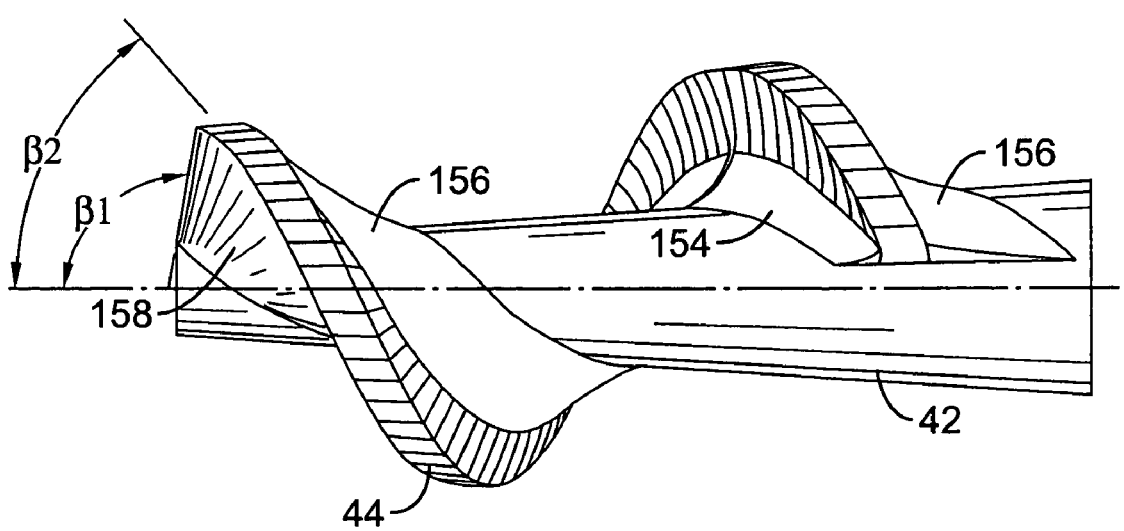
FIG. 32 is a pictorial side view of the 15-30 degree cross section of the fully welded tip and push section of the conveyor compression auger assembly of the present invention.
Figure 33:
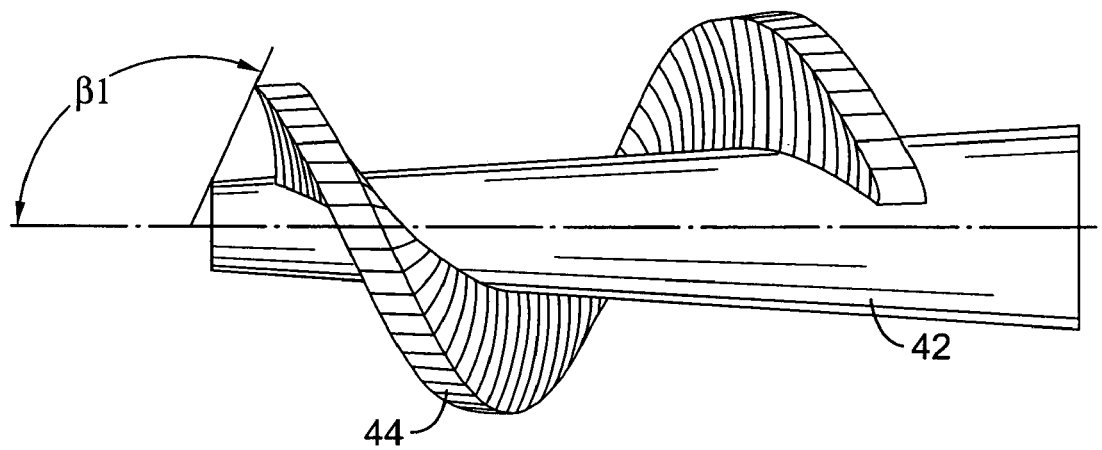
FIG. 33 is a pictorial side view of the 30-45 degree cross section of the unwelded tip of the conveyor compression auger assembly of the present invention.
Figure 34:
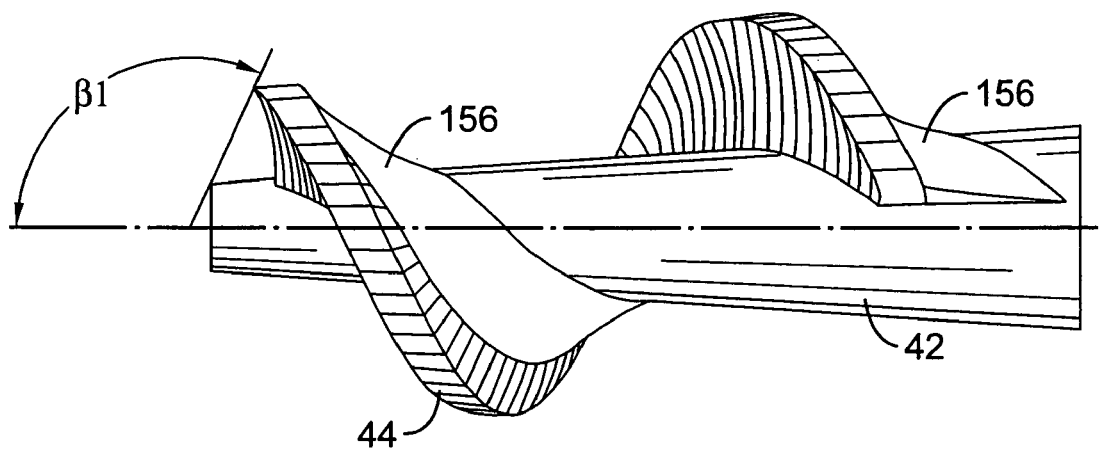
FIG. 34 is a pictorial side view of the 30-45 degree cross section of the no weld push tip of the conveyor compression auger assembly of the present invention.
Figure 35:
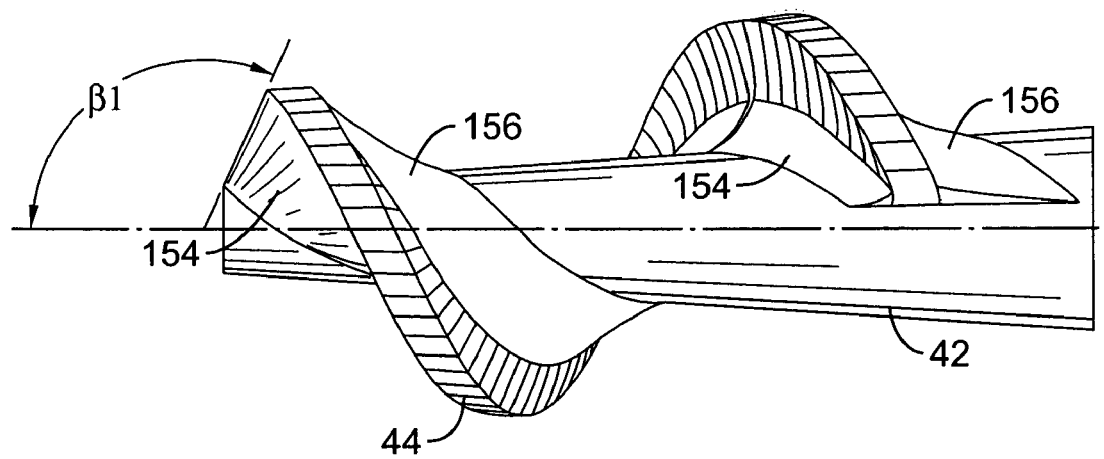
FIG. 35 is a pictorial side view of the 30-45 degree cross section of the fully welded tip and push section of the conveyor compression auger assembly of the present invention.
Figure 36:
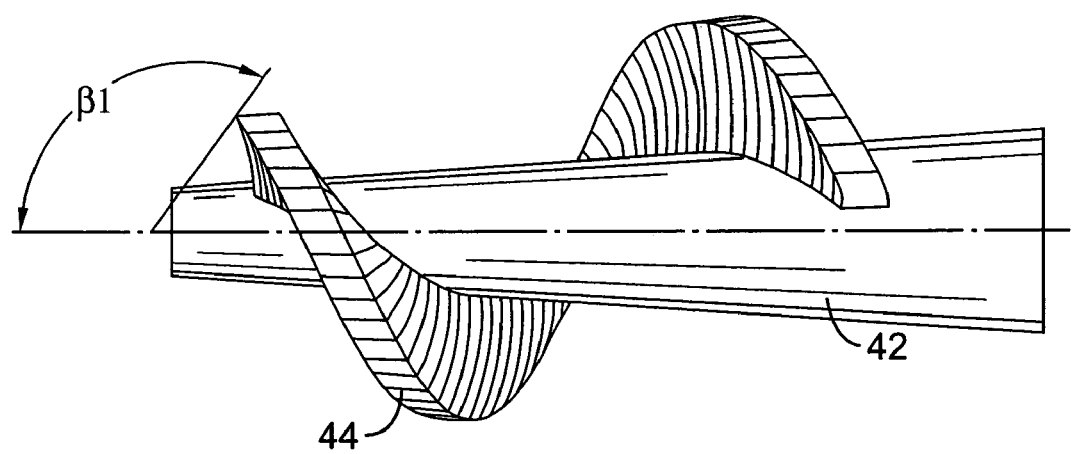
FIG. 36 is a pictorial side view of the 45-60 degree cross section of the unwelded tip of the conveyor compression auger assembly of the present invention.
Figure 37:
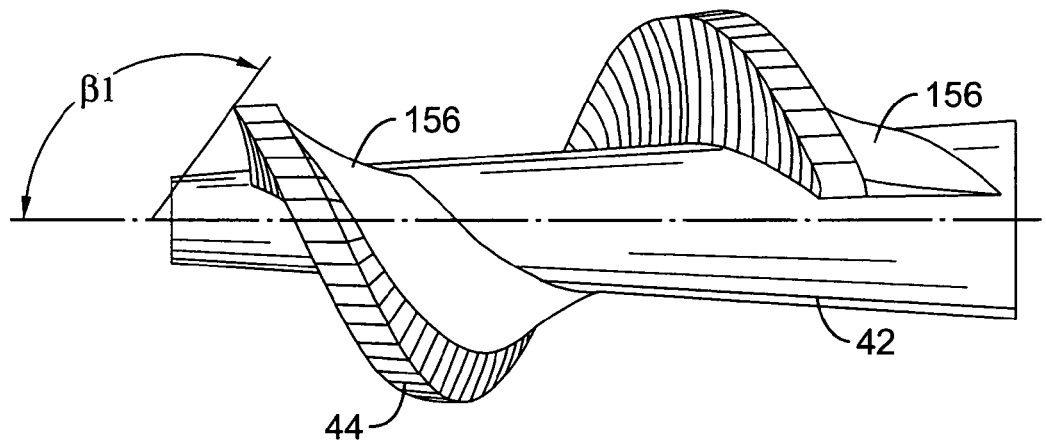
FIG. 37 is a pictorial side view of the 45-60 degree cross section of the no front weld push tip of the conveyor compression auger assembly of the present invention.
Figure 38:
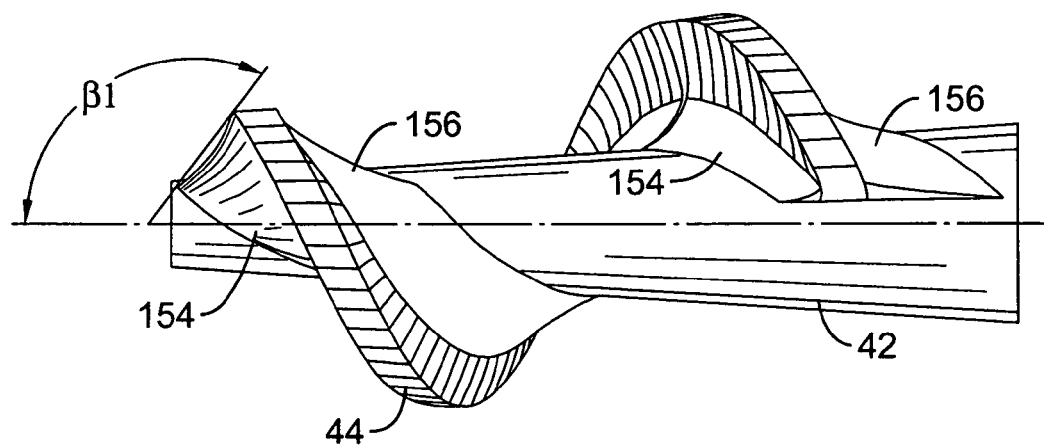
FIG. 38 is a pictorial side view of the 45-60 degree cross section of the fully welded tip and push section of the conveyor compression auger assembly of the present invention.
Figure 39:
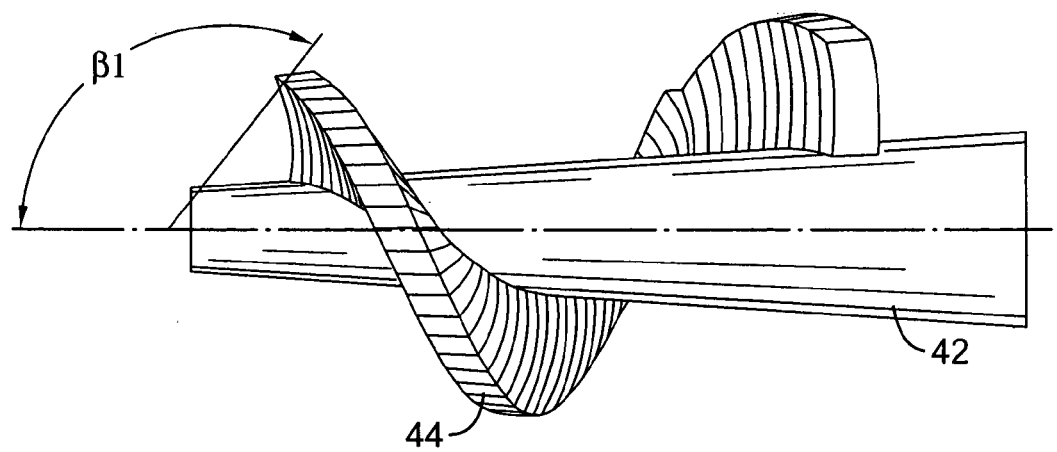
FIG. 39 is a pictorial side view of the 60-75 degree cross section of the unwelded tip of the conveyor compression auger assembly of the present invention.
Figure 40:
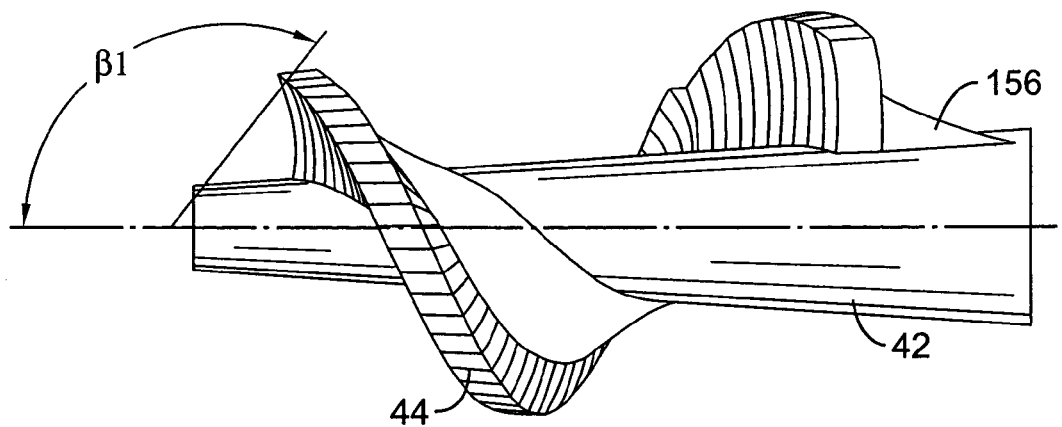
FIG. 40 is a pictorial side view of the 60-75 degree cross section of the no front weld push tip of the conveyor compression auger assembly of the present invention.
Figure 41:
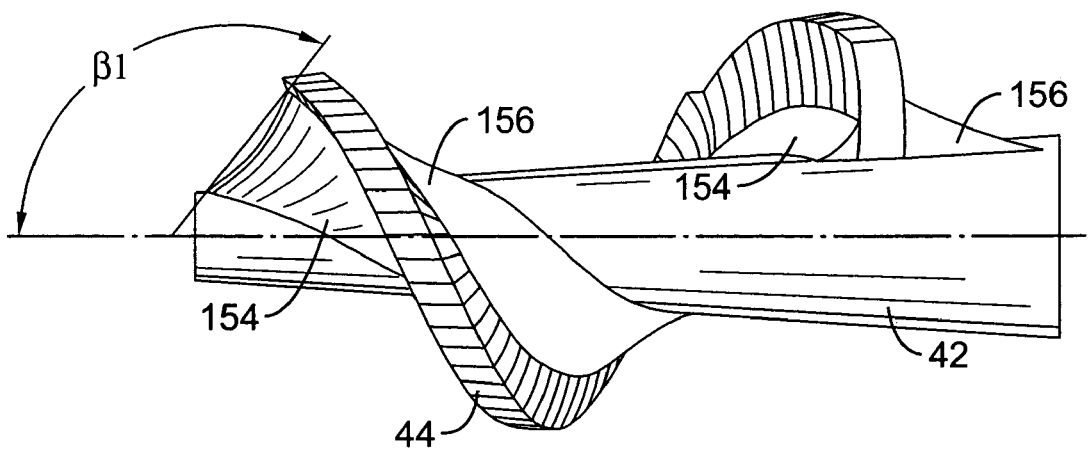
FIG. 41 is a pictorial side view of the 60-75 degree cross section of the fully welded tip of the conveyor compression auger assembly of the present invention.
Figure 42:
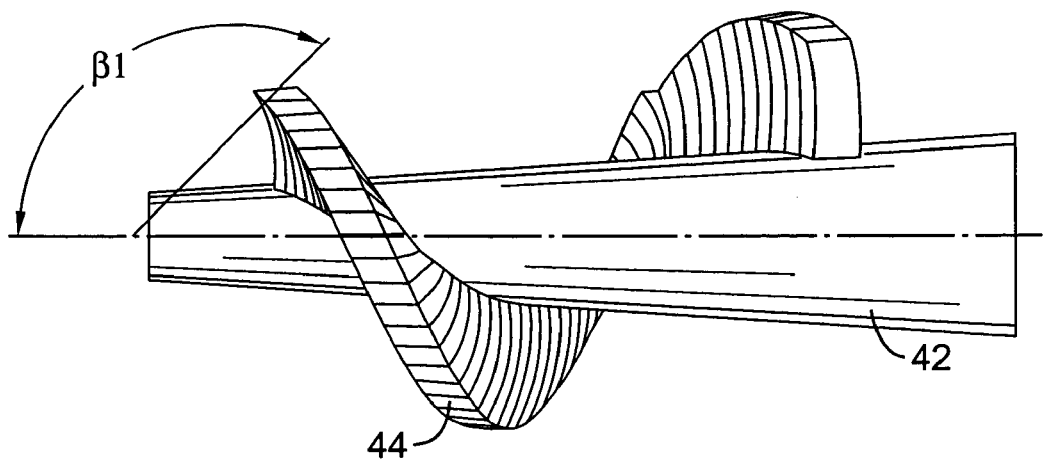
FIG. 42 is a pictorial side view of the 75-90 degree cross section of the unwelded tip of the conveyor compression auger assembly of the present invention.
Figure 43:
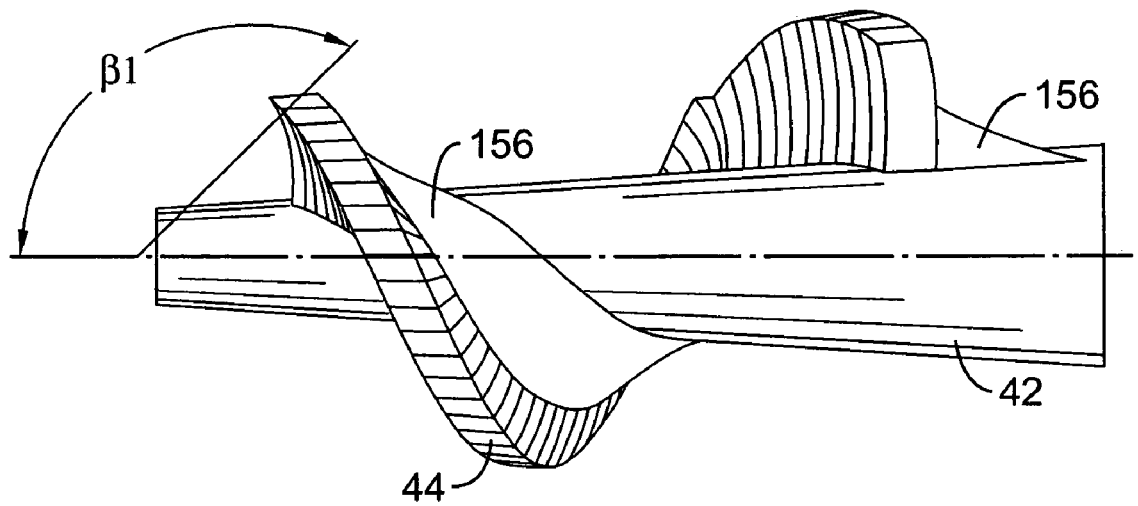
FIG. 43 is a pictorial side view of the 75-90 degree cross section of the no front weld push tip of the conveyor compression auger assembly of the present invention.
Figure 44:
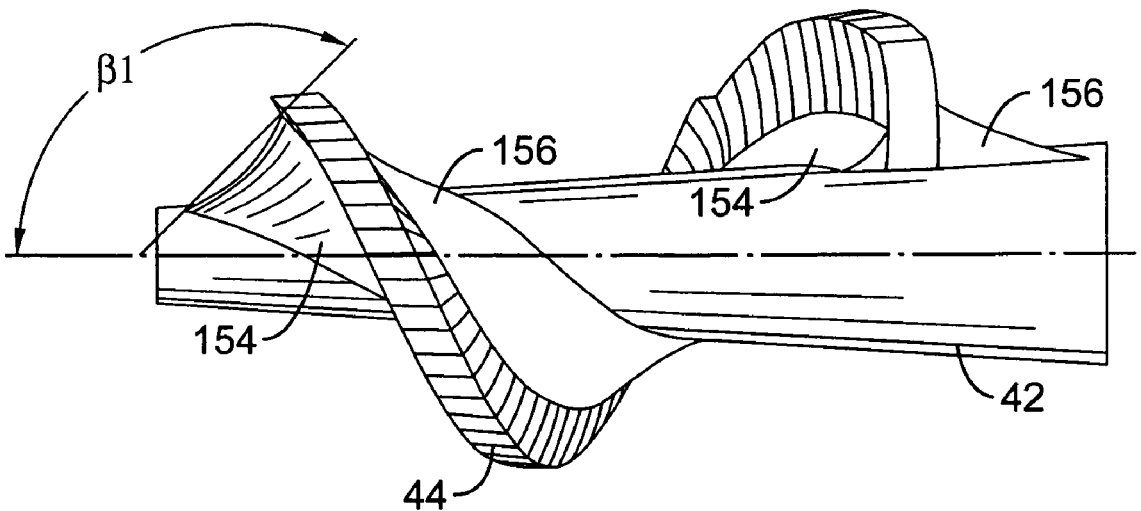
FIG. 44 is a pictorial side view of the 75-90 degree cross section of the fully welded tip and push section of the conveyor compression auger assembly of the present invention.

FIG. 8 is a conveyor compression screw 28 cross-section diagram showing dimensions marks for the five flights of its helical screw 44. The length of each flight is given by f1-f5 and the height of the blades above the shaft 42 is given by h1-h5 as provided in Table 1. It should be noted that the auger diameter correspondingly begins to taper as it enters the tapered section of the auger housing 26; the start of the taper being further broken down into sections a-d, for each of which a separate blade height value is given in Table 1. Space between the conveyor compression screw 28 and the interior of the circular passageway 64, is given by r which remains as a constant gap of (0.2500). The gap of r provides spacing for the rifling 72 within the compression screw housing so that the segments can be interlocked on their way to complete formation within the log die 20. FIG. 9 is a diagram of the five flights which depicts stations along the length of the conveyor compression screw 28. The angular displacement of the conveyor compression screw changes by 15° between stations and the distance between each station varies with flight. The distance between stations is given by s1-s5 within Table 1.

Representative blades are shown in FIG. 10 through FIG. 26 with noted dimensions given within Table 2 where St No.=Station Number, Fit=flight number(s), Degree=degrees covered within flight, s=station-to-station distance, b=blade height, p=length of pusher side weld buildup, w=length of rear-side weld buildup, y=height of pusher weld buildup, t=height of rear-side weld buildup, g=forward tilt of blade. Measurements are provided individually for the stations along the first half-flight, as a number of dimensions vary, whereas the remaining station data is given for ranges of stations (12 to 24, 24 to 48, etc.). It can be seen from the progression of these figures the manner in which the blade height increases, the amount of tilt decreases, and the pusher-side and rear-side weld buildups get less pronounced on sections of the blade further away from the exit point of the log extrusion. It must be remembered that these measurements, being provided for the preferred embodiment, in no way limit the practice of the invention; numerous obvious dimensional and structural changes may be introduced without inventive effort or departure from the underlying principles thereof.

Figure 45:
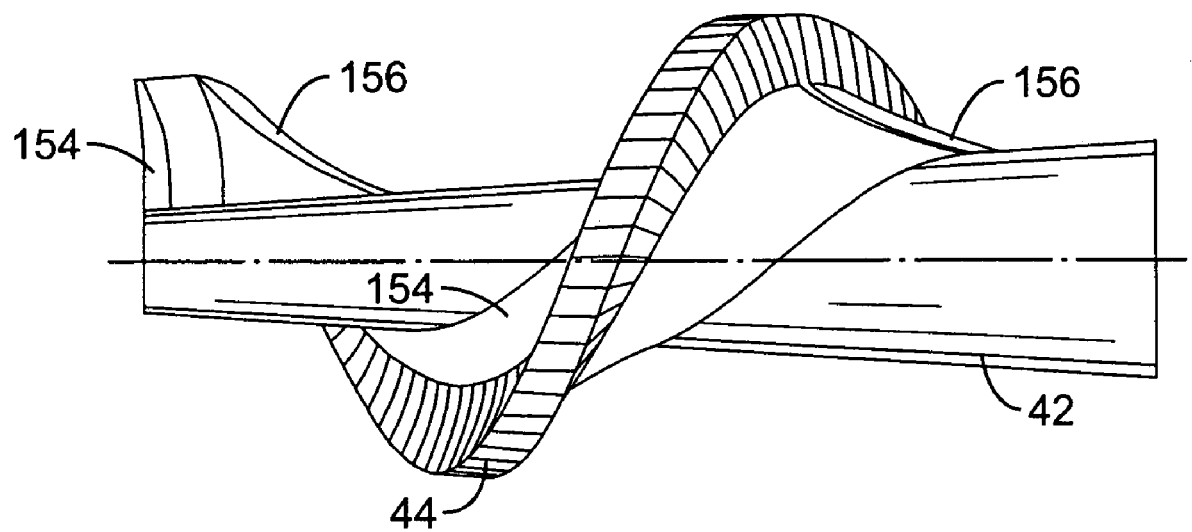
FIG. 45 is a pictorial opposing side view of the 15-30 degree cross section of FIG. 32.

Representative blades of the first 90 degrees of the conveyor compression screw are shown pictorially in FIG. 27 through FIG. 45 at various stations. Each section shows the helical screw 44 attached to the shaft 42 of the conveyor compression screw 44 in an unwelded state, without a pusher-side weld buildup 154, and then with both a pusher-side front weld buildup 154 and a rear-side weld buildup 156. The chosen fillet material used within this embodiment is a buildup of weld material, however any conventional fillet material may be used. The angles $\beta_1$, $\beta_2$, $\beta_3$, as shown in the figures, are given in Table 3. FIG. 45 shows the important first 15 degree section of the screw from the opposite direction wherein the exit face of the blade can be seen.

Figure 47:
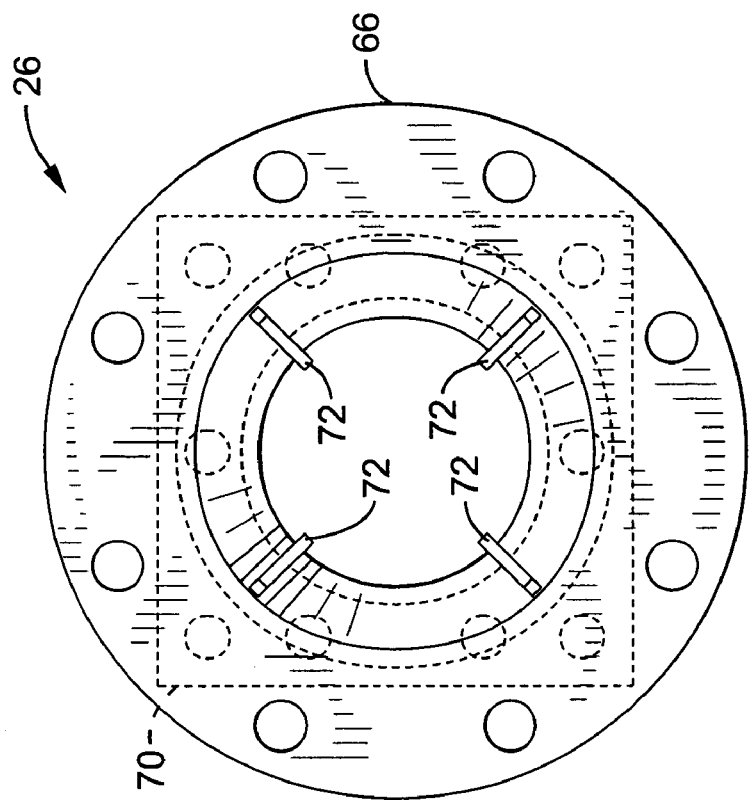
FIG. 47 is an end view of the conical housing shown in FIG. 46 seen from the attachment point with the enclosure.
Figure 46:
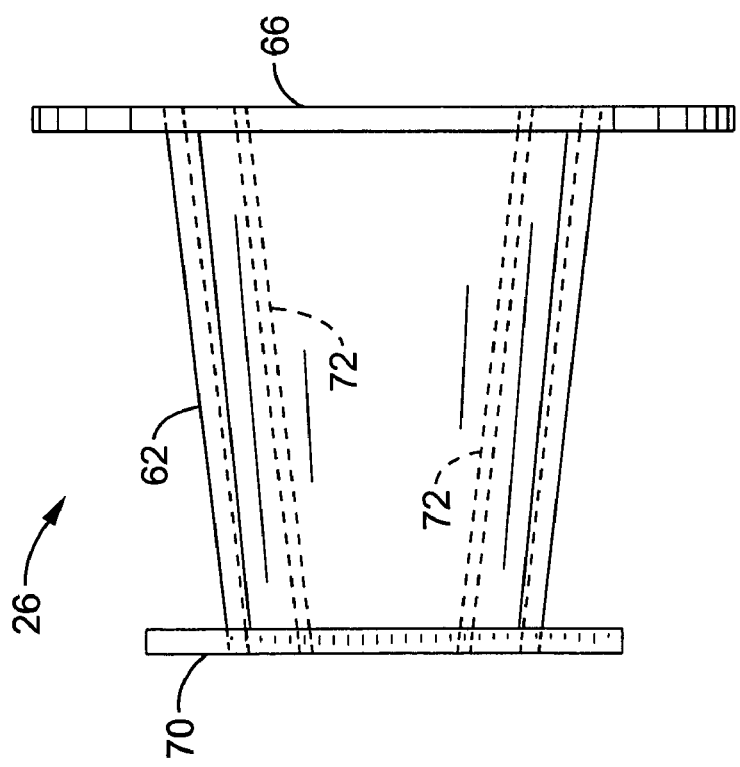
FIG. 46 is a side view of the conical housing portion of the conveyor compression auger assembly of the present invention.

FIG. 46 and FIG. 47 show a side and end view of the auger housing 26 as shown in FIG. 1. A conical section 62 of the auger housing provides a taper matching that of the conveyor compression screw (not shown). The auger housing 26 is attached to the enclosure (not shown) by means of a circular bolt flange 66. A log die (not shown) is attached by means of a square bolt flange 84, preferably of a ½"×10"×10" configuration to the auger housing 26. Rifling 72 is shown within the interior of the conical section 62 of the auger housing 26.

FIG. 48 and FIG. 49 show a side and an end view of the log die 20 as shown in FIG. 1. The log die 20 comprises a housing 74, approximately 18 inches in length, containing both an inlet side 76 and a material outlet side 78. The log die is attached to the conical auger housing via square bolt flange 84 wherein the inner opening 80 of the log die receives the waxed compressed cardboard material pushed by the conveyor compression screw (not shown). Three sections, or zones, exist along the length of the log die: a conical zone 182 wherein the shape and rifling 72 of the conical section 62 are continued, a recompression zone 184 wherein the material after leaving the rifled sections is recompressed, and a shaping zone 186 wherein the waxed corrugated cardboard segment material is finally shaped such that the material exiting the log die 20 is of the desired diameter and shape for the artificial firelog being produced.

As it has been found desirable to control the temperature of the log die 20 during the formation of artificial firelogs 90, the log die 20 is configured with a cooling jacket 82 surrounding the inner walls of the log die. The cooling jacket 82 allows the temperature of the log die to be controlled by varying the amount and temperature of incoming coolant which is routed into input 88 through the cooling jacket 82. The coolant exits the cooling jacket 82 by way of the outlet 92. Alternately the log die could be cooled with conventional means such as fans, cooling fins or similar heat dissipation structures. In addition it may be desirable to cool the conveyor housing 26. The conveyor housing may be cooled with conventionally known methods, such as a combination of cooling fins and fans. A cooling jacket (not shown), may also be added to the conical auger housing section 62 in similar manner to the cooling jacket 82 of the log die 20.

FIG. 50 is a schematic of the alignment of waxed corrugated cardboard segments 48 around the periphery of the conveyor compression screw upon shaft 42. A clearance of approximately ¼" exists between the outer circumferential edges of the helical blade and the circular passageway 64, as seen in FIG. 50, the clearance allows interlocking of the compressed circumferentially-disposed waxed corrugated cardboard segments 48a near the inner surfaces of conical section 62 and log die 20. Because waxed corrugated cardboard segments 48 are compressed circumferentially around firelog 90, they open or expand (because of memory) with heat when burned, and the corrugations channel oxygen throughout the segments within a firelog 90. Waxed corrugated cardboard segments are more tightly twisted in the center of firelog 90, increasing their burn time. These radially disposed segments within the firelog 90, provide for easy ignition and a high burn efficiency, while the resulting flames appear similar to the burning of a genuine bark firelog.

Figure 51:
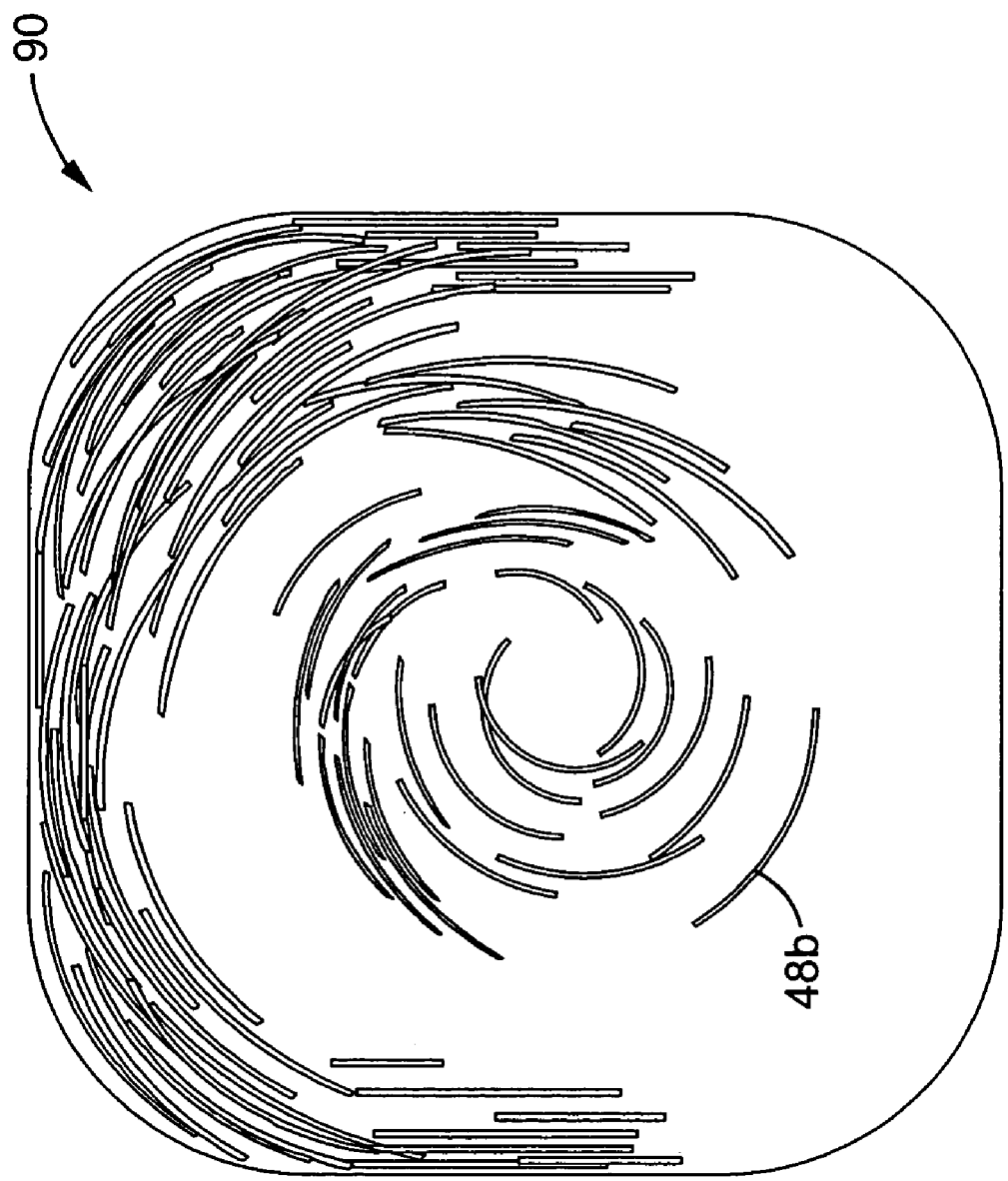
FIG. 51 is a cross section view of the interior space within a terminal portion of the log die shown with representative waxed corrugated cardboard segments radially compressed.

FIG. 51 is a schematic of a firelog cross-section showing orientation of a few of the waxed corrugated cardboard segments 48b radially disposed within the firelog.

Figure 52:
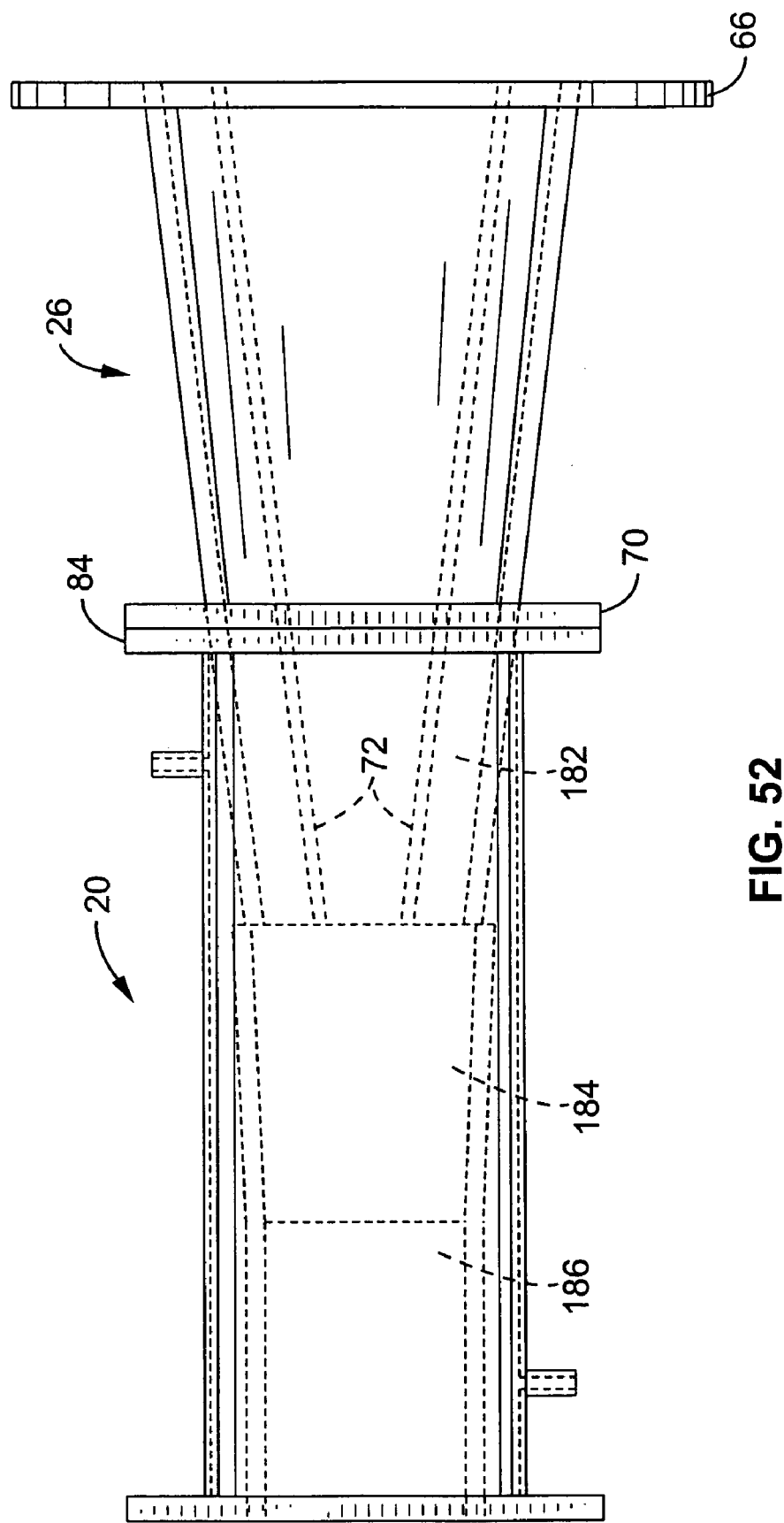
FIG. 52 is a side elevation view of the conical housing shown attached to a 4-inch firelog die corresponding to that shown in FIG. 4 but seen from right to left.
Figure 53:
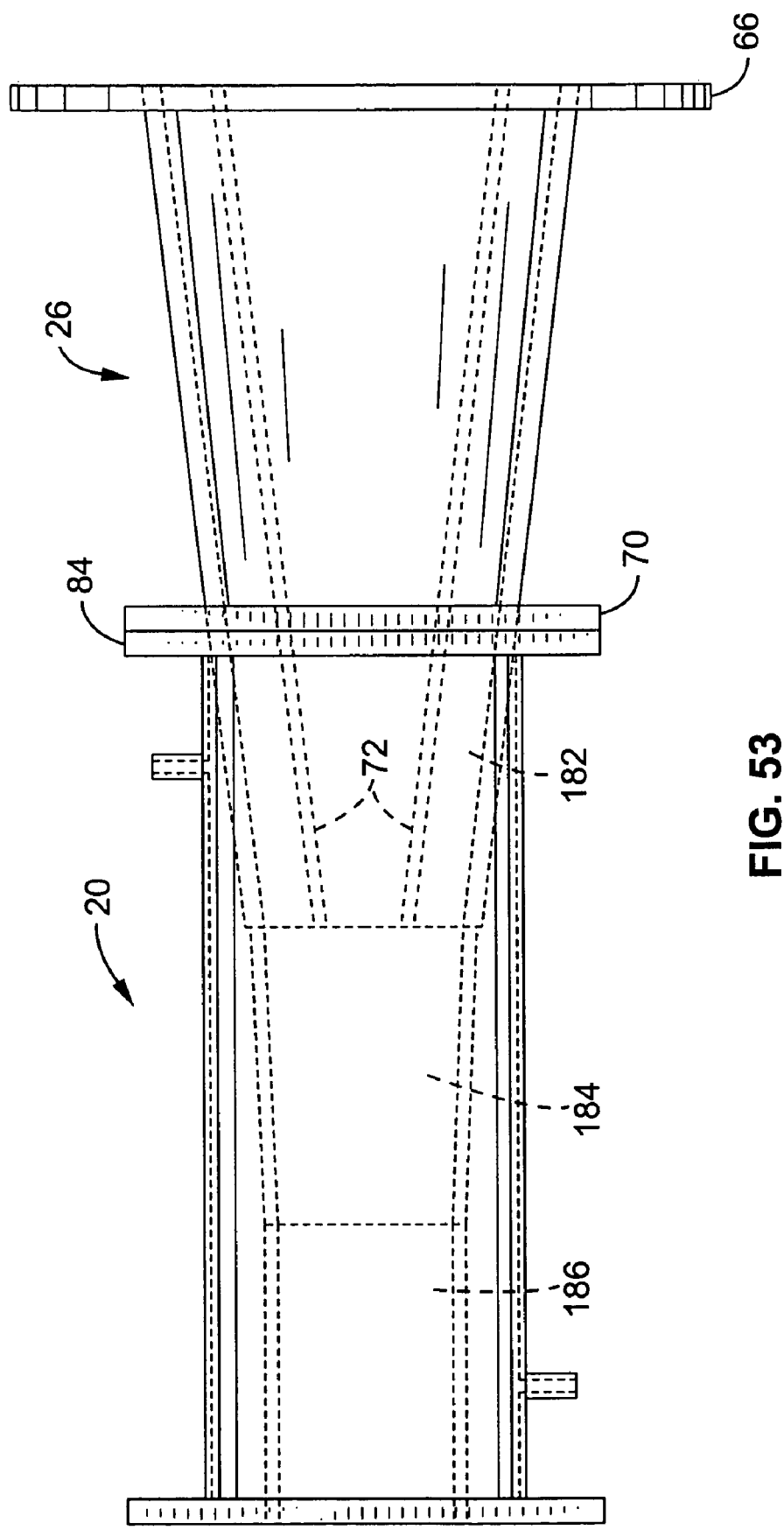
FIG. 53 is a side elevation view of the conical housing shown attached to a 3.5-inch firelog die.
Figure 54:
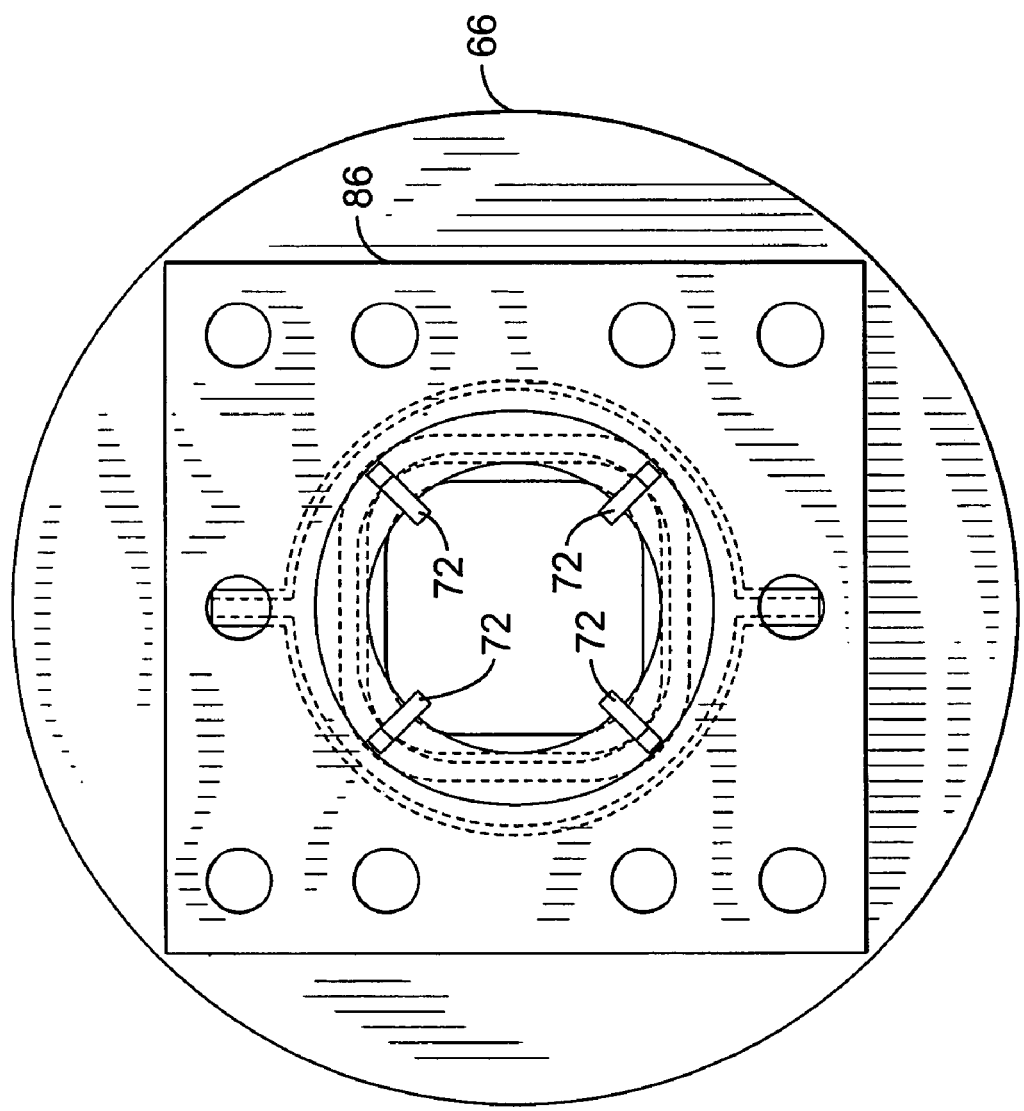
FIG. 54 is end view of the firelog die shown in FIG. 52.

FIG. 52 through FIG. 54 depict two log dies alternately being connected with the conical auger housing 26 (for clarity no fasteners are shown). FIG. 52 is a log die 20 for producing 4 inch artificial firelogs. FIG. 53 is a log die 20 for producing 3½ inch artificial firelogs. FIG. 54 is an end-view of the combined log die and auger housing 26. It can be noted in these figures that the two sections mate together with smooth transitions from within the conical section 62 of the auger housing 26 to the conical zone 182 of the log die 20, this transition includes proper alignment of the rifling 72. Although logs can be produced without the alignment and smooth transitions, they allow the extrusion of logs under reduced pressures.

Figure 56:
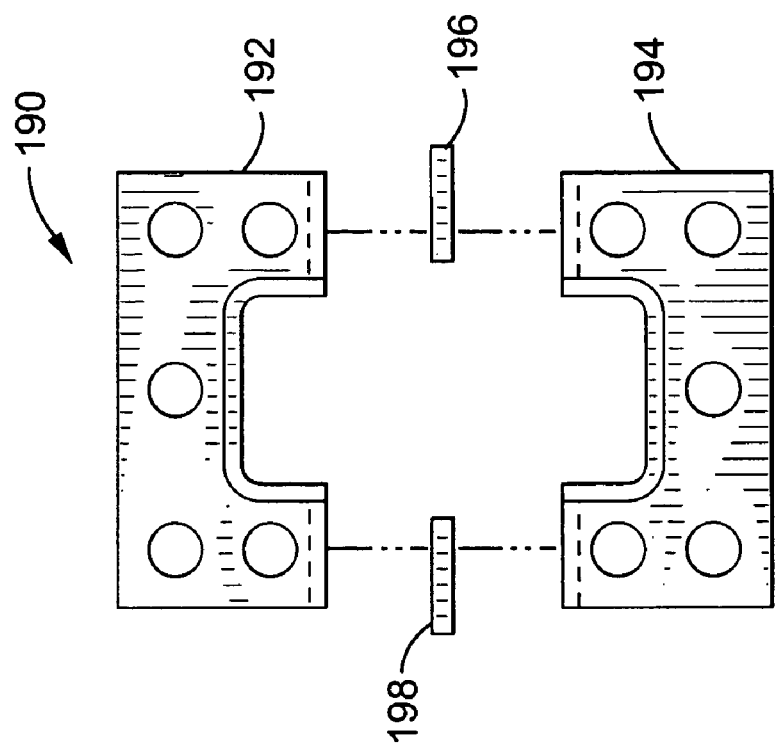
FIG. 56 is an exploded end view of the firelog die embodiment of FIG. 55.
Figure 55:
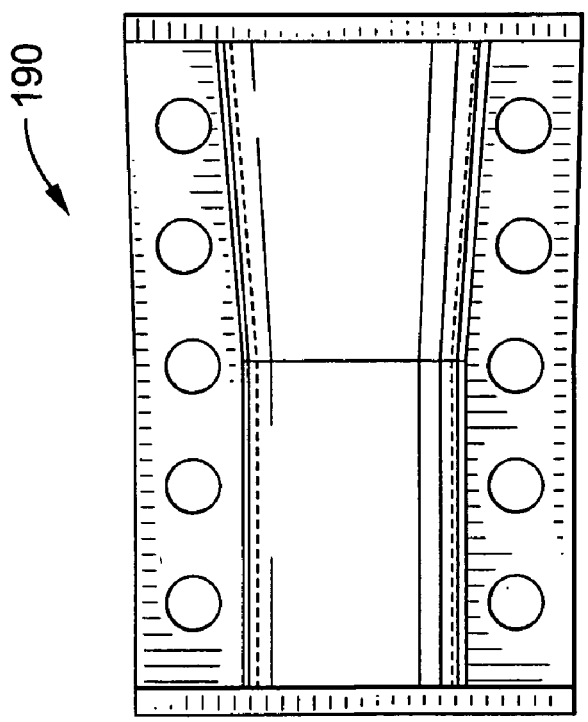
FIG. 55 is a side view of an alternative embodiment of a firelog die according to the present invention.

FIG. 55 and FIG. 56 are a side and end view of an alternate log die design 190. This log die schematic is shown with two separating halves 192, 194 which are bolted together and attached to the conical auger housing (not shown). Additionally die-spacers 196, 198 are shown. By varying the width of the die-spacers 196, 198, firelogs may be extruded with variously sized longitudinal rails. The die-spacers can alternately be made to extend into the log extrusion area such that logs are produced with longitudinal grooves.

Figure 57:
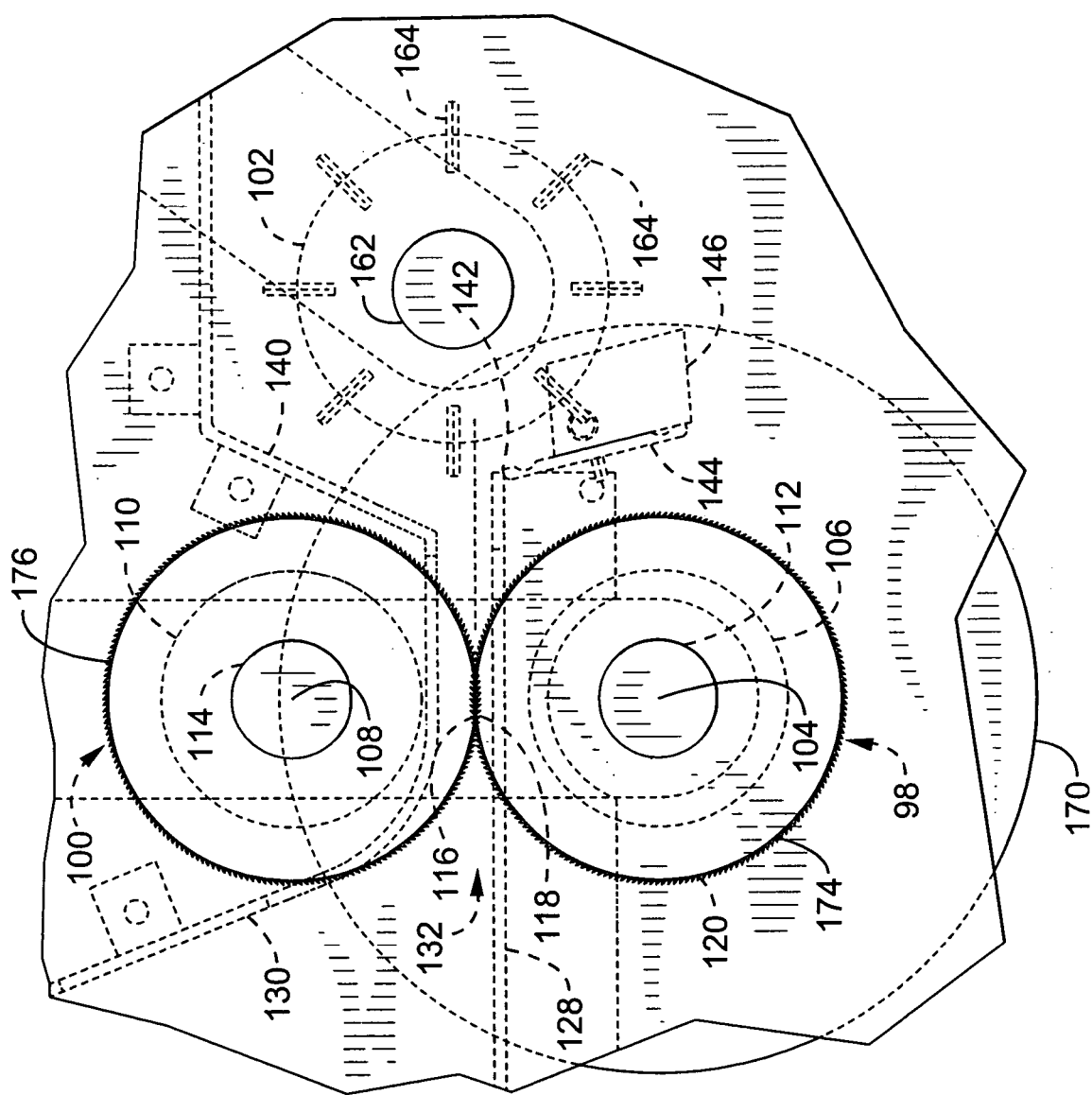
FIG. 57 is a partial right side view of the invention showing the waxed corrugated cardboard cutting assembly.

FIG. 57 is a side view of the cutting assembly for the waxed corrugated cardboard. A plurality of lower circular blades 98 with teeth 120, and a plurality of upper circular blades 100 with teeth perform slicing of the waxed corrugated cardboard into strips and a cutting reel 102 in conjunction with a bed bar knife 144 then cuts the strips into waxed corrugated cardboard segments. Lower circular blades 98 are juxtaposed along a lower axis 104 and are separated by spacers 106 which maintain a constant distance between each lower circular blade 98. The spacers 106 are made with a recessed center to minimize the contact with the irregular surface of the inner portion of the cutting blades. Upper circular blades 100 are juxtaposed along an upper axis 108 and are separated by spacers 110. Waxed corrugated cardboard sheets are fed along channel 132 between a lower guide plate 128 and an upper guide plate 130. The cardboard material is cut into strips by the cutting edges 116, 118. A vertical guide plate 140 prevents material strips that exit the cutting blades from becoming re-engaged with the cutting blades.

Waxed corrugated cardboard strips then arrive at shearing contact between cutting reel 102 that contains cutting blades 164 which shear the cardboard against a cutting surface 142 of a bed bar knife retained on a bed plate 146.

Figure 58:
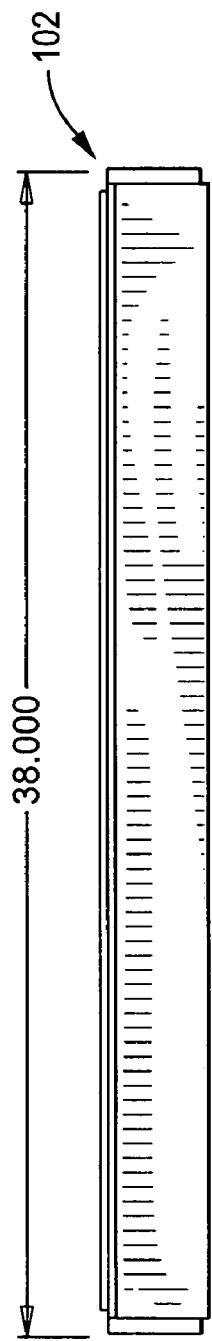
FIG. 58 is a side view of a blade used within the cutting reel of the invention.

FIG. 58 shows one of the cutting blades 164 of the cutting reel 102 as depicted in FIG. 57. The cutting blade is a generally rectangular member containing a steel-edged longitudinal cutting surface which is used in combination with the bed bar knife (not shown) to shear the waxed corrugated cardboard strips into cardboard segments.

Figure 59:
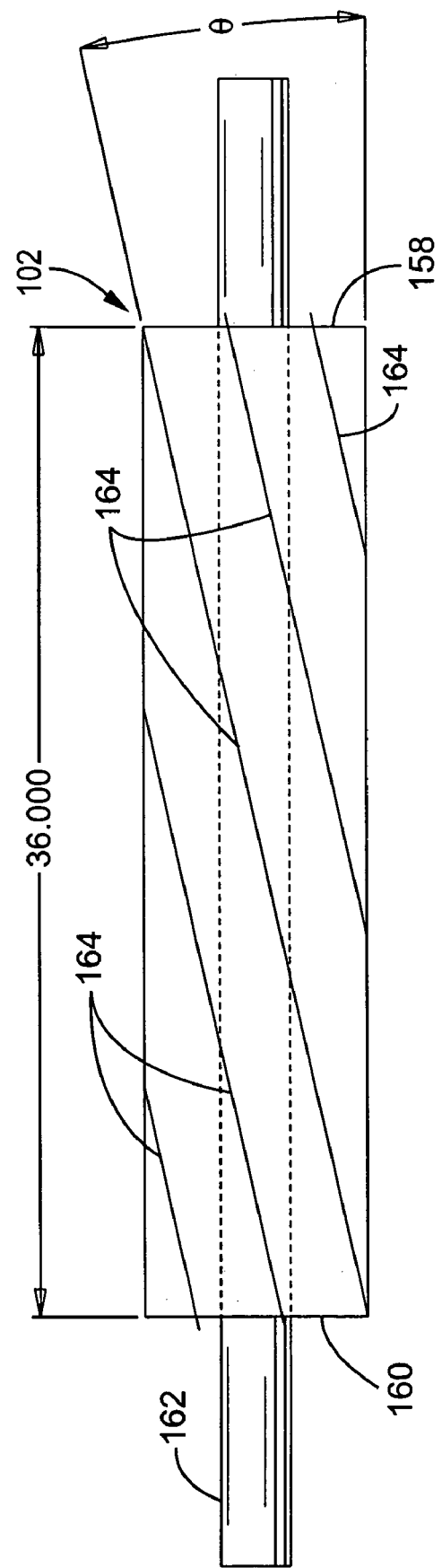
FIG. 59 is a side view of the cutting reel of the invention showing the helical placement of the blades.

FIG. 59 is the cutting reel 102 (non-mower type) as shown in FIG. 57. The cutting reel retains a plurality of cutting blades 164 about a central axis 162. The cutting blades 164 are shown helically attached to the cutting reel 102 annularly disposed about the axis 162 in connection with a first and a second end panel 158, 160. Three inner support panels (not shown) are spaced evenly between first and second end panels 158, 160 to retain the blades at a fixed radial distance from the central axis 162. Cutting blades 164 are positioned circumferentially between first and second end panels 158, 160 starting and ending with an angle of generally less than or equal to angle θ shown. Cutting blades 164 are generally retained parallel to the axial shaft 162 whereby rotation of axial shaft 162 thereby causes rotation of attached cutting blades 164. Typically the cutting reel 102 should have a diameter of at least approximately 8-inches, and the axial shaft 162 typically should have a diameter of at least approximately 1½ inches. Axial shaft 162 is typically 49-inches in length, with 2-inch threads, a 6-inch standard key. The cutting reel may be fabricated from mild steel, case hardened steel or like material. Cutting reel 102 herein uses cutting blades 164 wherein 8 such blades are preferred. The cutting blades 164 are equally spaced apart, each having a length of approximately 36-inches. First and second end panels 158, 160 and the three inner support panels have slots (not shown) to provide access for cutting blades 164 to be longitudinally inserted therethrough at their proper angles. The angle θ of the helical mounting of the blades is important, as too great an angle causes the chips to jam to one side of the machine. The angle θ used within this embodiment is 12.5 degrees, as larger angles began causing waxed corrugated strips to be pushed to one side making a wad that the cutting reel jams on. To facilitate cutting and aid in the migration of waxed corrugated cardboard segments, the cutting blades 164 are helically configured within the cutting reel 102. In this preferred configuration the cutting blades 164 have a left hand helix while cutting reel 102 rotates counterclockwise.

Figure 60:
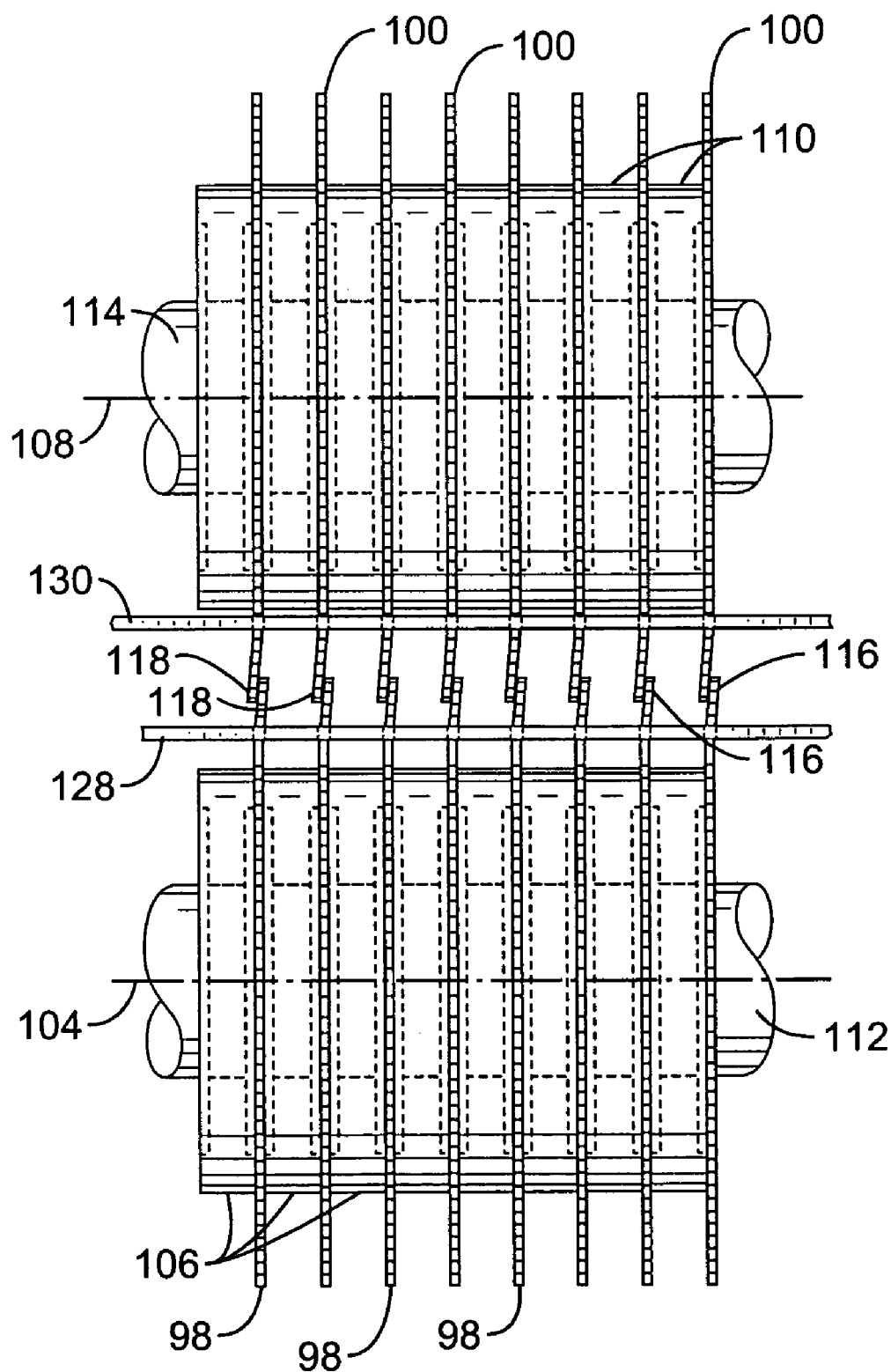
FIG. 60 is a partial front view of the assembly for cutting waxed corrugated cardboard strips, showing the relationship between the upper and lower circular blades and the central portions of the upper and lower guide plates.
Figure 62:
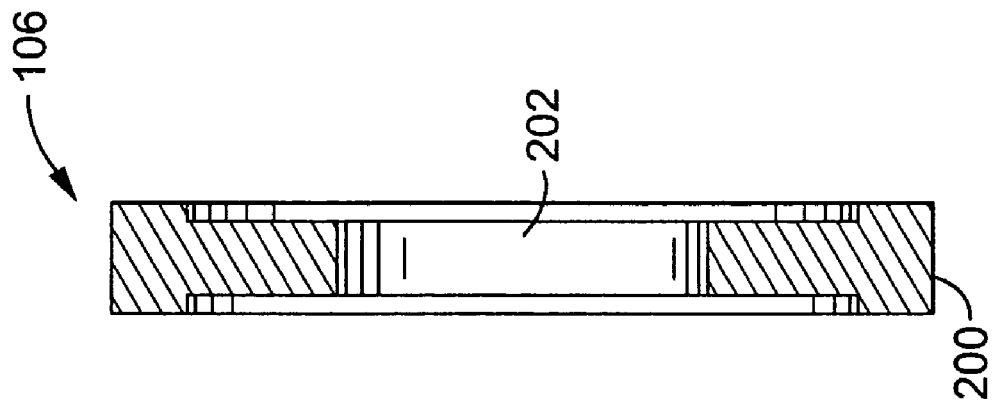
FIG. 62 is a front view of the cutting blade spacer of FIG. 61.
Figure 61:
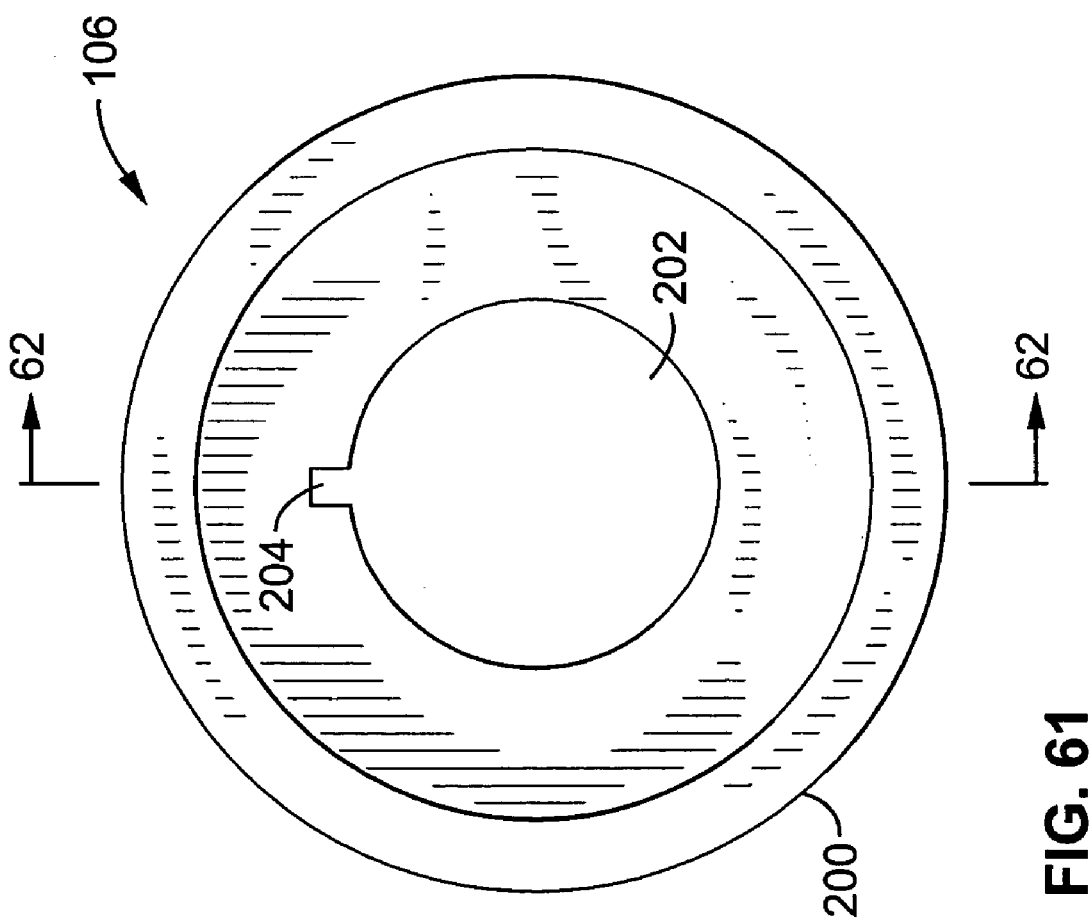
FIG. 61 is a side view of a cutting blade spacer according to the invention.

Referring to FIG. 60, the mechanism which cuts the waxed corrugated cardboard into strips is shown with a series of upper circular blades 100 juxtaposed along an upper axis 108, comprising a shaft 114, wherein each of the upper circular blades are separated by spacers 110. Lower axis 104 comprises a lower shaft 112 upon which a series of lower circular blades 98 separated by spacers 106 are juxtaposed along a lower axis 104. Both lower shaft 112 and upper shaft 114 are parallel and spaced apart such that the cutting edges 116 of lower circular blades 98 partially overlap the cutting edges 118 of upper circular blades 100. Lower and upper shafts 112, 114, are of a diameter to fit into a correspondingly sized bore within lower and upper circular blades 98, 100. A range of 40 to 50 blades are typically used per axis. Upper shaft 114 used herein is approximately 50⅛ inches in length and contains a full length standard keyway (not shown) with a 2-inch threads portion starting from its left end. A collar (not shown) welded thereon allows for axially adjusting upper shaft 114 to allow for some compression between lower and upper circular blades 98, 100. Lower shaft 112 used within this embodiment is approximately 56 inches long and includes a full length standard keyway (not shown) and 2-inches of threads at each end. Lower and upper shafts 112, 114 are fabricated from mild steel, case hardened steel or like material. Lower and upper circular blades 98, 100 within this embodiment can range between approximately 7¼ inches to 12-inches in diameter, but preferably, 8-inch non-fluted hollow ground blades are should be used, because their cutting edges 116, 118 have non-fluted (straight) teeth 120 which are necessary for grabbing and metered pulling of the material into the machine evenly for slicing and then pushing the waxed corrugated cardboard strips to the cutting reel without slipping. The large number of cutting teeth, although non-fluted, create uneven cutting tracks to provide a fuzzy edge on the waxed corrugated cardboard being cut. Slices of waxed corrugated cardboard sheets 122, or waxed corrugated cardboard boxes, are imparted with a fuzzy edge which operates to decrease the time required to ignite a segment. FIG. 61 and FIG. 62 are side and facing views of the spacer 106 used between the lower cutting blades; the spacers 110 used between the upper blades within this embodiment are interchangeable with the spacers 106 for the lower cutting blades. The annular face 200 of the spacer 106 is the only portion of the spacer visible exterior of the assembled apparatus. Spacers are mounted to a shaft via mounting hole 202 and retained by a shaft key engagement of the keyway 204.

Figure 63:
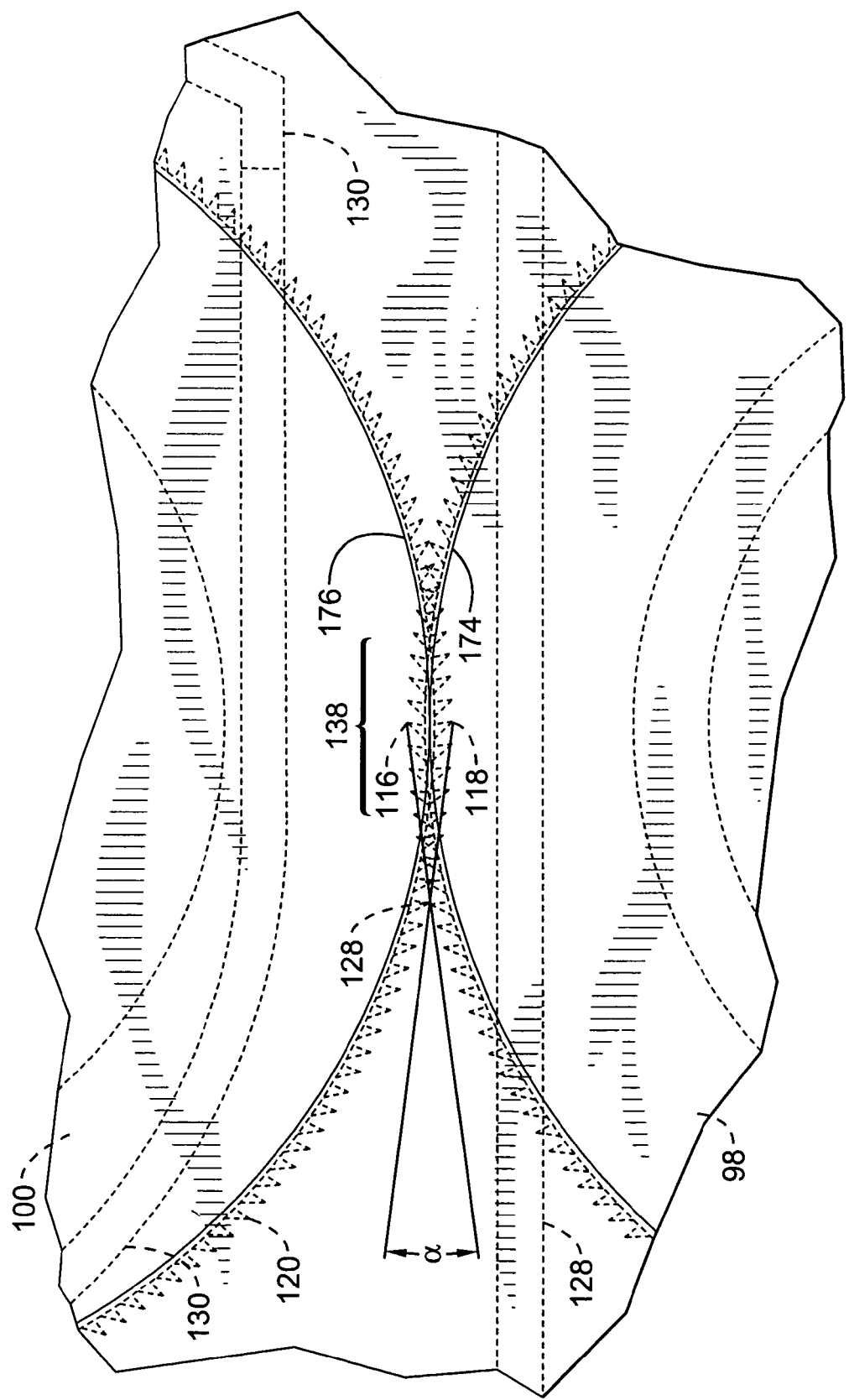
FIG. 63 is a side view of the overlapping section of the upper and lower circular blades as shown in FIG. 60.

FIG. 63 depicts the interaction of the upper and lower circular blades within the embodiment. Using an 8-inch circular blade, the depth of the overlap 138 between the cutting edges 116, 118 should be at least ¼-inch. Teeth 120 are angled in such a manner to draw or pull one or more waxed corrugated cardboard sheets into the cutting edges 116, 118, while not allowing the sheets to slip. During cutting, the teeth of the cutting blades impart a fuzzy edge to the waxed corrugated cardboard being cut. Circular blades 98, 100 within the embodiment are case hardened to a Rockwell hardness of 45 or greater, and are thick enough (approximately 0.080 inches) so as not to flex apart. Lower and upper spacers 106, 110 have a diameter of approximately 4½ inches to 5-inches when used with an 8-inch cutting blade since a minimum separation of 2½ inches must be maintained between cutting edges 116 of lower circular blade 98 and lower spacers 106 and also between cutting edges 118 of upper circular blades 118 and upper spacers 110. The included angle α is measured between the tips of the fully overlapping blades 98, 100 at tips 116, 118 through the point 128 wherein the blade tips coincide. The embodiment of the apparatus is configured with angle α set to 14.4 degrees to ensure proper and reliable feeding of waxed corrugated cardboard sheets, or boxes, 122 into cutting assembly.

Figure 64:
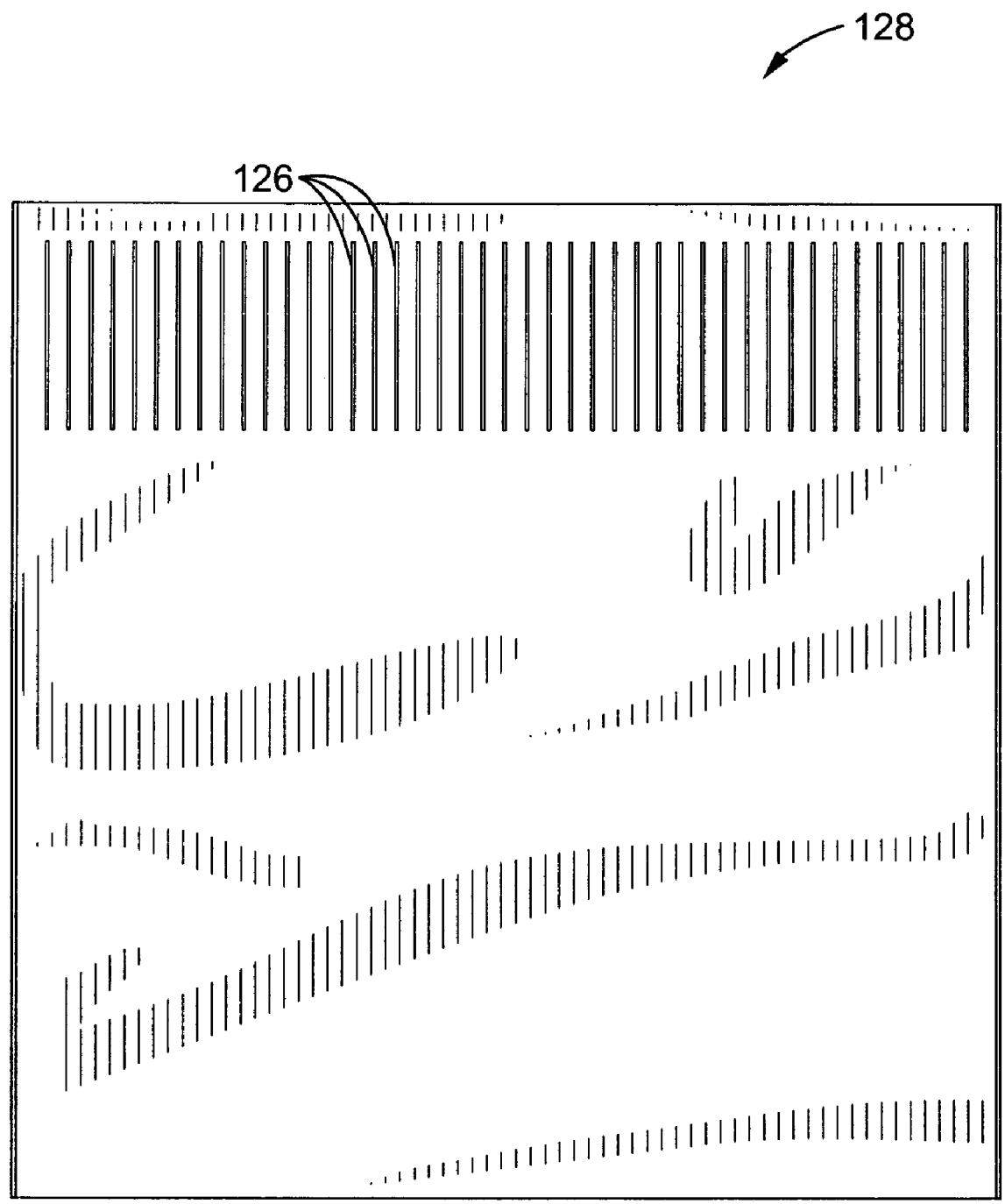
FIG. 64 is a top plan view of the lower guide plate shown in FIG. 57.

FIG. 64 is a plan view of the lower guide plate 128 with a plurality of slots 126. The upper guide plate 130 (not shown) is similarly slotted. The slots within the lower and upper guides plates 128, 130 allow the cutting edges 116 of lower circular blades 98, and cutting edges 118 of upper circular blades 110 to extend therethrough for engagement and cutting of the waxed corrugated cardboard material. Slots 126 are typically no greater than ¼ inches wide to help prevent lower and upper circular blades 98, 100 from clogging. Lower and upper circular blades are self-clearing due to their minimal clearances within slots 126 in upper and lower guides plates 128, 130, as the slots 126 extend only approximately 0.010 inches beyond the interposing circular blades.

Figure 65:
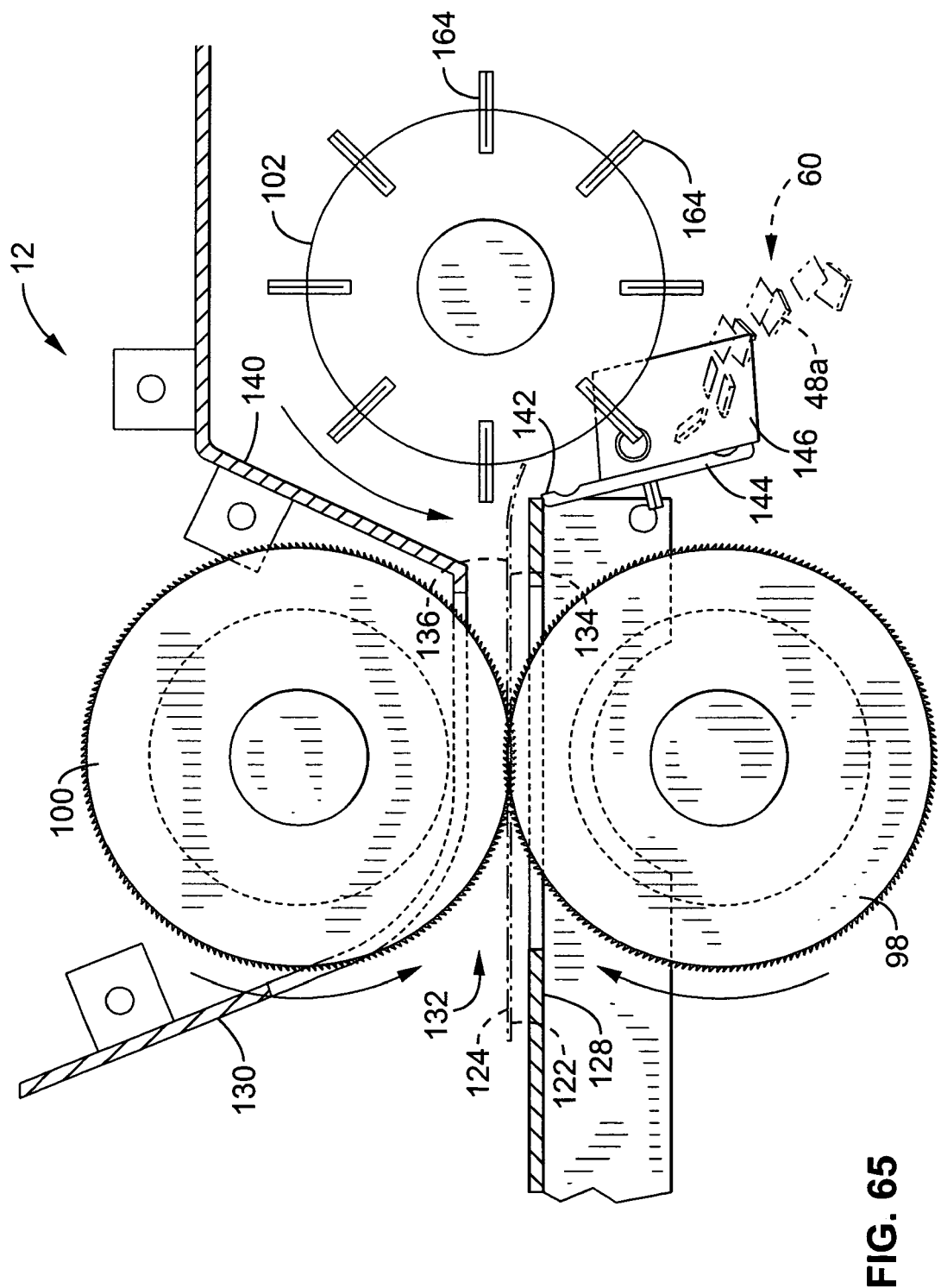
FIG. 65 is a right side view of the cutting assemblies of the invention shown with a waxed corrugated cardboard sheet and paper sheet being fed into the machine along with the waxed corrugated cardboard segments and paper segments produced.

FIG. 65 is a side view of the waxed corrugated cardboard cutting assembly 12 showing waxed corrugated cardboard sheets 122 being fed into the input side wherein the material is sliced into waxed corrugated cardboard strips 134 and then segmented into waxed corrugated cardboard segments 148. Lower and upper guide plates 128, 130 reside as generally planar sections between the lower and upper circular blades 98, 100, and are typically parallel to each other near the junction of the upper and lower cutting surfaces. These two guide plates form a defined path, or channel, 132 through which waxed corrugated cardboard sheets 122 can enter cutting assembly 12 and through which sliced waxed corrugated cardboard strips 134 pass on their way to being segmented. The distance between the upper and lower guide plates 130, 128, respectively, provide a channel 132 that helps direct the waxed corrugated cardboard sheets 122 into the cutting blades.

A vertical guide plate 140 extends upwardly from upper guide plate 130 proximate to cutting reel 102 for separating waxed corrugated cardboard strips 134 just prior to contact with cutting reel 102 which prevent reverse flow of material. Lower guide plate 128 terminates at the inner edge directly above the cutting surface 142 of a bed bar knife 144. A bed plate 146 disposed below bed bar knife 144 directs waxed corrugated cardboard segments 48a towards, as shown in FIG. 1 through FIG. 3, an opening 34 which is in material communication with conveyor compression auger assembly 16. Attachment means 148, such as a nut and bolt, are used to attach bed bar knife 144 onto bed plate 146. The bed plate attaches by two outer studs which are threaded into each end of the bed plate and are fitted through the outer wall of the cutting assembly. The bed plates are not fixed but swivel freely to allow adjustment; however they remain ridged in their horizontal angle relationship to the reel. The pitch angle of bed plate 146 can be configured to provide for adjustment of the angle and to partially compensate for wear of the bed bar knife. As cutting blades 164 revolve, each blade passes in close proximity to cutting surface 142 of bed bar knife 144, which results in shearing of the waxed corrugated cardboard strips 134 passing therethrough into waxed corrugated cardboard segments 48. Paper sheet layers may be added to the waxed corrugated cardboard sheets 122 so that a paper mix 60 is created with the waxed corrugated cardboard segments 48a. This paper mix is typically used for firestarter material.

Figure 66:
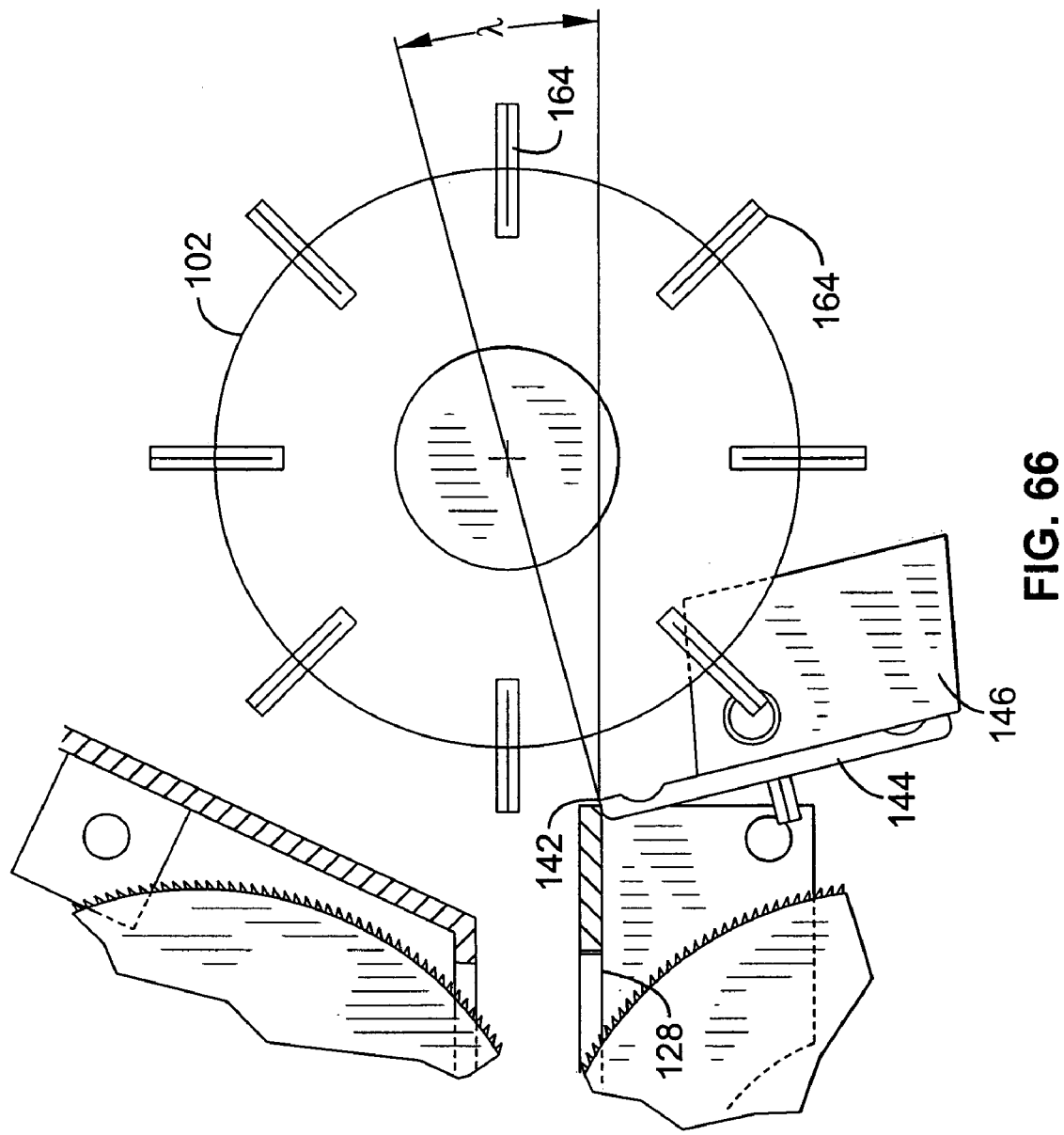
FIG. 66 is a side elevation view of a bed bar assembly of the invention with the angle shown between the bed bar assembly and the center shaft of the reel of the present invention.

FIG. 66 is a schematic of the cutting reel 102 position in relation to the cutting edge 142 of the bed bard knife 144. The axis of rotation of the cutting reel within the embodiment is vertically disposed by an angle λ, which for the embodiment is approximately 15 degrees from the cutting edge 142 of the bed bar knife 144 when taken in relation to direction of the lower guide plate 128.

Figure 67:
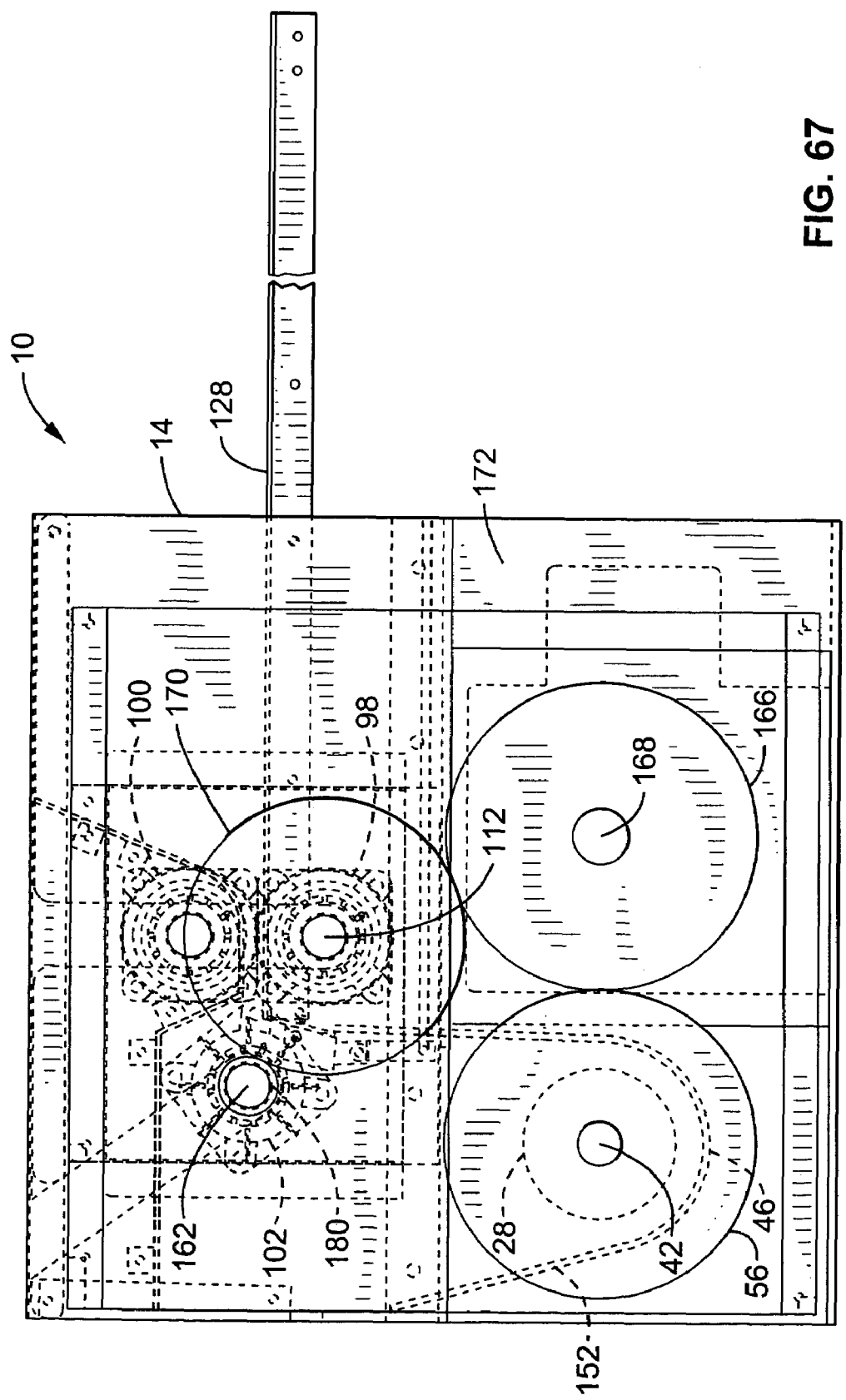
FIG. 67 is a left side view of the apparatus shown in FIG. 1.
Figure 68:
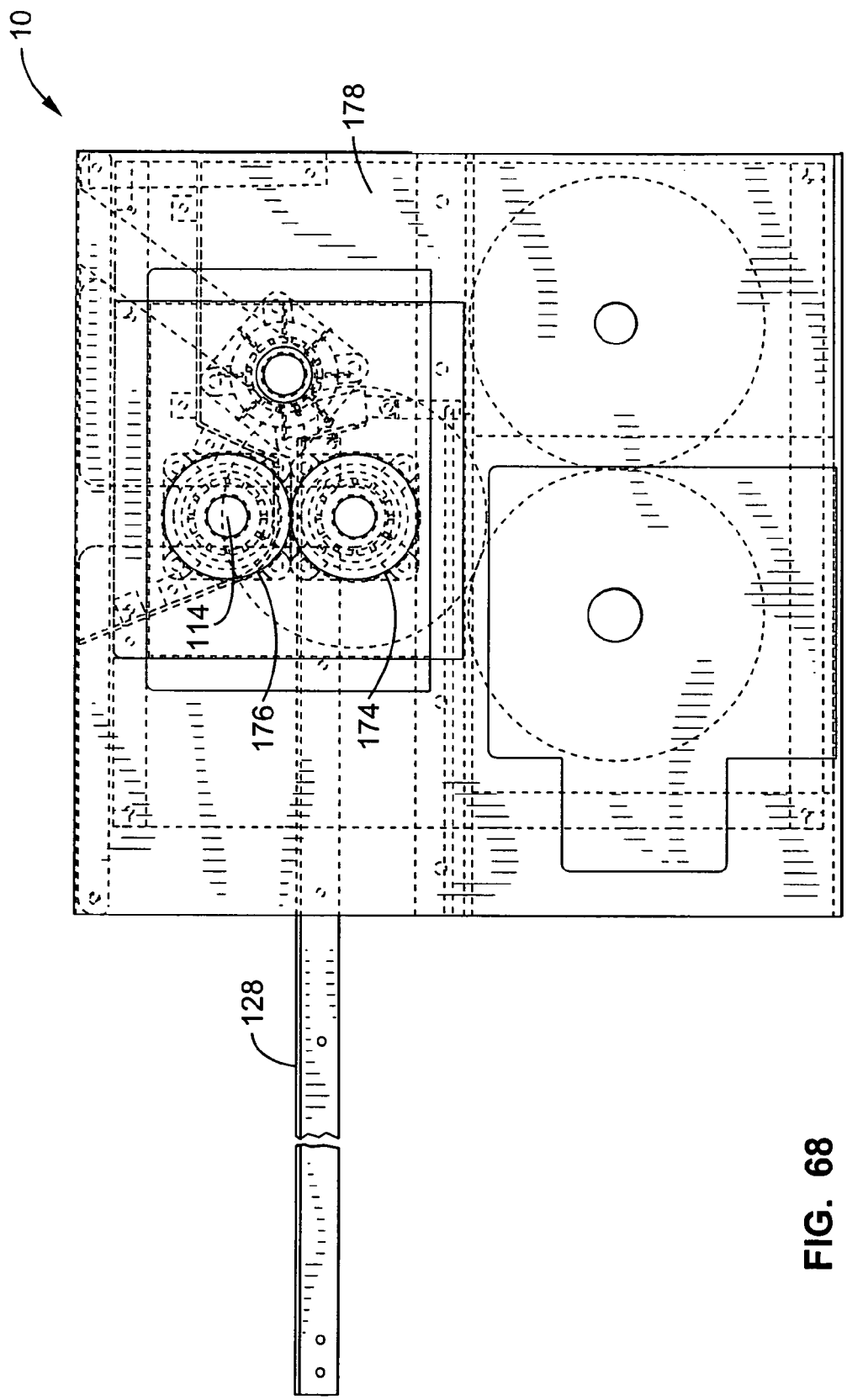
FIG. 68 is a right side view of the apparatus shown in FIG. 1.

Referring to FIG. 67 and FIG. 68, the left side and right side, respectively, of apparatus 10 is generally shown. A motor (not shown), or like means, provides the power necessary to operate apparatus 10. Those skilled in the art will appreciate that the motor can be electrically powered, an internal combustion engine and/or be remotely located and coupled to apparatus 10 through a gear box (not shown). It has been determined, however, that for the embodiment thusly described, the motor must provide an output of at least 40 horsepower in order to produce firelogs 90 while operating all the various subassemblies simultaneously.

In the preferred configuration (FIG. 67 and FIG. 68), the motor (not shown), powered by a frequency drive for speed control, directly drives an 18-inch primary spur gear 166 that is axially mounted on a primary driveshaft 168 which rotates within enclosure 14. Primary spur gear 166 in turn engages and drives a cutting assembly gear 170, which is a 16-inch spur gear. Cutting assembly gear 170 is axially mounted on lower shaft 112 of the cutting assembly adjacent the left side 172 of enclosure 14. Rotation of cutting assembly gear 170 rotates lower shaft 112 and hence, lower circular blades 98. In FIG. 68, a lower shaft spur gear 174 is axially mounted on lower shaft 112 adjacent the right side 178 of enclosure 14. The relationships of these gears can also be seen in FIG. 1 through FIG. 3, along with first gear housing 150 and second gear housing 188 which enhance safety. Primary spur gear 166 and driveshaft 168 are directly behind gear 56 and shaft 42 and can not be seen in FIG. 1 or FIG. 2, yet are in full view in the rear view of FIG. 3. Lower shaft spur gear 174 engages and drives upper shaft spur gear 176, which is attached to upper shaft 114 adjacent the right side 178 of enclosure 14. Rotation of upper shaft spur gear 176 rotates upper shaft 114 and hence, rotates upper circular blades 100. Lower shaft spur gear 174 and upper shaft spur gear 176 are identically configured so that the rotational velocities of lower and upper circular blades 98, 100 are the same. In the preferred embodiment, lower shaft and upper shaft spur gears 174, 176, respectively, are approximately 8-inches in diameter.

Referring again to FIG. 67 the cutting reel 102 is driven by spur gear 170, which is driven by primary spur gear 166. Axial shaft 162 of cutting reel 102 includes a gear 180 adjacent the left side 172 which is driven by spur gear 170, which engages primary spur gear 166. In the preferred configuration, gear 180 of cutting reel 102 is a spur gear that is configured to provide a rotational velocity of approximately 4:1 between lower circular blades 98 and cutting reel 102. The 4:1 ratio between lower circular blades 98 and cutting reel 102 is somewhat critical as it determines the length and size of waxed corrugated cardboard segments 48. The higher the ratio, the smaller the waxed segments 48, and conversely, the lower the ratio, the larger the waxed segments 48.

Primary spur gear 166 also drives shaft 42 of conveyor compression auger screw 28. Primary spur gear 166 engages conveyor compression auger screw spur gear 56, which is mounted on shaft 42. Conveyor compression auger screw spur gear 56, preferably, is also approximately 18-inches in diameter to allow for the same rotational velocity in conveyor compression auger screw 28. Although gearing mechanisms are disclosed to drive cutting assembly 12 and conveyor compression auger assembly 16, those skilled in the art will appreciate that chain and sprocket assemblies (not shown), belt and pulley assemblies (not shown) and/or a combination of any of the aforementioned can be used to achieve the same objective.

Figure 4:
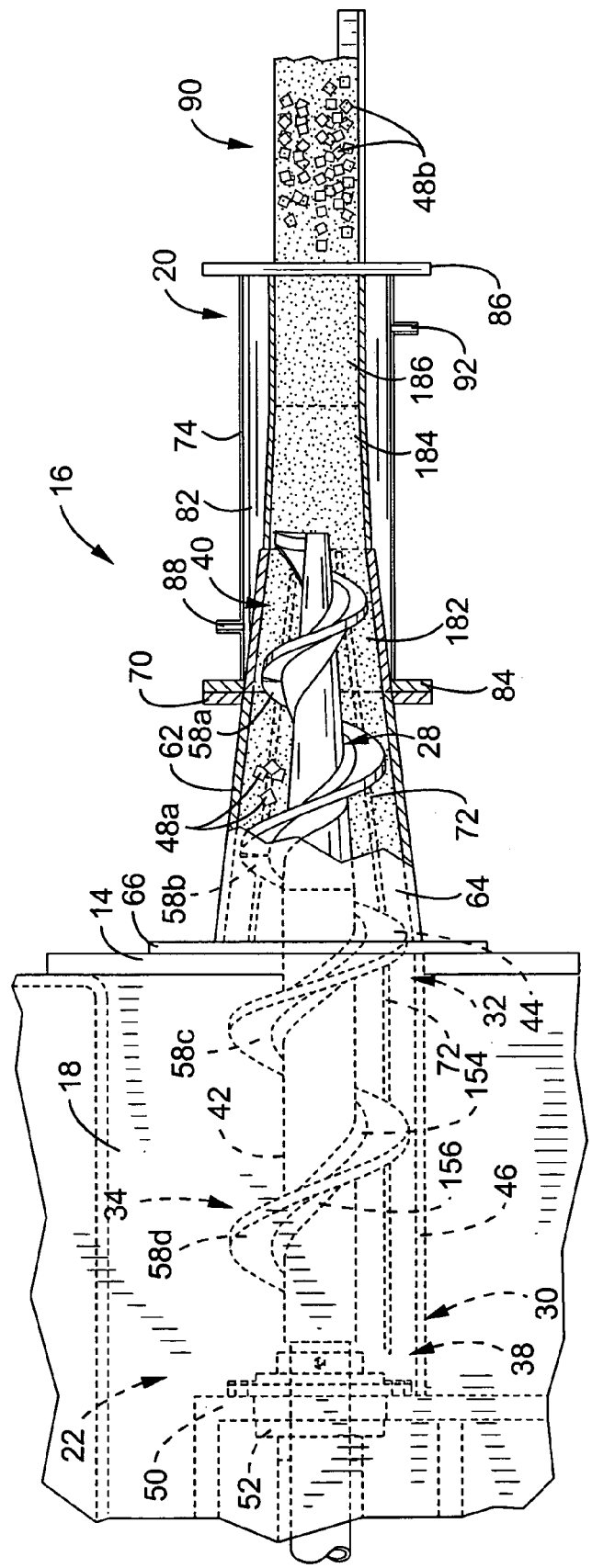
FIG. 4 is a front sectional partial view of the conveyor compression auger assembly and firelog die portions of the present invention shown with an extruded firelog.
Figure 5:
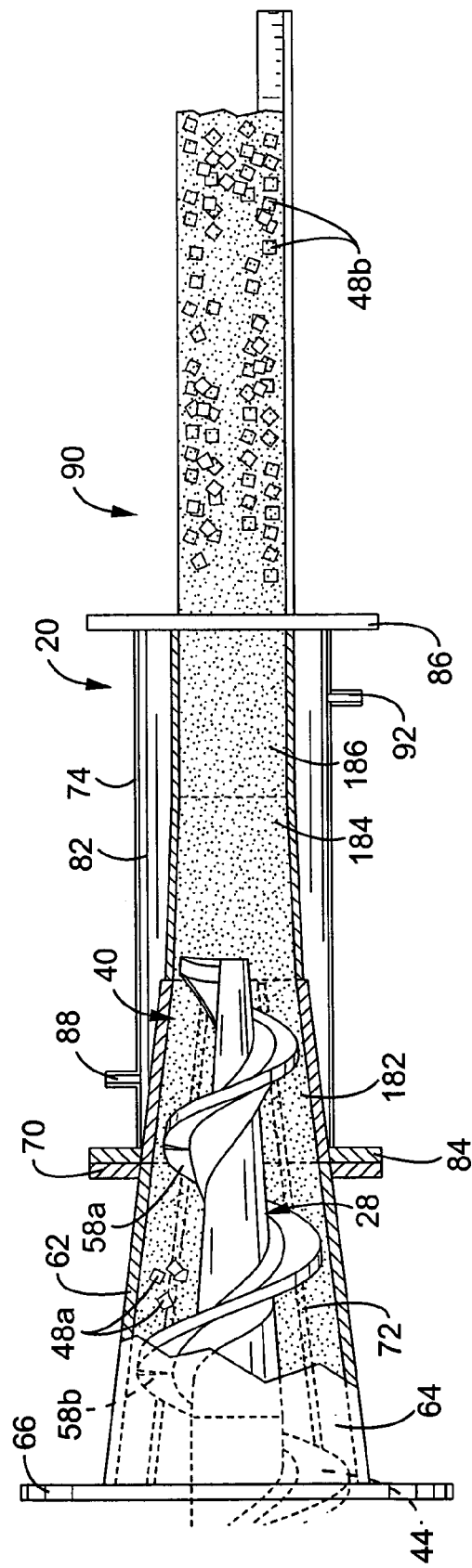
FIG. 5 is a detailed front sectional view of the conveyor compression auger assembly and firelog die shown in FIG. 4.
Figure 69:
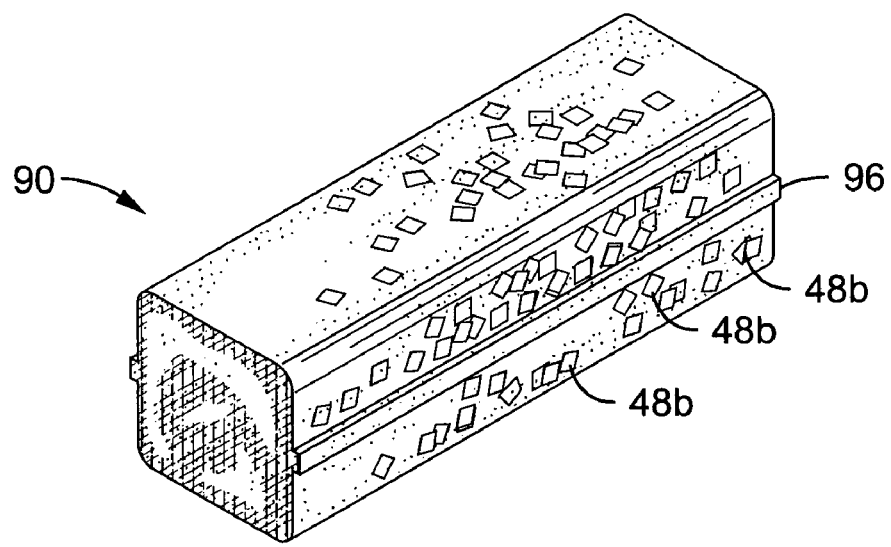
FIG. 69 is a perspective view of an artificial firelog manufactured by the apparatus of FIG. 1, showing representative horizontally disposed radially displaced interlocking segments and exterior log ridges.

To fabricate artificial firelog 90, flattened waxed corrugated cardboard boxes in the form of waxed corrugated cardboard sheets 122, as shown in FIG. 65, are fed into channel or opening 132 until grasped by lower and upper circular blades with teeth 98, 100. Lower and upper circular blades 98, 100 draw or pull waxed corrugated cardboard sheets 122 into and meter through channel 132 while slicing waxed corrugated cardboard sheets 122 into strips 134 while simultaneously applying fuzzy frayed edges to the strips. As waxed corrugated cardboard strips 134 pass through and exit channel 132, cutting blades 164 on cutting reel 102 chop waxed corrugated cardboard strips 134 into waxed corrugated cardboard segments 48. Referring now to FIG. 4, the waxed corrugated cardboard segments fall from the cutting reel into hopper 18 and are guided into opening 34 of conveyor compression auger assembly 16. The cardboard segments are then radially disposed to the inner walls of the conical section 62 where the ¼ riffling 72 guides the compressed segments 48b continually forward and through the conical zone 182 of the log die 20. The rifling 72 also insures that the outer layer of the log will have a consistent layer of flattened radially disposed segments. These segments are compressed through each flight of the compression auger. As the segments reach the final compression (push) flight they have been arranged flat, horizontally, longitudinally disposed, and helically compressed from the center of the log outward. The log die puts the last compression into the log extrusion and forms the received compressed segments into various firelog products. A firelog 90, as manufactured by the embodied apparatus, is shown in FIG. 69 with a few representative waxed corrugated cardboard segments shown disposed radially on the surface of the log. For clarity, only a few segments are shown, however the log is comprised principally of these waxed corrugated cardboard segments 48. The firelog 90 shown additionally contains a rail 96 which was formed by using a log die containing a longitudinal channel, or groove, such as the one described in regard to the alternate log die of FIG. 55 and FIG.

56. Rails 96 within the embodied log are approximately ⅛ to ¼ inches in width and extend approximately ⅛ to ¼ inches above the surface of firelog 90. Rails 96 ail function similarly to a candle-wick, and facilitate lighting of the firelog 90. The rails 96 also keep any log over-wrapping material from sticking onto the surface of the firelog 90, whereby an air-gap is maintained to promote ignition of the firelog.

Figure 70:
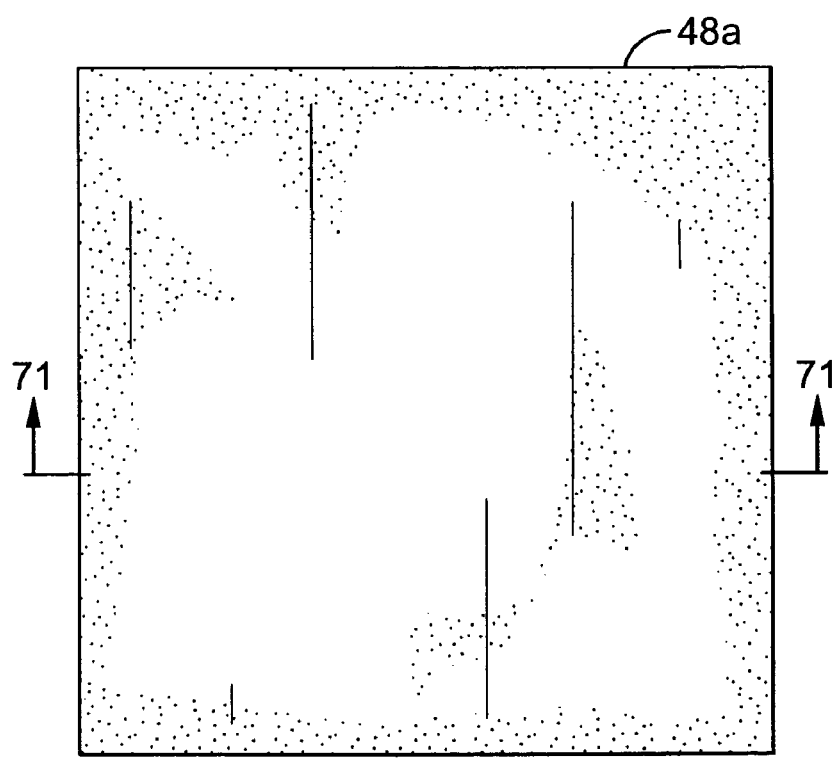
FIG. 70 is a top plan view (magnified) of a waxed corrugated cardboard segment as used within the apparatus to form the firelog shown in FIG. 69.

Referring to FIG. 70, the waxed corrugated cardboard segments 48a produced by the cutting assembly of the preferred embodiment are approximately ½ to 1 square inch in size with frayed edges on each of two opposing sides created by the teeth on the pair of cutting blades within the mechanism which performs the slicing operation. The wax coating and corrugations of the original waxed corrugated cardboard sheets remain intact within these waxed corrugated cardboard segments.

Foreign metallic substances, such as staples, commonly found with waxed corrugated cardboard sheets may be easily removed by using magnets, if this is desired, however the apparatus will operate without removing the staples. FIG. 67 shows the hopper walls 152 whereupon whose exterior magnetic means may be applied to prevent such metallic substances from entering the conveyor compression auger.

Waxed corrugated cardboard segments may also be directed from the cutting apparatus to a drying apparatus and then returned to the hopper before entering the conveyor compression auger.

To fabricate firestarter chips, a mix of paper and waxed corrugated cardboard segments are produced by using cutting mechanism within the inventive apparatus. Referring to FIG. 65, paper sheets 124, preferably with 10% to 25% paper, are laid over waxed corrugated cardboard sheets 122 and both are fed into opening 132 until grasped by lower and upper circular blades 98, 100. Lower and upper circular blades 98, 100 slice waxed corrugated cardboard sheets 122 and paper sheets 124 into waxed corrugated cardboard strips 134 and paper strips 136, respectively. Cutting blades 164 on cutting reel 102, chop waxed corrugated cardboard strips 134 and paper strips 136 into waxed corrugated cardboard segments 48a and paper mix 60, respectively. Waxed corrugated cardboard segments 48a and paper mix 60 are gathered or directed into to a standard bagging machine (not shown) for packaging the waxed corrugated cardboard segments 48a and paper mix 60 as an aggregate firestarter mix composed of approximately 80% waxed corrugated cardboard segments 48a and approximately 10% to 25% paper mix 60. Those skilled in the art will appreciate that approximately 20% of waxed corrugated cardboard segments 48a can be hammer-milled into a cotton-like fiber which can be used in lieu of paper mix 60. This cotton-like fiber promotes rapid ignition when in an uncompressed state, such as the firestarter mix, however when the hammer-milled material is compressed, the opposite effect occurs and rapid ignition is prevented.

Firelogs may be produced by leaving off the above described paper sheets and further processing the waxed corrugated cardboard segments, that have been heretofore cut into segments. Referring to FIG. 4, after the uncompressed waxed corrugated cardboard segments 48a are cut, they fall into the hopper 18 and enter opening 34, the rotation of conveyor compression screw 28 transports waxed corrugated cardboard segments 48a into and through auger housing 26. Conveyor compression screw 28 rotates and compresses waxed corrugated cardboard segments 48a along the length of the circular passageway 64, into compressed waxed corrugated cardboard segments 48b. As the waxed corrugated cardboard segments 48b being compressed approach the recompression zone 184 of the log die 20, the segments 48b are heated up due to the compression friction and centrifugal force occurring therein. This heating propagates uniformly and thereby adheres waxed corrugated cardboard segments 48b together in a generally interlocking planar fashion. This interlocking planar adhesion of segments 48b gives finished firelog 90 additional cohesive strength with no cold joints. The conveyor compression auger assembly 16, is operated (with regard to speed, cooling flow, and adjustment) so as to maintain the temperature of compressed waxed corrugated cardboard segments 48b under 150° F. At temperatures above 150° F. the "wet glue" used to form the waxed cardboard corrugations can melt resulting in corrugation delamination. Also, the wax used on the waxed cardboard segments 48a has a blocking point temperature of approximately 110° F. and a melting point temperature of approximately 142° F. The heat necessary to form firelog 90, without melting the wet glue and wax in the corrugated cardboard, is generated only by conveyor compression screw 28 and is typically about 50° F. to 55° F. above ambient temperature. Firelogs 90 have been found to generally form best between temperatures of approximately 108° F. and 148° F., thus requiring an ambient temperature range of approximately 53° F. to 93° F., which is well within the range of most factories or manufacturing facilities. It has been determined that when the ambient temperature is lower, conveyor compression auger assembly 16 can be run faster and consequently, more firelogs 90 can be produced. Therefore, the ability to vary the ambient temperature of the manufacturing environment is desirable. A cooling section, as previously described and shown may be applied around the log die to increase the production capability by further cooling and controlling the temperature.

Maintaining the integrity of the cellular structure 214, as shown in FIG. 71, is essential for allowing oxygen and wax to flow through the waxed segments to provide for easier ignition and more efficient burning of the firelog 90 of FIG. 69. The centrifugal force within the conveyer compression auger assembly urges segments radially outward to the periphery of firelog 90 so as to lay "flat" along the outer surface of the conical auger housing wherein upon compression these segments become radially disposed within firelog 90. Being radially disposed, the waxed corrugated cardboard segments are free to expand when heated, thereby providing a log which burns more efficiently and in a manner resembling genuine wood bark. Waxed corrugated cardboard segments are compressed within the apparatus by a factor of approximately five to eight. The amount of compression, as set by the conveyor compression auger assembly, is a determiner of fuel density and a factor in regulating the burn rate of the log.

Additional wax or glue is not required within a firelog formed within the current invention, due to the unique configuration of the conveyor compression auger assembly, whose functioning includes compressing, radially disposing, and interlocking the waxed corrugated cardboard segments into a firelog extrusion that does not easily break apart. If desired, however, openings (not shown) can be placed within conical section of the conveyor compression auger assembly so that extra liquid wax can be added to waxed corrugated cardboard segments. This extra wax can be used to achieve longer burn time, greater BTU's, or to reduce friction within the production process. The addition of wax, or a wax replacement substance, may also be used with non-waxed corrugated cardboard sheets or paper if used. As the firelog 90 burns, corrugations 210 of the cellular structure 214 on the waxed corrugated cardboard segments 48b expand to 48c (FIG. 73), allowing oxygen and wax to permeate throughout firelog 90, resulting in a clean and efficient burning firelog 90.

The outermost segments of firelog 90 fall off and the next outermost layer continues burning.

An outer coating or cover (not shown) can be extruded along with firelog 90 by adding bleed holes on conical section 62 to allow for the introduction of plastic or hot glues into the conveyor compression to form the outer coating or cover for firelog 90 during compression and extrusion. A means can also be provided wherein the plastic or hot glue is inserted beyond exit 76 of die 20. The outer coating or cover gives the log structure a significantly greater compressive strength, thereby allowing the production of a log product extrusion whose outer coating may be made sufficiently durable so that the extrusion can be used for posts, pillars or the like.

Referring now to FIG. 69 through FIG. 73, a firelog 90 of FIG. 69, manufactured by apparatus 10 of the present invention is generally shown. As will be seen, firelog 90 is a longitudinally-shaped structure that comprises waxed corrugated cardboard segments 48b which have been radially disposed and densely compacted together. The basic material used to form firelog 90 is waxed corrugated cardboard sheets as found within ordinary waxed corrugated cardboard boxes. The waxed corrugated cardboard sheet(s) are cut into small segments 48a of FIG. 70. The waxed corrugated cardboard segments are preferably cut to a size between ½ square inch to 1 square inch in size to produce a decorative burn aspect of firelog 90. Alternatively, one can use waxed corrugated cardboard segments 48a smaller that the preferred range, but this would result in a higher manufacturing cost and the possible introduction of cold joints.

It is essential the waxed corrugated cardboard segments 48a used, retain a cellular structure 214. The cellular structure must remain intact in the form of corrugations 210 of cardboard material, which allow air to flow through the waxed corrugated cardboard segment 48a, which thereby results in an efficient and prolonged burn. The waxed corrugated cardboard segments 48a additionally have been found to burn in a manner wherein they may be used as firestarter chips. Since waxed corrugated cardboard segments 48a are fabricated from waxed corrugated cardboard sheets, they contain a first substantially planar member 212 and a second substantially planar member 216 covering corrugations 210 containing a cellular structure 214.

Waxed corrugated cardboard segments 48a are compressed to a ratio preferably between 5:1 and 8:1, resulting in a compressed waxed corrugated cardboard segment 48b as depicted in FIG. 72. The range between 5:1 and 8:1 has been determined to be the preferred compression ratio as compressing waxed corrugated cardboard segment 48 beyond this range would cause damage to the cellular structure 214, thus effectively eliminating the effect of corrugations 210. After being compressed in the conveyor compression auger assembly, waxed corrugated cardboard segments 48b are densely packed together during an extrusion process through log die 20 and then cut in generally evenly-spaced sections to form firelogs such as firelog 90 having a generally cylindrical-shaped structure. Biomass may be added in with waxed corrugated cardboard segments 48 during the compression process, including but not limited to saw dust, almond shells, walnut shells, peanut shells, olive pits, cherry pits, coal. The addition of such biomass provides firelog 90 with desired aromatic characteristics when firelogs 90 are burned. Biomass can also serve to increase or decrease the friction level within conveyor compression auger assembly during compression of waxed corrugated cardboard segments 48.

FIG. 72 depicts the compressed waxed corrugated cardboard segments 48b as firelog begins to burn. Corrugations 210 then expand due to the heat, allowing air to efficiently flow throughout the segments which expand to 48c of FIG. 73 as they burn on the outside of the firelog.

Referring finally to FIG. 74, a flow chart 220 of the manufacturing process for a firelog is generally depicted. The first step 222 involves cutting waxed corrugated cardboard sheet into segments. The second step 224 involves compressing waxed corrugated cardboard segments to a ratio between 5:1 and 8:1. In the third step 226, waxed corrugated cardboard segments are extruded into a continuous log structure. The fourth and final step 228 involves cutting the continuous log structure into individual firelogs.

Accordingly, it will be seen that this invention converts standard waxed corrugated cardboard sheets into artificial firelogs by slicing the waxed corrugated cardboard sheets into strips, cutting waxed corrugated cardboard strips into waxed corrugated cardboard segments, and compressing waxed corrugated cardboard segments, while providing for radial disposition and interlocking of the segments, to form an artificial firelog. Although the description above contains many specificities, these should not be construed as limiting the scope of the invention but as merely providing illustrations of some of the presently preferred embodiments of this invention. Thus the scope of this invention should be determined by the appended claims and their legal equivalents.

TABLE 1

| Flight | a | f | h | r | s |
|---|---|---|---|---|---|
| 1 | 48.4° | 5.500 | 1.239 | 0.2500 | 0.2292 |
| 2 | 51.4° | 7.299 | 1.442 | 0.2500 | 0.3021 |
| 3a | 57.4° | 7.776 | 1.797 | 0.2500 | 0.3229 |
| b | — | — | 1.873 | — | — |
| c | — | — | 2.092 | — | — |
| d | — | — | 2.227 | — | — |
| 4 | 57.4° | 9.000 | 2.227 | 0.2500 | 0.3750 |
| 5 | 57.4° | 4.489 | 2.227 | 0.2500 | 0.4167 |

TABLE 2

| St No. | Fit | Degree | s | b | p | w | y | t | g |
|---|---|---|---|---|---|---|---|---|---|
| 1 | 1 | 0-15 | 0.2292 | 1.77 | 0.27 | 1.43 | 1.77 | 1.77 | 0.250 |
| 2 | 1 | 15-30 | 0.2292 | 1.80 | 0.48 | 1.42 | 1.80 | 1.80 | 0.250 |
| 3 | 1 | 30-45 | 0.2292 | 1.82 | 0.69 | 1.33 | 1.82 | 1.09 | 0.250 |
| 4 | 1 | 45-60 | 0.2292 | 1.85 | 0.95 | 1.23 | 1.85 | 0.98 | 0.250 |
| 5 | 1 | 60-75 | 0.2292 | 1.87 | 1.02 | 1.14 | 1.21 | 0.94 | 0.250 |
| 6 | 1 | 75-90 | 0.2292 | 1.90 | 1.10 | 1.09 | 1.11 | 0.86 | 0.250 |
| 7 | 1 | 90-105 | 0.2292 | 1.92 | 1.10 | 1.09 | 0.83 | 0.84 | 0.250 |
| 8 | 1 | 105-120 | 0.2292 | 1.95 | 1.10 | 1.09 | 0.84 | 0.75 | 0.250 |
| 9 | 1 | 120-135 | 0.2292 | 1.97 | 1.10 | 1.09 | 0.63 | 0.75 | 0.250 |
| 10 | 1 | 135-150 | 0.2292 | 2.00 | 0.93 | 1.10 | 0.61 | 0.75 | 0.250 |
| 11 | 1 | 150-165 | 0.2292 | 2.02 | 0.67 | 1.10 | 0.54 | 0.75 | 0.250 |
| 12-24 | 1 | 165-360 | 0.2292 | 2.05-2.32 | 0.50 | 1.10 | 0.54 | 0.78 | 0.250 |
| 25-48 | 2 | 0-360 | 0.3021 | 2.34-3.18 | 0.50 | 1.10 | 0.52 | 0.67 | 0.125 |
| 49-63 | 3 | 0-225 | 0.3229 | 3.22-3.72 | -s- | -s- | -s- | -s- | 0.00 |
| 64-73 | 3-4 | 225-15 | 0.3229 | 3.72 | -s- | -s- | -s- | -s- | 0.00 |
| 74-97 | 4-5 | 15-15 | 0.3750 | 3.72 | -s- | -s- | -s- | -s- | 0.00 |
| 98-107 | 5 | 15-165 | 0.4167 | 3.72 | -s- | -s- | -s- | -s- | 0.00 |

TABLE 3

| Degree | $\beta_1$ | $\beta_2$ | $\beta_3$ |
|---|---|---|---|
| 0-15 | 88.2° | 48.1° | 51.4° |
| 15-30 | 100.3° | — | — |

TABLE 3-continued

| Degree | $\beta_1$ | $\beta_2$ | $\beta_3$ |
|---|---|---|---|
| 30-45 | 110.8° | — | — |
| 45-60 | 117.7° | — | — |
| 60-75 | 126.9° | — | — |
| 75-90 | 131.2° | — | — |

What is claimed is:

1. A compression conveyor auger assembly, for transporting and compressing waxed corrugated cardboard segments, comprising:
a housing, said housing including an inlet end and an outlet end, wherein said outlet end is tapered;
an opening on said housing, said opening disposed adjacent said inlet end of said housing;
a compression conveyor screw rotatably disposed within said housing, said compression conveyor screw including a helical blade extending between said inlet end and said outlet end of said housing, said helical blade including a plurality of flights;
wherein said helical blade includes a pusher side and a rear side; and
weld buildups on said pusher side and said rear side of said helical blade;
wherein length and height of all said weld buildups vary with positioning of said blade relative to said outlet end of said housing;
wherein each flight is divided into a plurality of stations;
wherein said compression conveyer screw, from one end of said housing to the other, exhibits a uniform amount of change in angular displacement from a station to an adjacent station; and
wherein said housing and said compression conveyer screw are configured to orient and align the cardboard segments in a circumferentially-disposed manner about a periphery of said compression conveyer screw and to move said cardboard segments forward while said cardboard segments are being disposed horizontally.

2. An apparatus as recited in claim 1, wherein the diameter of said helical blade decreases towards said outlet end of said housing, and wherein said flights decrease in length toward said outlet end of said housing.

3. An apparatus as recited in claim 2, further comprising a log die attached to said outlet end of said housing.

4. An apparatus as recited in claim 3, wherein said log die includes at least one internal longitudinal groove therein.

5. An apparatus as recited in claim 1, wherein said housing includes a circular passageway having rifling.

6. An apparatus as recited in claim 1, wherein the cardboard segments being transported therethrough are compressed to a ratio between approximately 5:1 and approximately 8:1.

7. An apparatus as recited in claim 1, further comprising means for rotating said compression conveyor screw.

8. An apparatus as recited in claim 7, wherein said conveyor screw rotating means comprises a spur gear.

9. An apparatus as recited in claim 1, further including means for segmenting the composite firelog extrusion into individual log sections.

10. An apparatus as recited in claim 1, wherein said helical blade includes a diameter that decreases towards said outlet end of said housing.

11. An apparatus as recited in claim 10, wherein said flights of said helical blade decrease in length toward said outlet end of said housing.

* * * * *